(12) United States Patent
Laperle et al.

(10) Patent No.: US 12,254,616 B2
(45) Date of Patent: Mar. 18, 2025

(54) SYSTEMS AND METHODS FOR MONITORING TRACKED VEHICLES

(71) Applicant: CAMSO INC., Magog (CA)

(72) Inventors: Ghislain Laperle, Sherbrooke (CA); David Gingras, Magog (CA)

(73) Assignee: Camso Inc., Magog (CA)

( * ) Notice: Subject to any disclaimer, the term of this patent is extended or adjusted under 35 U.S.C. 154(b) by 720 days.

(21) Appl. No.: 17/272,634

(22) PCT Filed: Aug. 30, 2019

(86) PCT No.: PCT/CA2019/051217
§ 371 (c)(1),
(2) Date: Mar. 1, 2021

(87) PCT Pub. No.: WO2020/041897
PCT Pub. Date: Mar. 5, 2020

(65) Prior Publication Data
US 2021/0339758 A1 Nov. 4, 2021

Related U.S. Application Data

(60) Provisional application No. 62/861,677, filed on Jun. 14, 2019, provisional application No. 62/724,846, filed on Aug. 30, 2018.

(51) Int. Cl.
*G06T 7/00* (2017.01)
*B60W 40/12* (2012.01)
(Continued)

(52) U.S. Cl.
CPC .............. *G06T 7/001* (2013.01); *B60W 40/12* (2013.01); *B60W 50/14* (2013.01); *B62D 55/32* (2013.01);
(Continued)

(58) Field of Classification Search
CPC ......... G06T 7/001; G06T 7/0002; G06T 7/97; G06T 17/00; G06T 2207/20084;
(Continued)

(56) References Cited

U.S. PATENT DOCUMENTS 1,539,582 A 5/1925 Landry
1,673,541 A 6/1928 Wilson
(Continued)

FOREIGN PATENT DOCUMENTS

CA 2606039 A1 4/2009
CA 2838935 A1 1/2013
(Continued)

OTHER PUBLICATIONS

Perelmuter et al., Classification of Bidimensional Images Using Artificial Intelligence Techniques, 1996, IEEE Conferences, Proceedings II Workshop on Cybernetic Vision (pp. 39-44) (Year: 1996).*

(Continued)

*Primary Examiner* — Hitesh Patel
*Assistant Examiner* — Michael Lukon
(74) *Attorney, Agent, or Firm* — Hahn Loeser & Parks LLP

(57) ABSTRACT

A vehicle comprising a track system can be monitored to obtain information regarding the vehicle, including information regarding the track system, such as an indication of a physical state of a track and/or other component of the track system based on at least on 3D recognition and/or 2D recognition of image data of a track system component.

19 Claims, 44 Drawing Sheets

(51) Int. Cl.
  *B60W 50/14* (2020.01)
  *B62D 55/32* (2006.01)
  *E02F 9/26* (2006.01)
  *G01M 17/03* (2006.01)
  *G06T 17/00* (2006.01)
  *G07C 5/08* (2006.01)
  *B62D 55/065* (2006.01)
  *B62D 55/24* (2006.01)

(52) U.S. Cl.
  CPC ............. *E02F 9/267* (2013.01); *G01M 17/03* (2013.01); *G06T 7/0002* (2013.01); *G06T 7/97* (2017.01); *G06T 17/00* (2013.01); *G07C 5/0808* (2013.01); *B60W 2300/44* (2013.01); *B60W 2420/403* (2013.01); *B62D 55/065* (2013.01); *B62D 55/244* (2013.01); *G06T 2207/20084* (2013.01); *G06T 2210/56* (2013.01)

(58) Field of Classification Search
  CPC ....... G06T 2210/56; G06T 2207/10032; G06T 2207/30164; B60W 40/12; B60W 50/14; B60W 2300/44; B60W 2420/42; B62D 55/32; B62D 55/065; B62D 55/244; E02F 9/267; G01M 17/03; G07C 5/0808
  See application file for complete search history.

(56) References Cited

U.S. PATENT DOCUMENTS

| | | |
|---|---|---|
| 2,025,999 A | 12/1935 | Myers |
| 2,040,696 A | 5/1936 | Johnston |
| 2,369,130 A | 2/1945 | Benson |
| 2,461,150 A | 2/1949 | Flynn |
| 2,523,182 A | 9/1950 | Battaglia |
| 2,562,264 A | 7/1951 | Ford |
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba |
| 3,582,154 A | 6/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ, Sr. |
| 3,781,067 A | 12/1973 | Dodson et al. |
| 3,858,948 A | 1/1975 | Johnson et al. |
| 3,887,244 A | 6/1975 | Haslett et al. |
| 3,914,990 A | 10/1975 | Borg |
| 3,944,006 A | 3/1976 | Lassanske |
| 3,981,943 A | 9/1976 | Fujio et al. |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,919 A | 9/1990 | Langford |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,117,930 A | 6/1992 | Argouarc'h |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,452,949 A | 9/1995 | Kelderman |
| 5,482,364 A | 1/1996 | Edwards et al. |
| 5,498,188 A | 3/1996 | Deahr |
| 5,511,869 A | 4/1996 | Edwards et al. |
| 5,513,683 A | 5/1996 | Causa et al. |
| 5,529,267 A | 6/1996 | Giras et al. |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Oertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | Ono |
| 6,176,557 B1 | 1/2001 | Ono |
| 6,186,604 B1 | 2/2001 | Fikse |
| 6,193,335 B1 | 2/2001 | Edwards |
| 6,206,492 B1 | 3/2001 | Moser |
| 6,224,172 B1 | 5/2001 | Goodwin |
| 6,241,327 B1 | 6/2001 | Gleasman et al. |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 | 5/2002 | Brandenburger |
| 6,386,654 B1 | 5/2002 | Singer et al. |
| 6,416,142 B1 | 7/2002 | Oertley |
| 6,474,756 B2 | 11/2002 | Hori et al. |
| 6,494,548 B2 | 12/2002 | Courtemanche |
| 6,536,852 B2 | 3/2003 | Katayama et al. |
| 6,536,853 B2 | 3/2003 | Egle et al. |
| 6,568,769 B1 | 5/2003 | Watanabe et al. |
| 6,581,449 B1 | 6/2003 | Brown et al. |
| D476,599 S | 7/2003 | Whittington |
| 6,588,862 B1 | 7/2003 | Pringiers |
| 6,637,276 B2 | 10/2003 | Adderton et al. |
| 6,652,043 B2 | 11/2003 | Oertley |
| 6,671,609 B2 | 12/2003 | Nantz et al. |
| 6,698,850 B2 | 3/2004 | Ueno |
| D488,171 S | 4/2004 | Juncker et al. |
| 6,716,012 B2 | 4/2004 | Yovichin et al. |
| 6,733,091 B2 | 5/2004 | Deland et al. |
| 6,733,093 B2 | 5/2004 | Deland et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,874,586 B2 | 4/2005 | Boivin et al. |
| D505,136 S | 5/2005 | Brazier |
| 6,904,986 B2 | 6/2005 | Brazier |
| 6,913,329 B1 | 7/2005 | Rodgers et al. |

(56) References Cited

U.S. PATENT DOCUMENTS

| | | |
|---|---|---|
| 6,921,197 B2 | 7/2005 | Aubel et al. |
| 6,923,515 B2 | 8/2005 | Konickson et al. |
| 6,932,442 B2 | 8/2005 | Hori |
| 6,935,708 B2 | 8/2005 | Courtemanche |
| 6,948,784 B2 | 9/2005 | Wodrich et al. |
| 6,962,222 B2 | 11/2005 | Kirihata |
| 6,964,462 B2 | 11/2005 | Katoh et al. |
| 6,974,196 B2 | 12/2005 | Gagne et al. |
| 7,001,294 B2 | 2/2006 | Fukuda |
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,197,922 B2 | 4/2007 | Rimkus et al. |
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,316,251 B2 | 1/2008 | Kogure et al. |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,416,266 B2 | 8/2008 | Soucy et al. |
| 7,497,530 B2 | 3/2009 | Bessette |
| 7,567,171 B2 | 7/2009 | Dufournier |
| 7,597,161 B2 | 10/2009 | Brazier |
| D603,880 S | 11/2009 | Brazier |
| 7,625,050 B2 | 12/2009 | Bair |
| 7,676,307 B2 | 3/2010 | Schmitt et al. |
| 7,708,092 B2 | 5/2010 | Despres |
| 7,729,823 B2 | 6/2010 | Ruoppolo |
| 7,740,094 B2 | 6/2010 | Pelletier |
| 7,778,741 B2 | 8/2010 | Rao et al. |
| 7,779,947 B2 | 8/2010 | Stratton |
| 7,784,884 B2 | 8/2010 | Soucy et al. |
| 7,798,260 B2 | 9/2010 | Albright et al. |
| 7,823,987 B2 | 11/2010 | Dandurand et al. |
| 7,866,766 B2 | 1/2011 | Berg |
| 7,914,088 B2 | 3/2011 | Bair |
| 7,914,089 B2 | 3/2011 | Bair |
| D644,670 S | 9/2011 | Barrelmeyer |
| 8,122,581 B1 | 2/2012 | Hurst et al. |
| 8,327,960 B2 | 12/2012 | Couture et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aube |
| D683,769 S | 6/2013 | Aube |
| 8,567,876 B2 | 10/2013 | Wellman |
| 8,628,152 B2 | 1/2014 | Delisle et al. |
| 8,736,147 B1 | 5/2014 | Wang |
| D711,928 S | 8/2014 | Brazier |
| 8,985,250 B1 | 3/2015 | Lussier et al. |
| 9,033,431 B1 | 5/2015 | Zuchoski et al. |
| 9,067,631 B1 | 6/2015 | Lussier et al. |
| 9,334,001 B2 | 5/2016 | Lussier et al. |
| 9,805,697 B1* | 10/2017 | Dorrance ............... G06V 10/44 |
| 9,855,843 B2 | 1/2018 | Vik et al. |
| 9,878,750 B2 | 1/2018 | Leblanc et al. |
| 9,880,075 B2 | 1/2018 | Finch et al. |
| 9,975,554 B2 | 5/2018 | Lussier et al. |
| 10,006,836 B2 | 6/2018 | Monti et al. |
| 10,272,959 B2 | 4/2019 | Zuchoski et al. |
| 10,328,982 B2 | 6/2019 | Lussier et al. |
| 10,745,069 B2 | 8/2020 | Gustafson |
| 10,783,723 B2 | 9/2020 | Richard et al. |
| 10,933,877 B2 | 3/2021 | Lussier et al. |
| 11,046,377 B2 | 6/2021 | Lussier et al. |
| 11,167,810 B2 | 11/2021 | Boily et al. |
| 11,186,330 B2 | 11/2021 | Zuchoski et al. |
| 2002/0070607 A1 | 6/2002 | Edwards |
| 2002/0140288 A1 | 10/2002 | Herberger, Sr. et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Hori et al. |
| 2003/0080618 A1 | 5/2003 | Krishnan et al. |
| 2003/0089534 A1 | 5/2003 | Kanzler et al. |
| 2003/0161687 A1 | 8/2003 | Kirihata |
| 2004/0004395 A1 | 1/2004 | Soucy et al. |
| 2004/0070273 A1 | 4/2004 | Safe et al. |
| 2004/0084962 A1 | 5/2004 | Courtemanche |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0090558 A1 | 5/2006 | Raskas |
| 2006/0103236 A1 | 5/2006 | Soucy et al. |
| 2006/0124366 A1 | 6/2006 | Le Masne De Chermont |
| 2006/0144480 A1 | 7/2006 | Takayama et al. |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1 | 4/2008 | Rainer |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0195062 A1 | 8/2009 | Uchida |
| 2009/0302676 A1 | 12/2009 | Brazier |
| 2009/0302677 A1 | 12/2009 | Sugihara |
| 2009/0309415 A1 | 12/2009 | Shimozono |
| 2009/0326109 A1 | 12/2009 | Kameda et al. |
| 2010/0012399 A1 | 1/2010 | Hansen |
| 2010/0033010 A1 | 2/2010 | Shimozono |
| 2010/0079238 A1 | 4/2010 | Gravelle et al. |
| 2010/0095506 A1 | 4/2010 | Bair |
| 2010/0096915 A1 | 4/2010 | Hagio |
| 2010/0096917 A1 | 4/2010 | Bair |
| 2010/0121644 A1 | 5/2010 | Glasser |
| 2010/0133019 A1 | 6/2010 | Muemken |
| 2010/0139994 A1 | 6/2010 | Hansen |
| 2010/0191417 A1 | 7/2010 | Murahashi et al. |
| 2010/0194553 A1 | 8/2010 | Mizutani et al. |
| 2010/0230185 A1 | 9/2010 | Mallette et al. |
| 2010/0253138 A1 | 10/2010 | Despres |
| 2010/0256946 A1 | 10/2010 | Carresjo et al. |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |
| 2012/0242143 A1 | 9/2012 | Feldmann |
| 2012/0253590 A1 | 10/2012 | Fink |

(56) References Cited

U.S. PATENT DOCUMENTS

| | | |
|---|---|---|
| 2012/0306916 A1 | 12/2012 | Marumoto et al. |
| 2013/0033271 A1 | 2/2013 | Woodard |
| 2013/0073157 A1 | 3/2013 | Person et al. |
| 2013/0082846 A1 | 4/2013 | McKinley et al. |
| 2013/0126196 A1 | 5/2013 | Rosenboom |
| 2013/0134772 A1 | 5/2013 | Dandurand et al. |
| 2013/0134773 A1 | 5/2013 | Dandurand et al. |
| 2013/0162016 A1 | 6/2013 | Lajoie et al. |
| 2013/0245911 A1 | 9/2013 | Nakajima et al. |
| 2013/0255354 A1 | 10/2013 | Hawkins et al. |
| 2013/0325266 A1 | 12/2013 | Padilla et al. |
| 2014/0105481 A1* | 4/2014 | Hasselbusch ......... G06T 7/0006 382/141 |
| 2014/0125117 A1 | 5/2014 | Weeks et al. |
| 2014/0180534 A1 | 6/2014 | Son |
| 2014/0182960 A1 | 7/2014 | Bedard et al. |
| 2014/0288763 A1 | 9/2014 | Bennett et al. |
| 2014/0324301 A1 | 10/2014 | Rebinsky |
| 2015/0042152 A1 | 2/2015 | Lussier et al. |
| 2015/0042153 A1 | 2/2015 | Lussier et al. |
| 2015/0107975 A1 | 4/2015 | Chen et al. |
| 2015/0129329 A1 | 5/2015 | Cox |
| 2015/0191173 A1 | 7/2015 | Lussier et al. |
| 2015/0321710 A1 | 11/2015 | Zuchoski et al. |
| 2016/0052572 A1 | 2/2016 | McKinley et al. |
| 2016/0059779 A1 | 3/2016 | Vandendriessche |
| 2016/0121945 A1 | 5/2016 | Rust et al. |
| 2016/0129954 A1 | 5/2016 | Hasselbusch et al. |
| 2016/0236733 A1 | 8/2016 | Tiede et al. |
| 2016/0332682 A1 | 11/2016 | Lussier et al. |
| 2017/0036714 A1 | 2/2017 | Lunkenbein |
| 2017/0087987 A1 | 3/2017 | Vik et al. |
| 2017/0094894 A1 | 4/2017 | Heim et al. |
| 2017/0174277 A1 | 6/2017 | Zuchoski et al. |
| 2017/0177011 A1 | 6/2017 | Garvin et al. |
| 2018/0043949 A1 | 2/2018 | Boily |
| 2018/0093724 A1 | 4/2018 | Boily |
| 2018/0172557 A1 | 6/2018 | Ghidotti Piovan et al. |
| 2018/0190045 A1 | 7/2018 | Richard et al. |
| 2018/0237020 A1 | 8/2018 | Lussier et al. |
| 2018/0265145 A1 | 9/2018 | Todd et al. |
| 2018/0364744 A1 | 12/2018 | Garvin et al. |
| 2019/0066283 A1* | 2/2019 | Gros ................... G05D 1/0094 |
| 2019/0351957 A1 | 11/2019 | Zuchoski et al. |
| 2019/0359270 A1 | 11/2019 | Lussier et al. |
| 2019/0392569 A1* | 12/2019 | Finch .................. G06T 19/20 |
| 2020/0070906 A1 | 3/2020 | Laperle et al. |
| 2021/0024150 A1 | 1/2021 | Boily et al. |
| 2021/0074089 A1 | 3/2021 | Boily et al. |
| 2021/0173399 A1 | 6/2021 | Richard et al. |
| 2021/0197625 A1 | 7/2021 | Laperle et al. |
| 2021/0213954 A1 | 7/2021 | Lussier et al. |
| 2022/0055699 A1 | 2/2022 | Desmarais et al. |
| 2022/0063740 A1 | 3/2022 | Boily et al. |

FOREIGN PATENT DOCUMENTS

| | | | | |
|---|---|---|---|---|
| CA | 2978482 | A1 | 9/2016 | |
| CA | 3064100 | A1 | 9/2016 | |
| CA | 2991072 | | 1/2017 | |
| CA | 2947575 | A1 | 5/2017 | |
| CA | 3110606 | | 3/2020 | |
| CN | 108061735 | * | 5/2018 | ......... G01N 21/8851 |
| CN | 108061735 | A * | 5/2018 | ......... G01N 21/8851 |
| CN | 110588813 | | 12/2019 | |
| DE | 20207342 | U1 | 8/2002 | |
| DE | 102010017531 | A1 * | 12/2011 | ......... G01N 21/8914 |
| EP | 0578504 | A2 | 1/1994 | |
| EP | 1008509 | A1 | 6/2000 | |
| EP | 1211169 | A2 | 6/2002 | |
| EP | 1260429 | A2 | 11/2002 | |
| EP | 1273504 | A1 | 1/2003 | |
| EP | 1283152 | A1 | 2/2003 | |
| EP | 1325820 | B1 | 9/2004 | |
| EP | 1506913 | A1 | 2/2005 | |
| EP | 1882627 | A1 | 1/2008 | |
| EP | 1953070 | A1 | 8/2008 | |
| EP | 2014542 | A1 | 1/2009 | |
| EP | 2119620 | A1 | 11/2009 | |
| EP | 3185097 | | 6/2017 | |
| EP | 3265368 | A1 | 1/2018 | |
| EP | 3313717 | A1 | 5/2018 | |
| EP | 3721200 | | 10/2020 | |
| EP | 3721200 | A1 | 10/2020 | |
| EP | 3747746 | A1 | 12/2020 | |
| EP | 3812249 | | 4/2021 | |
| EP | 3844473 | | 7/2021 | |
| EP | 3844474 | | 7/2021 | |
| EP | 3960593 | | 2/2022 | |
| GB | 2229410 | A | 9/1990 | |
| GB | 2360501 | | 9/2001 | |
| JP | H02074476 | | 3/1990 | |
| JP | H11129946 | A | 5/1999 | |
| JP | 2000053037 | A | 2/2000 | |
| JP | 2003011860 | A | 1/2003 | |
| JP | 2003089366 | A | 3/2003 | |
| JP | 2004330830 | A | 11/2004 | |
| JP | 2006103482 | A | 4/2006 | |
| JP | 2007022304 | A | 2/2007 | |
| JP | 2009061829 | A | 3/2009 | |
| JP | 2009248924 | A | 10/2009 | |
| JP | 2010018091 | A | 1/2010 | |
| JP | 2010047040 | A | 3/2010 | |
| JP | 2010089729 | A | 4/2010 | |
| JP | 2014126370 | * | 7/2014 | ............... G01N 3/58 |
| KR | 100829059 | | 5/2008 | |
| KR | 20120055071 | A | 5/2012 | |
| KR | 20130043954 | A | 5/2013 | |
| KR | 20150004969 | A | 1/2015 | |
| SU | 1446017 | A2 | 12/1988 | |
| WO | 2008088355 | A1 | 7/2008 | |
| WO | 2008108439 | A1 | 9/2008 | |
| WO | 2009105892 | A1 | 9/2009 | |
| WO | 2009106617 | A1 | 9/2009 | |
| WO | 2013002781 | A1 | 1/2013 | |
| WO | 2014056089 | A1 | 4/2014 | |
| WO | 2014168851 | A1 | 10/2014 | |
| WO | 2015059457 | A1 | 4/2015 | |
| WO | 2016138592 | A1 | 9/2016 | |
| WO | WO-2017000068 | A1 * | 1/2017 | ............. B62D 55/14 |
| WO | 2017049393 | | 3/2017 | |
| WO | WO2018165753 | * | 9/2018 | ............. G06N 3/045 |
| WO | 2019109191 | A1 | 6/2019 | |
| WO | 2019225752 | | 11/2019 | |
| WO | 2020041897 | A1 | 3/2020 | |
| WO | 2020041899 | A1 | 3/2020 | |
| WO | 2020049532 | | 3/2020 | |
| WO | 2021189154 | | 9/2021 | |

OTHER PUBLICATIONS

Perelmuter et al., Classification of Bidimensional Images Using Artificial Intelligence Techniques, 1996,IEEE Conferences, ProceedingsWorkshoponCyberneticVision(pp. 39-44)(Year: 1996) (Year: 1996).*
JP-2014126370 ("Saka") translation and original (Year: 2014).*
CN-108061735 ("Bian") translation and original (Year: 2018).*
WO-2018165753 ("Cha") translation and original (Year: 2018).*
Communication pursuant to Article 94 (3) EPC issued on Aug. 22, 2019, in connection with European Patent Application No. 16816886. 2, 4 pages.
Communication pursuant to Rule 63(1) EPC issued on Nov. 8, 2018 in connection with European Patent Application No. 16758408.5, 4 pages.
Communication under Rule 71(3) EPC issued on Mar. 16, 2020, in connection with European Patent Application 16758408.5, 7 pages.
Communication under Rule 71(3) EPC issued on May 6, 2020, in connection with European Patent Application No. 16816886.2, 7 pages.
European Extended Search Report issued on Nov. 6, 2020, in connection with European Patent Application No. 20187079.7, 15 pages.

(56) References Cited

OTHER PUBLICATIONS

Examiners Report issued on Apr. 7, 2020, in connection with Canadian Patent Application 3,064,100, 3 pages.
Examiners report issued on Aug. 28, 2018, in connection with Canadian Patent application No. 2,991,072, 4 pages.
Examiners Report issued on Feb. 1, 2018 in connection with Canadian Patent Application No. 2,991,072, 3 pages.
Examiners Report issued on Jan. 11, 2018 in connection with Canadian Patent Application No. 2,978,482, 3 pages.
Examiners report issued on Jan. 16, 2019 in connection with Canadian Patent Application No. 2,991,072, 3 pages.
Examiners Report issued on Jul. 9, 2020, in connection with Canadian Patent Application 3,064,100, 3 pages.
Examiners Report issued on Oct. 14, 2020, in connection with Canadian Patent Application 3,042,780, 4 pages.
Extended European Search Report and Written Opinion issued on Sep. 13, 2013 in connection, with European Patent Application No. 10835318.6, 8 pages.
Extended European Search Report issued on Jan. 9, 2019 in connection with European Patent Application No. 16816886.2, 7 pages.
Extended European Search Report issued on Mar. 20, 2019 in connection with European Patent Application No. 16758408.5, 8 pages.
Final Office Action issued on Aug. 19, 2019, in connection with U.S. Appl. No. 15/724,733, 18 pages.
Final Office Action issued on Aug. 24, 2018 in connection with U.S. Appl. No. 15/454,881, 30 pages.
Final Office Action issued on Dec. 23, 2014 in connection with U.S. Appl. No. 13/326,132, 15 pages.
Final Office Action issued on Dec. 31, 2015 in connection with U.S. Appl. No. 13/326,132, 15 pages.
Final Office Action issued on Jan. 12, 2017 in connection with U.S. Appl. No. 14/665,075, 11 pages.
Final Office Action issued on Jul. 6, 2020, in connection with U.S. Appl. No. 15/555,148, 20 pages.
Final Office Action issued on Jun. 26, 2015 in connection with U.S. Appl. No. 13/326,278, 15 pages.
Final Office Action issued on Mar. 27, 2014 in connection with U.S. Appl. No. 13/170,753, 16 pages.
Final Office Action issued on Mar. 5, 2015 in connection with U.S. Appl. No. 13/325,796, 33 pages.
Final Office Action issued on Sep. 8, 2017 in connection with U.S. Appl. No. 15/139,572, 14 pages.
International Search Report and Written Opinion issued on Sep. 29, 2016 in connection with PCT/CA2016/050760, 8 pages.
International Search Report and Written Opinion issued on Nov. 12, 2019, in connection with International PCT Application No. PCT/CA2019/051217, 8 pages.
International Search Report and Written Opinion issued on Oct. 29, 2019 in connection with International PCT Application No. PCT/CA2019/051219, 9 pages.
International Search Report issued on Mar. 5, 2019, in connection with International PCT application No. PCT/CA2018/051567, 4 pages.
Interview Summary issued on Dec. 10, 2018 in connection with U.S. Appl. No. 15/139,572, 3 pages.
Interview Summary issued on Nov. 2, 2018 in connection with U.S. Appl. No. 15/454,881, 3 pages.
Interview Summary Report issued on Sep. 12, 2015 in connection with U.S. Appl. No. 13/326,278, 3 pages.
Non-Final Office Action issued on Apr. 5, 2016 in connection with U.S. Appl. No. 14/665,075, 5 pages.
Non-Final Office Action issued on Apr. 9, 2019 in connection with U.S. Appl. No. 15/724,733, 56 pages.
Non-Final Office Action issued on Dec. 1, 2016 in connection with U.S. Appl. No. 15/139,572, 5 pages.
Non-Final Office Action issued on Dec. 30, 2019 in connection with U.S. Appl. No. 15/740,976, 16 pages.
Non-Final Office Action issued on Feb. 21, 2017 in connection with U.S. Appl. No. 14/721,326, 12 pages.
Non-Final Office Action issued on Jan. 11, 2017 in connection with U.S. Appl. No. 14/886,327, 11 pages.
Non-Final Office Action issued on Jul. 10, 2014 in connection with U.S. Appl. No. 13/326,110, 16 pages.
Non-Final Office Action issued on Jul. 10, 2014 in connection with U.S. Appl. No. 13/424,459, 11 pages.
Non-Final Office Action issued on Jul. 14, 2014 in connection with U.S. Appl. No. 13/112,840, 16 pages.
Non-Final Office Action issued on Jun. 12, 2017 in connection with U.S. Appl. No. 14/665,075, 9 pages.
Non-Final Office Action issued on Jun. 2, 2014 in connection with U.S. Appl. No. 13/326,010, 6 pages.
Non-Final Office Action issued on Jun. 24, 2015 in connection with U.S. Appl. No. 13/326,132, 17 pages.
Non-Final Office Action issued on Mar. 20, 2018 in connection with U.S. Appl. No. 15/139,572, 7 pages.
Non-Final Office Action issued on Mar. 6, 2015 in connection with U.S. Appl. No. 13/326,278, 16 pages.
Non-Final Office Action issued on May 17, 2018 in connection with U.S. Appl. No. 15/454,881, 8 pages.
Non-Final Office Action issued on Oct. 11, 2017 in connection with U.S. Appl. No. 14/665,075, 6 pages.
Non-Final Office Action issued on Oct. 2, 2013 in connection with U.S. Appl. No. 13/170,753, 15 pages.
European Extended Search Report issued on Aug. 18, 2021, in connection with European Patent Application No. 18887057.0, 8 pages.
Examiner's report issued on Jan. 22, 2021, in connection with Canadian Patent Application No. 2,991,072, 3 pages.
Non-Final Office Action issued on Dec. 14, 2020, in connection with U.S. Appl. No. 15/555,148, 9 pages.
Notice of Allowance issued on Feb. 23, 2021 in connection with U.S. Appl. No. 15/724,733, 18 pages.
Final Office Action issued on Mar. 9, 2021, in connection with U.S. Appl. No. 15/555,148, 14 pages.
Notice of Allowance issued on Mar. 4, 2015 in connection with U.S. Appl. No. 13/325,783, 13 pages.
Notice of Allowance issued on May 20, 2020 in connection with U.S. Appl. No. 15/740,976, 12 pages.
Notice of Allowance issued on May 30, 2018 in connection with U.S. Appl. No. 15/139,572, 10 pages.
Notice of Allowance issued on Nov. 14, 2014 in connection with U.S. Appl. No. 13/326,010, 7 pages.
Notice of Allowance issued on Oct. 30, 2020, in connection with U.S. Appl. No. 15/958,156, 30 pages.
Notice of Allowance issued on Oct. 24, 2014 in connection with U.S. Appl. No. 13/170,753, 5 pages.
Non-Final Office Action issued on Feb. 2, 2021, in connection with U.S. Appl. No. 16/360,060, 55 pages.
Non-Final Office Action issued on Jan. 24, 2020 in connection with U.S. Appl. No. 15/555,148, 57 pages.
Non-Final Office Action issued on May 29, 2020, in connection with U.S. Appl. No. 15/958,156, 45 pages.
Non-Final Office Action issued on Nov. 9, 2012, in connection with U.S. Appl. No. 29/405,414, 9 pages.
Ex parte Quayle issued on Sep. 11, 2018 in connection with U.S. Appl. No. 15/139,572, 7 pages.
Restriction Requirement issued on Jan. 27, 2014 in connection with U.S. Appl. No. 13/326,010, 5 pages.
Restriction Requirement issued on Jun. 9, 2014 in connection with U.S. Appl. No. 13/326,278, 7 pages.
Restriction Requirement issued on Sep. 26, 2013 in connection with U.S. Appl. No. 13/326,010, 6 pages.
Supplementary Search Report issued on Jan. 2, 2019 in connection with the European Patent Application No. 16816886, 1 page.
Written Opinion issued on Mar. 5, 2019 in connection with International PCT application No. PCT/CA2018/051567, 6 pages.
International Search Report and Written Opinion issued on Jun. 21, 2021 in connection with International PCT application No. PCT/CA2021/050404, 8 pages.

(56) References Cited

OTHER PUBLICATIONS

Notice of Allowance issued on Jul. 9, 2021, in connection with U.S. Appl. No. 15/555,148, 6 pages.
Notice of Allowance issued on Jul. 26, 2021, in connection with U.S. Appl. No. 16/360,060, 14 pages.
Extended European Search Report issued on Mar. 30, 2021, in connection with European Patent Application No. 20201638.2, 10 pages.
Non-Final Office Action issued on Mar. 11, 2021 in connection with U.S. Appl. No. 16/419,760, 28 pages.
Final Office Action issued on Nov. 9, 2021 in connection with U.S. Appl. No. 16/419,760, 57 pages.
International Search Report and Written Opinion issued on Nov. 3, 2021 in connection with International PCT application No. PCT/CA2021/051143, 17 pages.
Non-Final Office Action issued on Nov. 9, 2012, in connection with U.S. Appl. No. 29/405,417, 10 pages.
Extended European Search Report issued on Feb. 1, 2022, in connection with European Patent Application No. 21191893.3, 11 pages.
Bair Products, Inc. "Larry Lugs—Patented Bolt-On-Replacement Drive Lugs", http://www.bairproductsinc.com/products/larry_lugs.html, Jan. 1, 2011, 2 pages.
Bridgestone Industrial Products America Inc. "Stay on the Right Track. New Generation Features Rubber Tracks for Excavators", Brochure 2009, 12 pages.
Bridgestone Industrial Products America Inc., "Stay on the Right Track. Rubber Tracks for Track Loaders", Brochure 2009, 6 pages.
Camoplast Inc. "ATV/UTV Track Systems", 2009-2010 Catalog, 8 pages.
CAN-AM BRP, "Parts & Accessories—Track Systems", Parts, Accessories & Riding Gear Catalogue, p. 66 (2011).
Red Roo Solutions Pty Ltd—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pages.
Story by Staff, BRP upgrades Apache ATV track system for Outlander—Apache system features larger footprint and power steering mode, atv.com, http://www.atc.com/news/brp-upgrades-apache-atv-track-system-for-outlander-1481.html 2 pages (Nov. 24, 2009).
Non-Final Office Action issued on Nov. 9, 2012, in connection with U.S. Appl. No. 29/405,416, 9 pages.
Restriction Requirement issued on Oct. 25, 2019 in connection with U.S. Appl. No. 15/555,148, 7 pages.
Non-final Office Action issued on Oct. 5, 2020, in connection with U.S. Appl. No. 15/724,733, 7 pages.
Non-Final Office Action issued on Sep. 22, 2014 in connection with U.S. Appl. No. 13/325,796, 25 pages.
Non-Final Office Action issued on Sep. 29, 2014 in connection with U.S. Appl. No. 13/325,783, 27 pages.
Notice of Allowance issued on Apr. 2, 2020, in connection with U.S. Appl. No. 15/724,733, 5 pages.
Notice of Allowance issued on Dec. 17, 2018 in connection with U.S. Appl. No. 15/454,881, 5 pages.
Notice of Allowance issued on Feb. 15, 2019 in connection with U.S. Appl. No. 15/139,572, 7 pages.
Notice of Allowance issued on Jan. 11, 2016 in connection with U.S. Appl. No. 13/326,278, 7 pages.
Notice of Allowance issued on Jan. 19, 2018 in connection with U.S. Appl. No. 14/665,075, 8 pages.
Notice of Allowance issued on Jan. 21, 2015 in connection with U.S. Appl. No. 13/326,110, 6 pages.
European Extended Search Report issued on Mar. 20, 2019 in connection with European Patent Application No. 16758408.5, 8 pages.
International Search Report issued on Jun. 29, 2016 in connection with International Patent Application No. PCT/CA2016/050234, 3 pages.
Written Opinion issued on Jun. 29, 2016 in connection with International Patent Application No. PCT/CA2016/050234, 3 pages.

* cited by examiner

| Track Model | Serial Number | Inspection Date | Type of Inspection | Registered Owner |
|---|---|---|---|---|
| Camso HXD 450x44x86 HHBE | 001 | 05/27/2018 | Full Inspection | Blade Sod LLC<br>User ID 12300 |
| Camso HXD 450x44x86 HHBE | 002 | 06/11/2018 | Track Alignment | FG Agriculture Inc<br>User ID 88789 |
| Camso HXD 450x44x86 HHBE | 003 | 02/02/2012 | Track Life | MJ Contracting Ltd<br>User ID 14892 |
| Camso HXD 450x44x86 HHBE | 004 | 02/07/2018 | Track Cable Integrity | XYZ Corp<br>User ID 22394 |
| Camso HXD 450x44x86 HHBE | 005 | NULL | NULL | Not registered |

FIG. 12A

| Track Model | On Vehicle | Last Inspection Date | Track Status | Notes |
|---|---|---|---|---|
| Camso HXD 450x44x86 HHBE | TTR2 | 05/27/2018 | OK | - Two weeks before critical<br>- Maintenance scheduled<br>- Communicated to service centre ID 45NC |
| Camso HXD 450x44x86 HHBE | TTR4 | 06/11/2018 | OK | - Normal operation<br>- No service scheduled |
| Camso HXD 450x44x86 HHBE | TTR5 | 02/02/2012 | SERVICE REQUIRED | - Two years before critical |
| Camso HXD 450x44x86 HHBE | TTR6 | 02/07/2018 | SERVICE SCHEDULED | - Normal Operation<br>- No service scheduled |
| Camso HXD 450x44x86 HHBE | TTR | NULL | NULL | Added to fleet 13/02/2019 |

FIG. 12B

| Vehicle Model | Track Model | Last Inspection Date | Track Status | Notes |
|---|---|---|---|---|
| TractorCorp 300SE TWD | Camso HXD 450x44x86 HHBE | 05/27/2018 | OK | - Two weeks before critical<br>- Maintenance scheduled<br>- Communicated to service centre ID 45NC |
| TractorCorp 300SE TWD | Camso HXD 450x44x86 HHBE | 06/11/2018 | OK | - Normal operation<br>- No service scheduled |
| TractorCorp 300SE TWD | Camso HXD 450x44x86 HHBE | 02/02/2012 | SERVICE REQUIRED | - Two years before critical |
| TractorCorp 300SE TWD | Camso HXD 450x44x86 HHBE | 02/07/2018 | SERVICE SCHEDULED | - Normal Operation<br>- No service scheduled |
| TractorCorp 300SE TWD | Camso HXD 450x44x86 HHBE | NULL | NULL | Added to fleet 13/02/2019 |

FIG. 12C

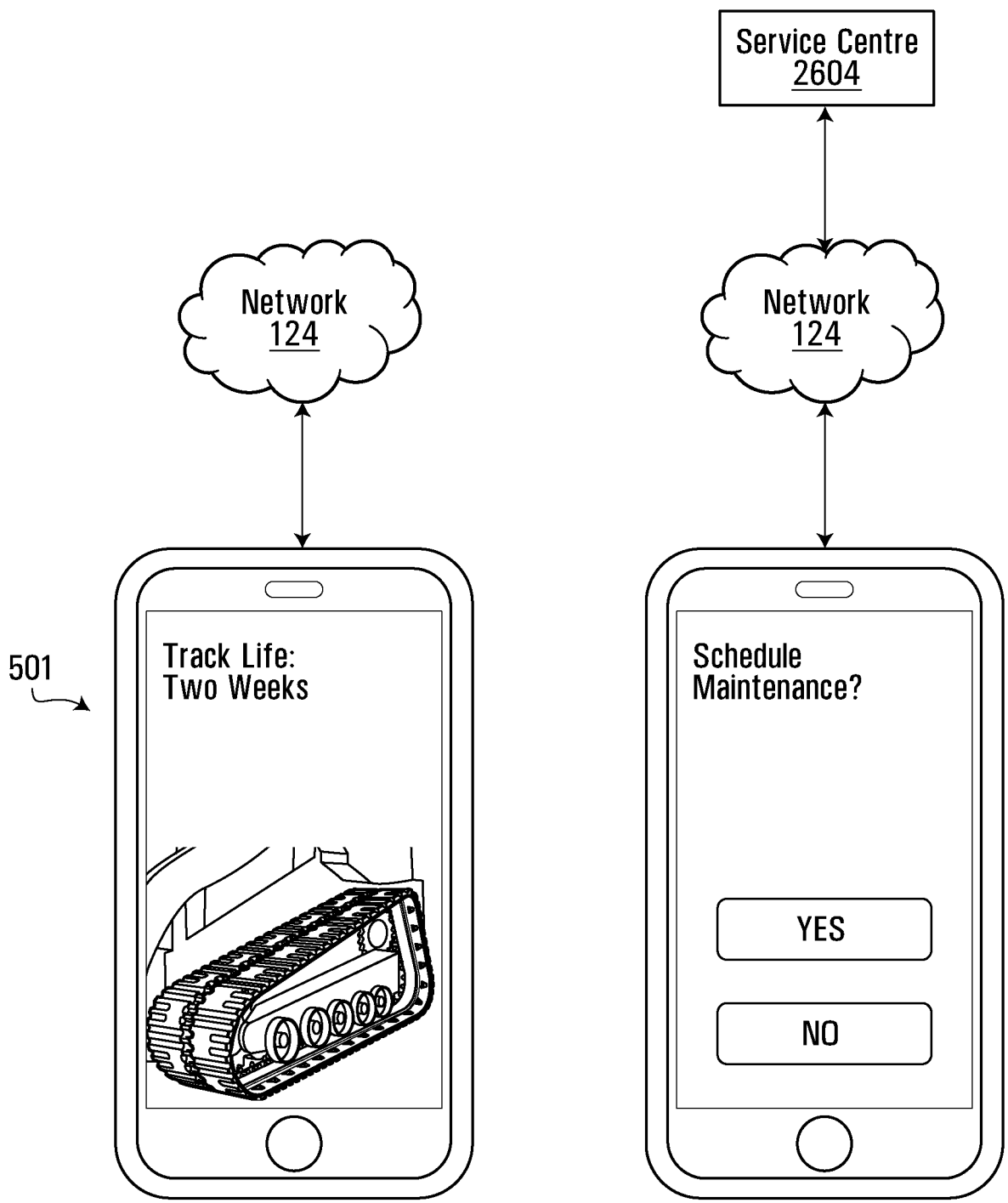
FIG. 24     FIG. 25

SYSTEMS AND METHODS FOR MONITORING TRACKED VEHICLES

CROSS-REFERENCE TO RELATED APPLICATIONS

This application is a National Stage of international PCT Patent Application No. PCT/CA2019/051217 filed on Aug. 30, 2019, which claims the benefit of U.S. Provisional Patent Application Ser. No. 62/724,846, filed on Aug. 30, 2018 and U.S. Provisional Patent Application Ser. No. 62/861,677, filed on Jun. 14, 2019. The contents of the aforementioned applications are incorporated by reference herein.

FIELD

This disclosure relates generally to tracked vehicles (e.g., agricultural vehicles or other industrial vehicles, etc.) and, more particularly, to monitoring track systems of such vehicles.

BACKGROUND

Off-road vehicles, including industrial vehicles such as agricultural vehicles (e.g., tractors, harvesters, combines, etc.), construction vehicles (e.g., loaders, excavators, bulldozers, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), are used on soft, slippery and/or irregular grounds (e.g., soil, mud, sand, ice, snow, etc.) for work and/or other purposes. To enhance their traction and floatation on such grounds, certain off-road vehicles are equipped with track systems. In some cases, off-road vehicles may also be operable on paved roads.

For example, agricultural vehicles can travel in agricultural fields to perform agricultural work and possibly on paved roads (e.g., to travel between agricultural fields). Numerous factors affect performance of the agricultural vehicles and efficiency of agricultural work they do, including their components (e.g., track systems) and their environments (e.g., grounds on which they operate). While some of these factors may be managed by users (e.g., operators) of the agricultural vehicles, this may lead to suboptimal agricultural work, greater wear or other deterioration of components of the agricultural vehicles, and/or other issues in some cases.

Similar considerations may arise in relation to other off-road vehicles (e.g., construction vehicles, snowmobiles, ATVs, etc.) in some cases.

For these and other reasons, there is a need to improve monitoring tracks and track systems of off-road vehicles.

SUMMARY

In accordance with various aspects of this disclosure, a vehicle (e.g., an agricultural vehicle or other off-road vehicle) comprising a track system can be monitored to obtain information regarding the vehicle, including information regarding the track system, such as an indication of a physical state (e.g., wear, damage and/or other deterioration) of a track and/or other component of the track system based on at least one image of the track and/or other component of the track system, respectively, which can be used for various purposes, such as, for example, to: convey the information to a user (e.g., an operator of the vehicle); control the vehicle (e.g., a speed of the vehicle, operation of a work implement, etc.); transmit the information to a remote party (e.g., a provider such as a manufacturer or distributor of the track system, the track and/or another component thereof, and/or of the vehicle; a service provider for servicing (e.g., maintenance or repair of) the track system, the track and/or another component thereof, etc.).

In accordance with an aspect, this disclosure relates to a system for monitoring a track for traction of a vehicle. The system comprises an interface configured to receive data regarding at least one image of the track. The system also comprises a processor configured to process the data regarding the at least one image of the track to obtain an indication of a physical state of the track, and to generate a signal based on the indication of the physical state of the track.

In accordance with another aspect, this disclosure relates to a method of monitoring a track for traction of a vehicle. The method comprises receiving data regarding at least one image of the track. The method also comprises processing the data regarding the at least one image of the track to obtain an indication of a physical state of the track. The method also comprises generating a signal based on the indication of the physical state of the track.

In accordance with yet another aspect, this disclosure relates to a system for monitoring a component of a track system for traction of a vehicle. The system comprises an interface configured to receive data regarding at least one image of the component of the track system. The system also comprises a processor configured to process the data regarding the at least one image of the component of the track system to obtain an indication of a physical state of the component of the track system. The processor is also configured to generate a signal based on the indication of the physical state of the component of the track system.

In accordance with yet another aspect, this disclosure relates to method of monitoring a component of a track system for traction of a vehicle. The method comprises receiving data regarding at least one image of the component of the track system. The method also comprises processing the data regarding the at least one image of the component of the track system to obtain an indication of a physical state of the component of the track system. The method also comprises generating a signal based on the indication of the physical state of the component of the track system.

In accordance with yet another aspect, this disclosure relates to a track system monitoring system. The system comprises an image data capture device configured to capture image data relating to a track system component. The system also comprises an image processing device, in data communication with the image capture device. The image processing device is configured to receive captured image data from the image data capture device and process the captured image data to determine at least one physical characteristic of the track system component.

In accordance with yet another aspect, this disclosure relates to track system monitoring system. The system comprises a 3D scanning device configured to generate a 3D scan relating to a track system component. The system also comprises a processing device, in data communication with the 3D scanning device. The processing device is configured to receive the 3D scan from the 3D scanning device and process the 3D scan to determine at least one physical characteristic of the track system component.

In accordance with yet another aspect, this disclosure relates to a track system monitoring system. The system comprises an image data capture device configured to capture image data relating to a track system component. The system also comprises an image processing device in data communication with the image capture device. The image processing device is configured to receive captured image data from the image data capture device and generate a 3D model of at least a portion of the track system component based on the image data. The image processing device is also configured to compare the 3D model to at least one known 3D model of a track system component to determine at least one aspect of the physical state of the track system component.

BRIEF DESCRIPTION OF THE DRAWINGS

A detailed description of embodiments is provided below, by way of example only, with reference to accompanying drawings, in which:

FIG. 12 A to C illustrate representations of different databases according to various embodiments;

FIG. 24 shows the communication of a result in a system according to one embodiment;

FIG. 25 shows scheduling of maintenance according to one embodiment;

DETAILED DESCRIPTION OF EMBODIMENTS

Figure 1:
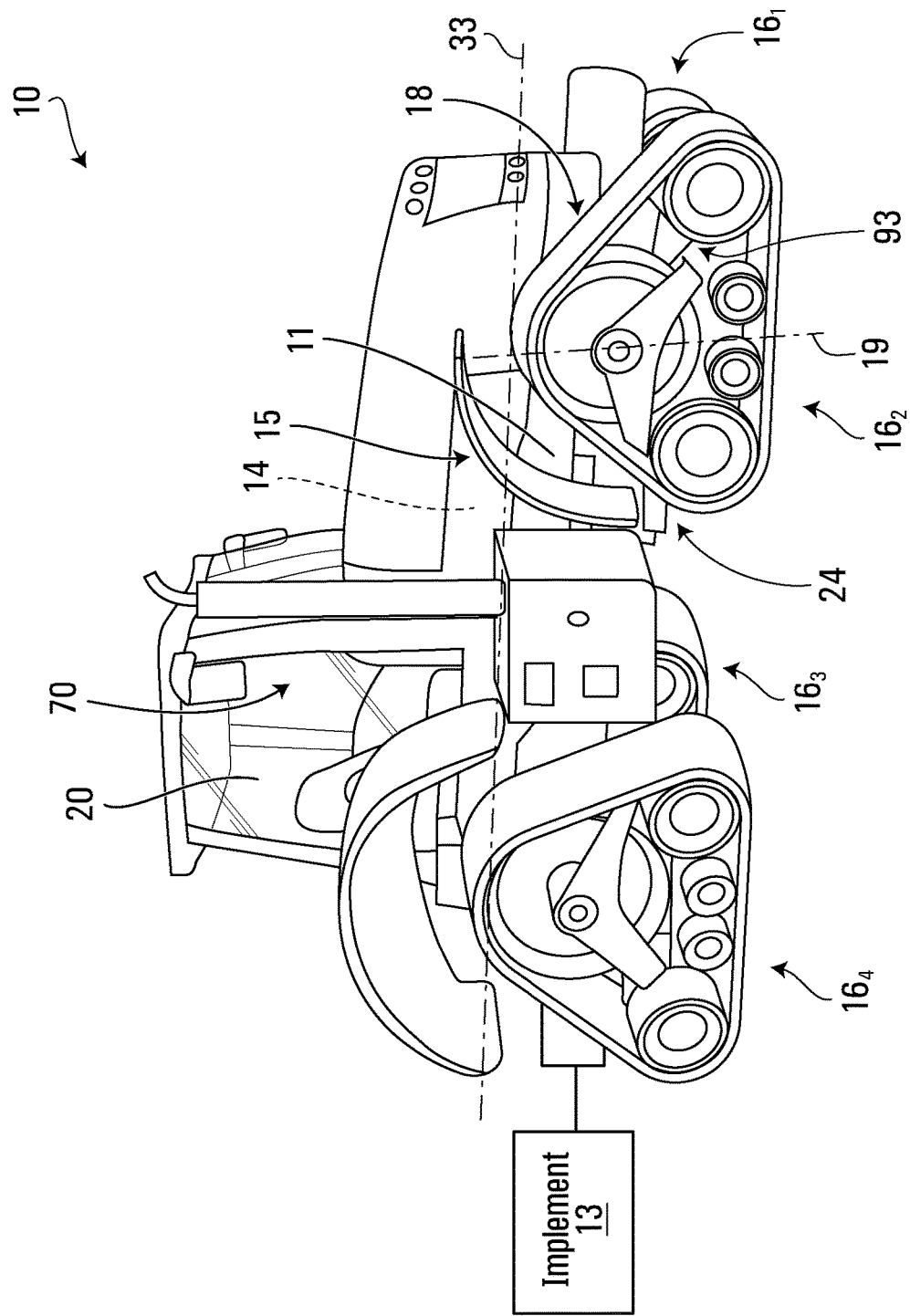
FIG. 1 shows an example of an embodiment of a vehicle comprising track systems.

FIG. 1 shows an example of a vehicle 10 comprising example track systems $16_1$-$16_4$. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a harvester, a planter, or any other type of agricultural vehicle.

In this embodiment, the vehicle 10 comprises a frame 11, a powertrain 15, a steering mechanism 18, a suspension 24, and an operator cabin 20 that enable a user to move the vehicle 10 on the ground, including on an agricultural field and possibly on a paved road (e.g., between agricultural fields), using the track systems $16_1$-$16_4$ and perform work using a work implement 13.

As further discussed later, in this embodiment, the agricultural vehicle 10, including the track systems $16_1$-$16_4$, can be monitored (e.g., while the agricultural vehicle 10 is parked, inspected or otherwise at rest and/or during operation of the agricultural vehicle 10) to obtain information regarding the agricultural vehicle 10, including information regarding the track systems $16_1$-$16_4$, such as indications of physical states of tracks and/or other components of the track systems $16_1$-$16_4$ (e.g., information indicative of wear or other degradation thereof) that is derivable from one or more images of the tracks and/or other components of the track systems $16_1$-$16_4$, which can be used for various purposes, such as, for example, to: convey the information to a user (e.g., the operator); control the agricultural vehicle 10 (e.g., a speed of the agricultural vehicle 10, operation of the work implement 13, etc.); transmit the information to a remote party (e.g., a provider such as a manufacturer or distributor of the track systems $16_1$-$16_4$ or their tracks or other components and/or of the agricultural vehicle 10; a service provider for servicing (e.g., maintenance or repair of) the track system, the track and/or another component thereof, etc.); etc. This may be useful, for example, to gain knowledge about the agricultural vehicle 10, the track systems $16_1$-$16_4$, and/or their environment to enhance efficiency of agricultural work performed by the agricultural vehicle 10 and to help prevent excessive wear or other deterioration of the track systems $16_1$-$16_4$, to schedule maintenance or replacement of the track system $16_1$-$16_4$ or individual components thereof, to effectively manage the wear of the track system $16_1$-$16_4$ or individual components thereof, for the agricultural vehicle 10 or a fleet of such agricultural vehicles, to achieve any of various other outcomes herein described, and/or for various other reasons.

The powertrain 15 is configured to generate power for the agricultural vehicle 10, including motive power for the track systems $16_1$-$16_4$ to propel the vehicle 10 on the ground. To that end, the powertrain 15 comprises a power source 14 (e.g., a primer mover) that includes one or more motors. For example, in this embodiment, the power source 14 comprises an internal combustion engine. In other embodiments, the power source 14 may comprise another type of motor (e.g., an electric motor) or a combination of different types of motor (e.g., an internal combustion engine and an electric motor). The powertrain 15 can transmit power from the power source 14 to one or more of the track systems $16_1$-$16_4$ in any suitable way (e.g., via a transmission, a differential, a direct connection, and/or any other suitable mechanism). In some embodiments, at least part of the powertrain 15 (e.g., a motor and/or a transmission) may be part of one or more of the track systems $16_1$-$16_4$.

The operator cabin 20 is where the user sits and controls the vehicle 10. More particularly, the operator cabin 20 comprises a user interface 70 allowing the user to steer the vehicle 10 on the ground, operate the work implement 13, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user.

The work implement 13 is used to perform agricultural work. For example, in some embodiments, the work implement 13 may include a combine head, a cutter, a scraper pan, a tool bar, a planter, or any other type of agricultural work implement.

The track systems $16_1$-$16_4$ engage the ground to provide traction to the vehicle 10. More particularly, in this embodiment, front ones of the track systems $16_1$-$16_4$ provide front traction to the vehicle 10, while rear ones of the track systems $16_1$-$16_4$ provide rear traction to the vehicle 10.

In this embodiment, each of the front ones of the track systems $16_1$-$16_4$ is pivotable relative to the frame 11 of the vehicle 10 about a steering axis 19 by the steering mechanism 18 (e.g., in response to input of the user at the steering device of the user interface 70) to change the orientation of that track system relative to the frame 11 in order to steer the vehicle 10 on the ground. The orientation of each of the front ones of the track systems $16_1$-$16_4$ relative to a longitudinal axis 33 of the vehicle 10, which defines a steering angle θ of that track system, is thus changeable. In this example, the steering mechanism 18 includes a steering unit 34 (e.g., comprising a steering knuckle) on each side of the vehicle 10 dedicated to each of the front ones of the track systems $16_1$-$16_4$ and defining the steering axis 19 for that track system. Each of the front ones of the track systems $16_1$-$16_4$ is therefore steerable.

Figure 2:
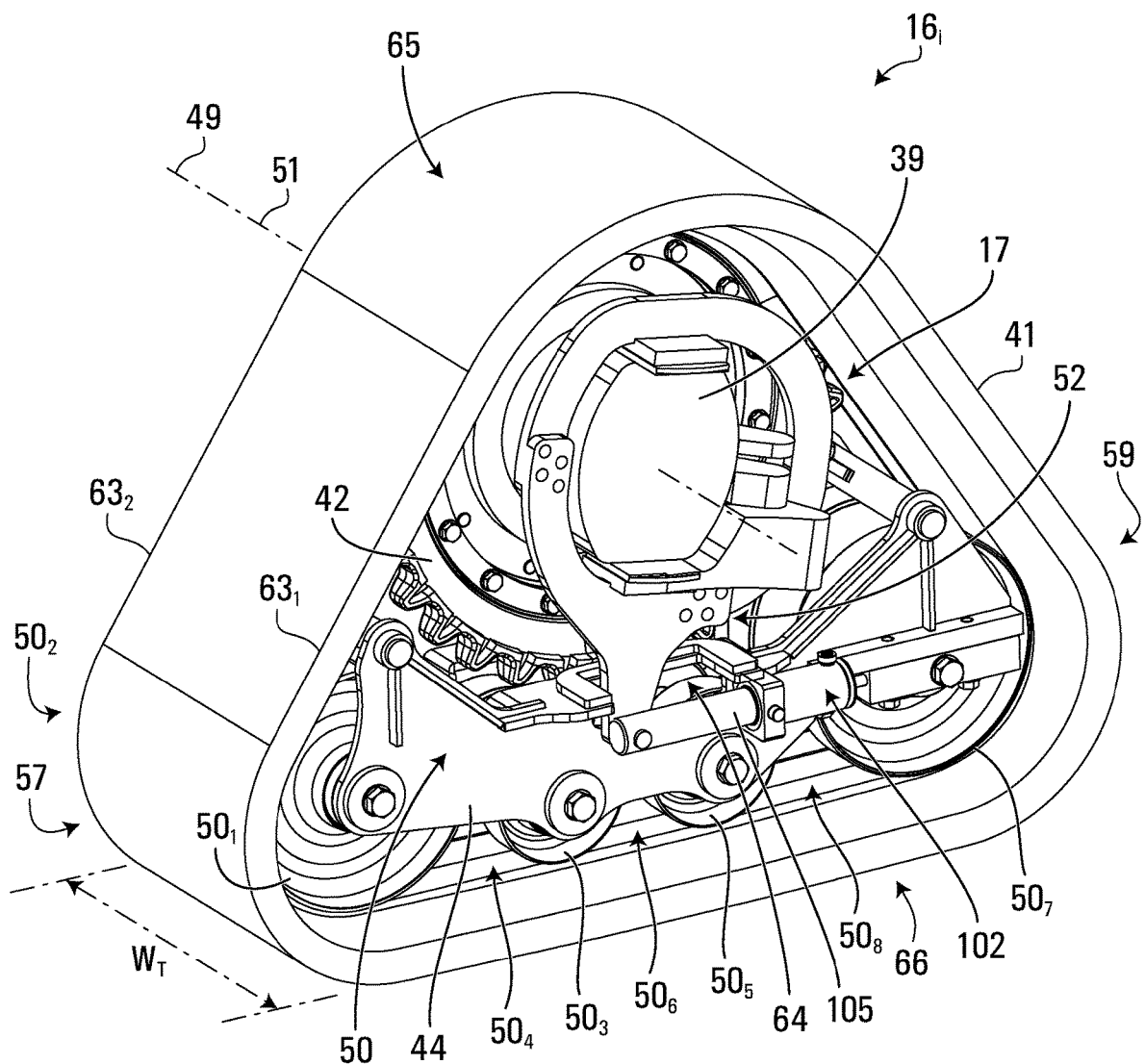
FIGS. 2 and 3 show a perspective view and a side view of a given one of the track systems.
Figure 3:
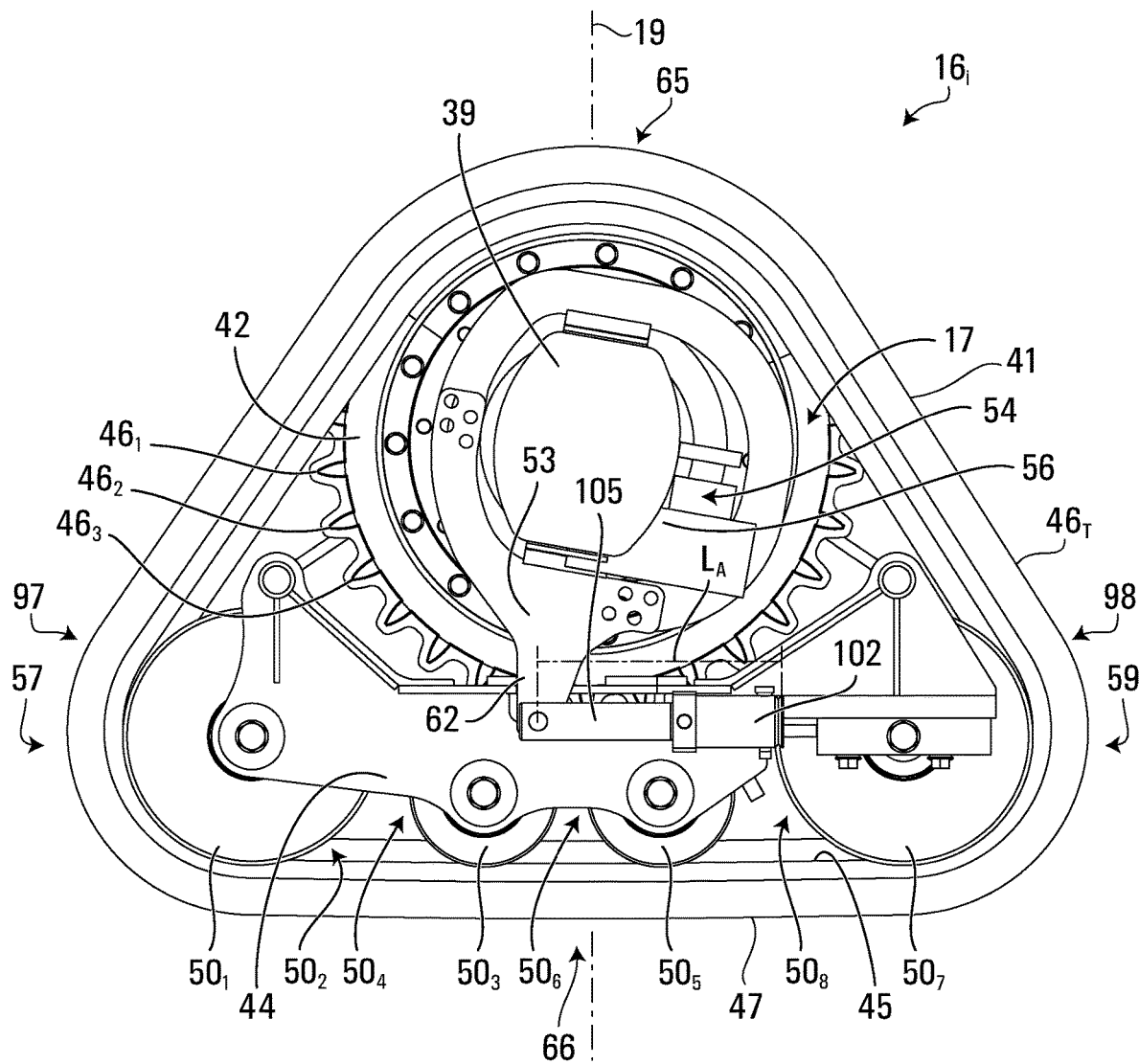
Figure 5:
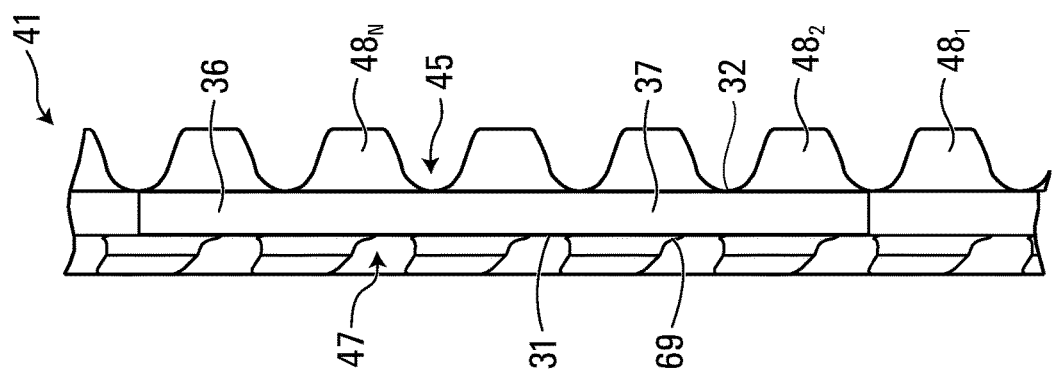
FIGS. 4 to 7 show an outer plan view, a side view, an inner plan view, and a cross-sectional view of a track of the given one of the track systems.
Figure 4:
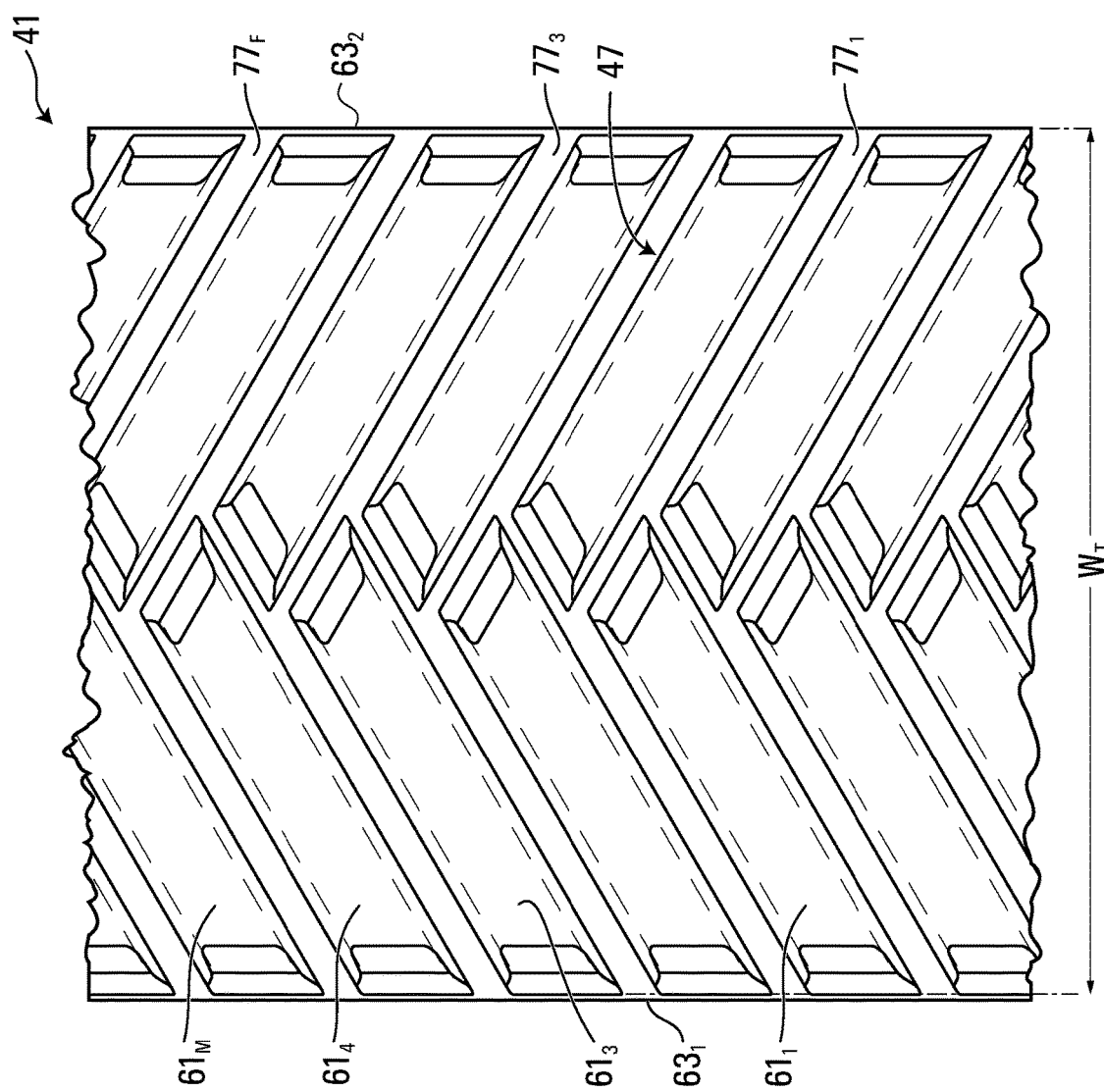
Figure 6:
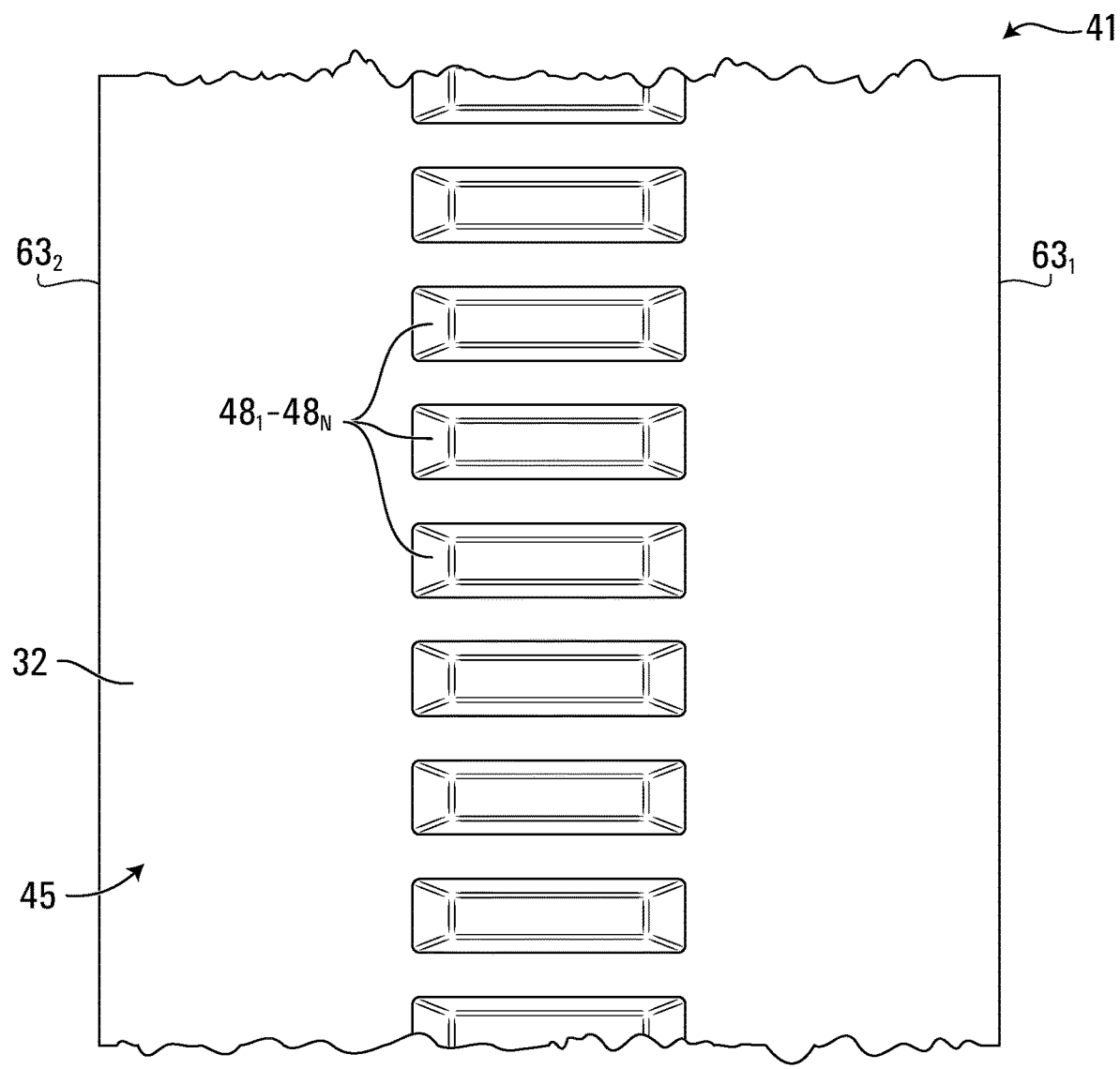
Figure 7:
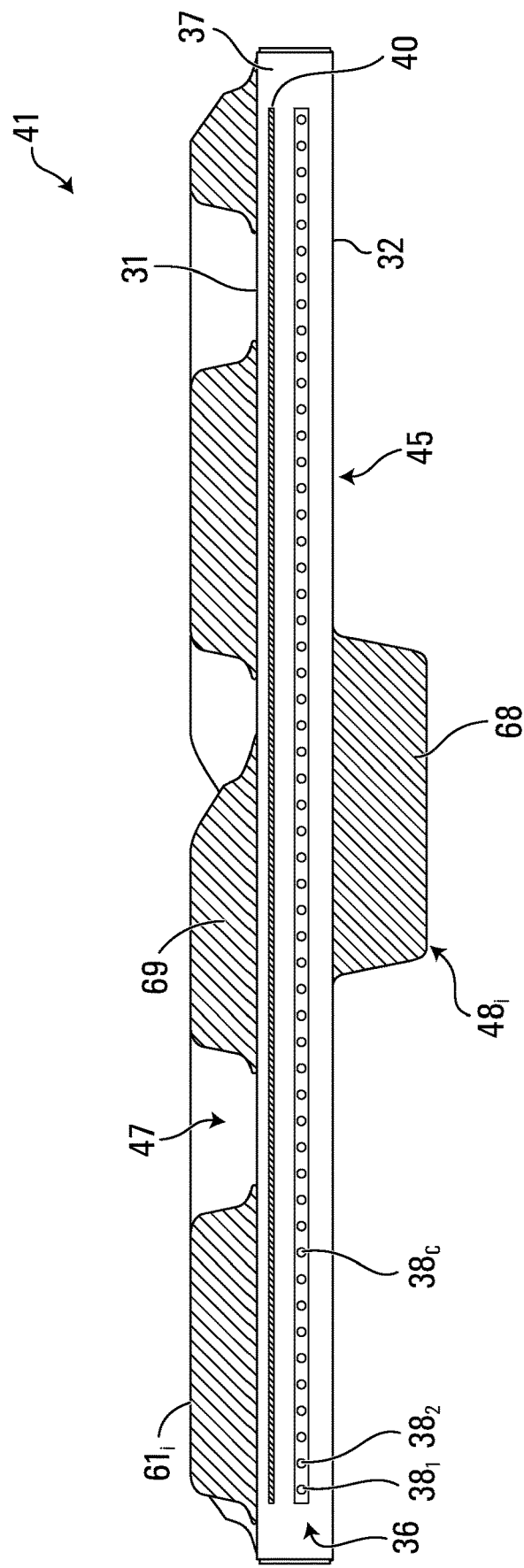

With additional reference to FIGS. 2 and 3, in this embodiment, each track system $16_i$ comprises a track 41 and a track-engaging assembly 17 that is configured to drive and guide the track 41 around the track-engaging assembly 17. In this example, the track-engaging assembly 17 comprises a frame 44 and a plurality of track-contacting wheels which includes a drive wheel 42 and a plurality of idler wheels $50_1$-$50_8$, which includes leading idler wheels $50_1$, $50_2$, trailing idler wheels $50_7$, $50_8$, and roller wheels $50_3$-$50_6$ between the leading idler wheels $50_1$, $50_2$ and the trailing idler wheels $50_7$, $50_8$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground to provide traction to the vehicle 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 4 to 7, the track 41 comprises an inner side 45 facing the wheels 42, $50_1$-$50_8$ and defining an inner area of the track 41 in which these wheels are located. The track 41 also comprises a ground-engaging outer side 47 opposite the inner side 45 for engaging the ground on which the vehicle 10 travels. Lateral edges $63_1$, $63_2$ of the track 41 define its width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

The track 41 is elastomeric, i.e., comprises elastomeric material, allowing it to flex around the wheels 42, $50_1$-$50_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_8$.

In this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_8$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_8$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the vehicle 10. In this example, the axis of rotation 49 corresponds to the axle of the vehicle 10. More particularly, in this example, the drive wheel 42 has a hub which is mounted to the axle of the vehicle 10 such that power generated by the power source 14 and delivered over the powertrain 15 of the vehicle 10 rotates the axle, which rotates the drive wheel 42, which imparts motion of the track 41.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_8$ are not driven by power supplied by the powertrain 15, but are rather used to do at least one of supporting part of a weight of the vehicle 10 on the ground via the track 41, guiding the track 41 as it is driven by the drive wheel 42, and tensioning the track 41. More particularly, in this embodiment, the leading and trailing idler wheels $50_1$, $50_2$, $50_7$, $50_8$ maintain the track 41 in tension, and can help to support part of the weight of the vehicle 10 on the ground via the track 41. The roller wheels $50_3$-$50_6$ roll on the inner side 45 of the track 41 along the bottom run 66 of the track 41 to apply the bottom run 66 on the ground. The idler wheels $50_1$-$50_8$ may be arranged in other configurations and/or the track system $16_i$ may comprise more or less idler wheels in other embodiments.

The frame 44 of the track system $16_i$ supports components of the track system $16_i$, including the idler wheels $50_1$-$50_8$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_7$, $50_8$ are mounted to the frame 44 in a rear longitudinal end region of the frame 44 proximate the rear longitudinal end 59 of the track system $16_i$. The roller wheels $50_3$-$50_6$ are mounted to the frame 44 in a central region of the frame 44 between the front idler wheels $50_1$, $50_2$ and the rear idler wheels $50_7$, $50_8$. Each of the roller wheels $50_3$-$50_6$ may be rotatably mounted directly to the frame 44 or may be rotatably mounted to a link which is pivotally mounted to the frame 44 to which is rotatably mounted an adjacent one of the roller wheels $50_3$-$50_6$ (e.g., forming a "tandem").

The frame 44 of the track system $16_i$ is supported at a support area 39. More specifically, in this embodiment, the frame 44 is supported by the axle of the vehicle 10 to which is coupled the drive wheel 42, such that the support area 39 is intersected by the axis of rotation 49 of the drive wheel 42.

In this example of implementation, the track system $16_i$ comprises a tensioner 93 for tensioning the track 41. For instance, in this embodiment, the tensioner 93 comprises an actuator (e.g., a hydraulic actuator) mounted at one end to the frame 44 of the track system $16_i$ and at another end to a hub of the leading idler wheels $50_1$, $50_2$. This allows the tensioner 93 to modify a distance between the front idler wheels $50_1$, $50_2$ and the rear idler wheels $50_7$, $50_8$ in the longitudinal direction of the track system $16_i$.

Figure 8:
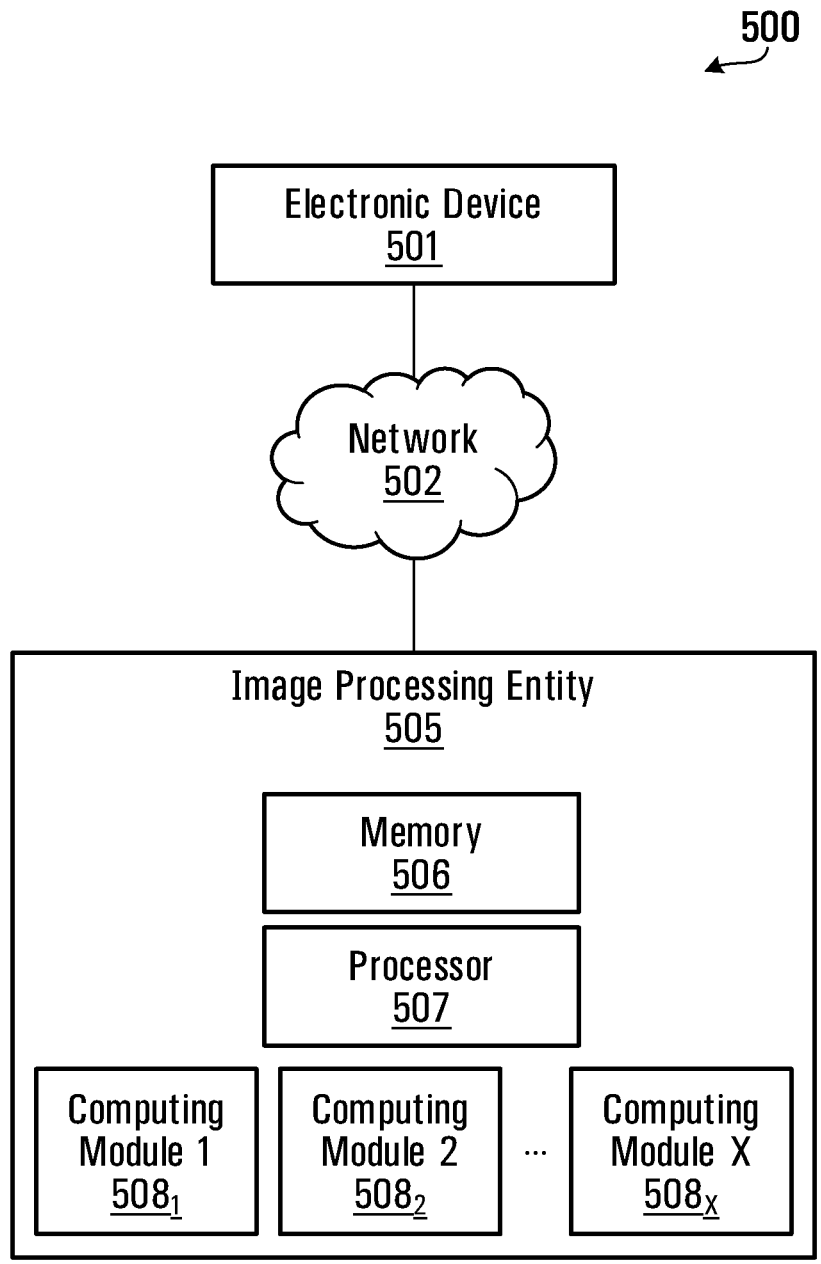
FIG. 8 shows a diagram of an image processing system according to one embodiment.

FIG. 8 shows a schematic block diagram of an image processing system 500 for use with a system 100 for monitoring off-road vehicles such as one or more track vehicles like the agricultural vehicle 10. In some embodiments, one or more images captured by an electronic device 501 can be processed using the image processing system 500. For example, in some embodiments, the electronic device 501 may transmit image information relating to a track or other component of a track system of a vehicle, such as the track 41 or another component of the track system $16_i$ of the vehicle 10, through a communication network 502, to an image processing entity 505 over a communication link, which may be implemented over a cellular network, a WiFi network or other wireless LAN, a WiMAX network or other wireless WAN, etc.

In some examples, the electronic device 501 can be a smartphone, a tablet, a smartwatch, a computer, etc., of a user, who may be the operator of the vehicle or another person having access to the vehicle. In other examples, the electronic device 501 may be integrated with the vehicle.

In some embodiments, the image processing entity 505 can be an application running on a server. In other embodiments, the image processing entity 505 can be a dedicated network appliance. In yet other embodiments, the image processing entity 505 may be an application running on the electronic device 501. In the embodiment of FIG. 8, the image processing entity 505 comprises a memory 506 for storing image information and instructions for processing images, a processor 507 implementing a plurality of computing modules $508_x$ (for example, Artificial Intelligence, or "AI", modules) for performing image recognition, pattern recognition and 3D model matching in order to assess a level and nature of wear, degradation and/or other deterioration of the track 41 or other track system component. In some embodiments, the computing modules $508_x$ can be implemented using a processor 507. In some embodiments, the computing modules $508_x$ me be implemented by way of an Application Program Interface (API) that results in the computing modules $508_x$ being implemented on a separate device or system.

Computing modules $508_x$ may for example be implemented using known computer vision products, such as, AutoML Vision™ and/or Vision API™, each provided by Google™. In other embodiments, computing modules $508_x$ may comprise standalone AI or machine-learning solutions forming part of image processing entity 505. As defined herein, AI refers to some implementation of artificial intelligence and/or machine learning (e.g., heuristics, support vector machines, artificial neural networks, convolutional neural networks, etc.) in software, hardware or some combination of both.

In some embodiments, complex algorithms, like artificial intelligence, are used to categorize what may be considered uncategorizable data. For example, the system 100 can be configured for generating conclusions about a physical state of a track based on one or more images of the track itself. This analysis can include whether or not there is a defect in the track, according to some embodiments. In some embodiments, this can include indications as to the physical state of the track and/or useful life remaining. As will be described below, a machine learning algorithm may be trained to identify a defect or other characteristic in a track by way of image analysis.

In some embodiments, computing modules $508_x$ are first taught how to identify parameters in a training mode (sometimes referred to as supervised learning mode). This is done by analyzing a given set of values, making quantitative comparisons, and cross-referencing conclusions with known results. Iterative refinement of these analyses and comparisons allows an algorithm to achieve greater predictive certainty. This process is continued iteratively until the solution converges or reaches a desired accuracy.

In this embodiment, computing modules $508_x$ can compare image data for a given track to a previously-analyzed mass of known data. When placed in a supervised learning mode, information can be generated from already populated track data provided to the computing modules $508_x$. For example, this data could contain images of tracks, along with determinations of the remaining life of the tracks. In other words, in the supervised learning mode, both the inputs and the outputs are provided to the system 100. The system 100 can process the given inputs and compare the calculated outputs according to its algorithm to the provided outputs. Based on this comparison, the system 100 can determine a metric to represent the percentage of error between calculated and provided outputs. Using this error metric, the system 100 can adjust its method of calculating an output. During training, the system 100 can continuously repeat analysis of different inputs and provided outputs in order to fine-tune its method of determining track information.

In some embodiments, while the computing modules $508_x$ may require initial supervised learning, as the computing modules $508_x$ continue to gain access to data, they may be able to further refine their predictive analytics based on new inputs. For example, if a user is able to confirm that an assessment (e.g. broken/exposed reinforcing cables $38_1$-$38_C$) or prediction (e.g. 6 months of use left in a given track) made by the system 100 is/was incorrect, the user can upload to the system 100 what the correct conclusion/prediction was. This allows the computing modules $508_x$ to continue to improve accuracy in their analysis.

In some embodiments, multiple computing modules $508_x$ can be configured to determine different characteristics of a given track. Each of these modules can offer a different analysis for a given input. The processor may direct these modules to be used independently or concurrently based on an operational parameter determined by a given user. For example, the system 100 may use a different analytical technique to determine track life compared to drive wheel misalignment. Based on an image communicated to the system 100 from an electronic device, the system 100 may analyze a given for track life, drive wheel misalignment, or other forms of wear and/or damage.

In some embodiments, the computing modules $508_x$ are configured to assess a level of wear, damage and/or other deterioration of the track 41 or other track system component. For example, a computing module $508_x$ can be configured to determine that the traction projections $61_1$-$61_M$ are worn to 30% of the level of wear that would require replacement of the track. In some embodiments, the computing modules $508_x$ are configured to assess the nature of damage to the track 41 or other track system component. For example, a computing module $508_x$ can be configured to determine that a midroller (or any other track system component, such as a sprocket) is damaged or missing.

In some embodiments, the computing modules $508_x$ are further configured to predict the cause of the wear and/or damage to the track 41 or other track system component. In one specific example, a computing module $508_1$ is configured to predict whether a specific wear pattern of the elastomeric material of a track 41 is caused by a misaligned drive wheel. In another specific example, a computing module $508_2$ is configured to predict whether a specific wear pattern of the elastomeric material of a traction projections $61_1$-$61_M$ is caused by excessive roading (i.e. traversing a paved road). In another specific example, another computing module $508_3$ is configured to predict whether a specific wear pattern of the track (e.g. the abnormal relative position of two adjoining track links) is caused by a broken reinforcing cable $38_1$-$38_C$. As will be appreciated, each computing module $508_x$ can be implemented using a combination of deep learning, supervised or unsupervised machine learning, image recognition and/or machine vision.

In some embodiments, the system 100 is configured to capture one or more 2D images to detect specific patterns of wear and/or damage. For example, the system 100 may be configured to implement one or more computer vision (CV) models to detect specific visible wear/damage features. Examples of such visible wear/damage features include, but are not limited to, broken and/or exposed reinforcing cables $38_1$-$38_C$, linear recesses in the carcass 36 caused by delamination and changes in the shape of drive wheel 42 (sprocket) teeth, evidencing sprocket tooth wear caused by debris and/or normal engagement with drive/guide lugs $48_1$-$48_N$.

In some embodiments, the image processing system 500 may produce a three-dimensional (3D) scan to generate a 3D model of at least part of the track 41 or other track system component. For example, in some embodiments, the image data received by the electronic device 501 or any other image capture means are processed by way of photogrammetry in order to create the 3D model of the track 41 and/or track component. In some embodiments, as described in more detail below, laser line scanners are instead used to generate the 3D model of the track 41 and/or track component.

Such precise 3D models can be compared to 3D models of unworn and/or undamaged tracks in order to precisely measure wear, damage and/or other deterioration. For example, by comparing the 3D model of a worn track 41 to the 3D model of a new, unworn track, it is possible to precisely measure a volumetric loss of material of the worn track 41, and thereby assess the wear and/or other deterioration of the worn track 41, very precisely.

Figure 38:
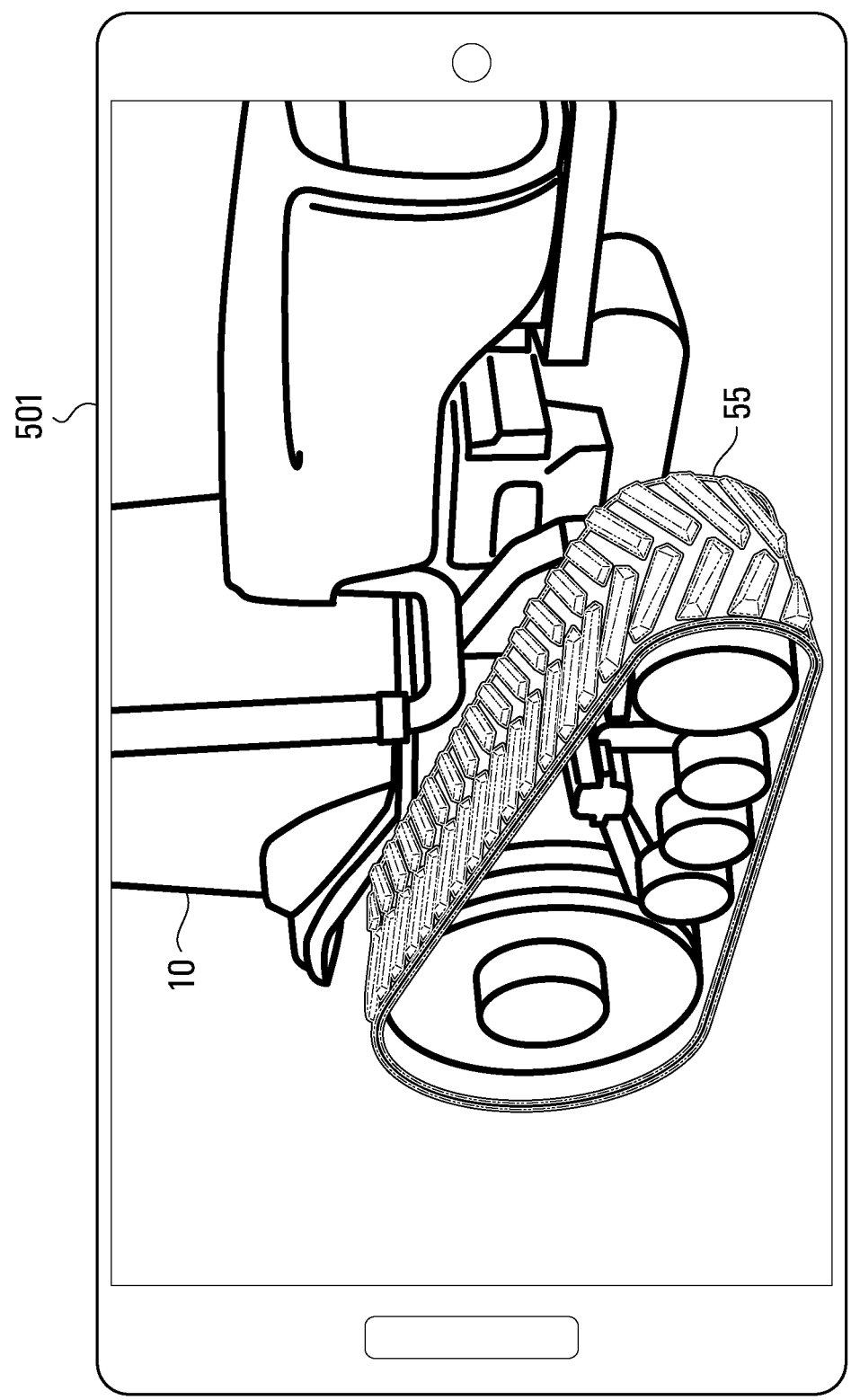
FIG. 38 shows an example 3D track model generated using the system described herein.

With reference to FIG. 38, in some embodiments, the system 100 may generate a 3D model 55 of a track 41, or track system $16_x$ component, using any of the above methods, or a combination thereof. In some embodiments, the system 100 can then be superimposed onto an image of the track 41 captured by electronic device 501. Such superimposition may be achieved using known augmented reality (AR) techniques and processes.

As described above, in some embodiments, the system 100 can implement a 2D recognition technique. In some embodiments, the system 100 can implement a 3D recognition technique. In some embodiments, the system 100 can implement a combination of a 2D recognition technique and a 3D recognition technique.

Figure 51:
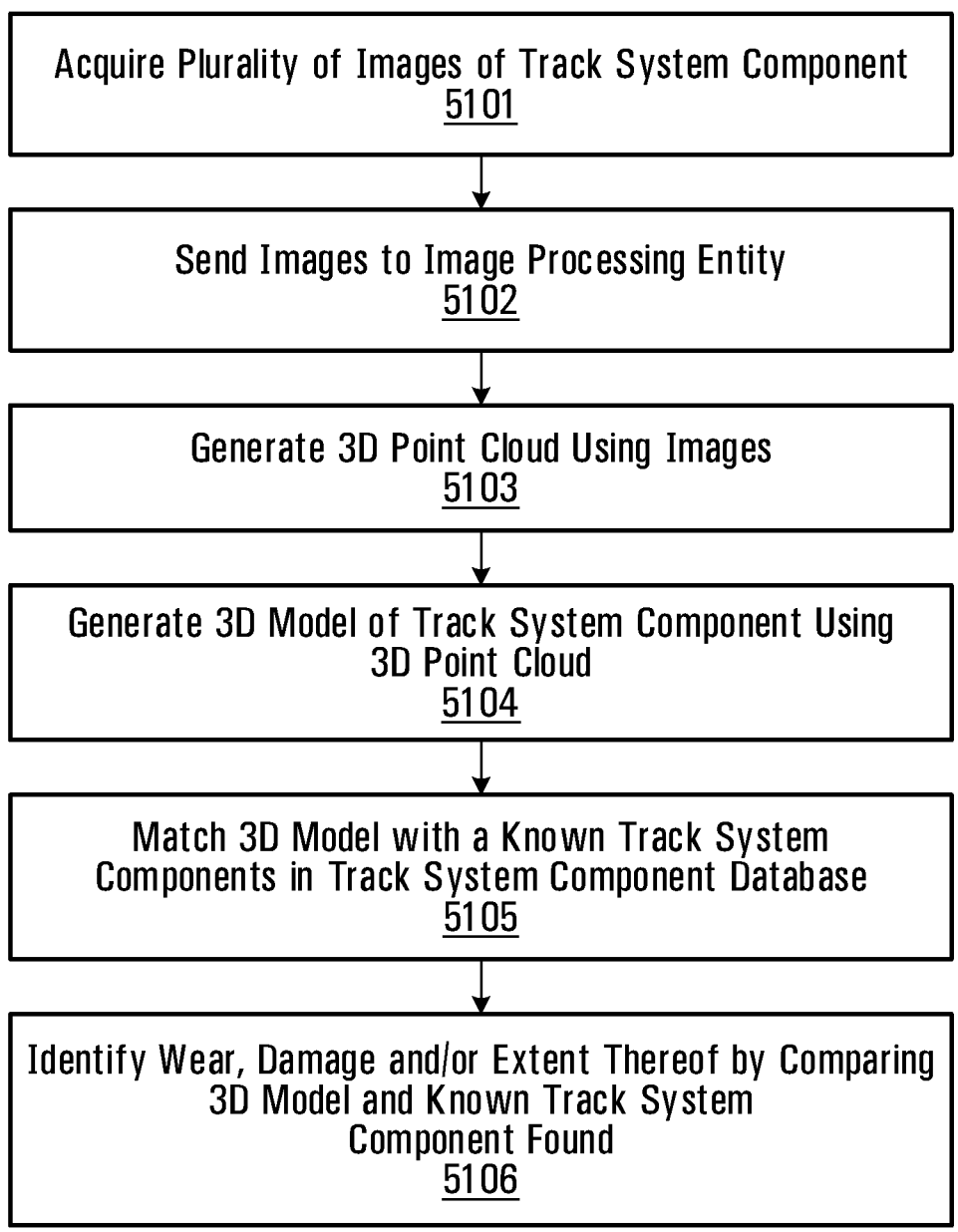
FIGS. 51 to 53 shows flowcharts of the use of a monitoring system, according to various embodiments.

In some embodiments, the 3D recognition technique used is based on generating a 3D model using a point cloud. For example, as shown in FIG. 51, method 5100 can be used to identify track component wear/damage and/or the extent thereof. At step 5010, a plurality of images of the track system component can be acquired using the electronic device 501, before sending the images to the image processing entity 505 at step 5102. At step 5103, the system 100 generates a 3D point cloud using the plurality of images. This can be accomplished by system 100 using, for example, open source algorithms, such as those available from Point Cloud Library (PCL). Alternatively, the point cloud can be generated a third party, through use of an Application Program Interface (API) by system 100. At step 5104, the system 100 uses the generated 3D point cloud to generate a 3D model of the track system component. Once generated, the 3D model is matched to known 3D models of track system components in a track system components database at step 5105. Once matched, at step 5106, wear, damage and/or the extent thereof can be identified by comparing the generated 3D model to the known 3D model, as described in more detail below.

2D recognition techniques include four basic steps, namely image acquisition, image processing, feature extraction and classification. Such techniques include, but are not limited to, Optical Character Recognition (OCR), feature detection, image gradient analysis, pattern recognition algorithms and feature/pattern classification algorithms.

Figure 52:
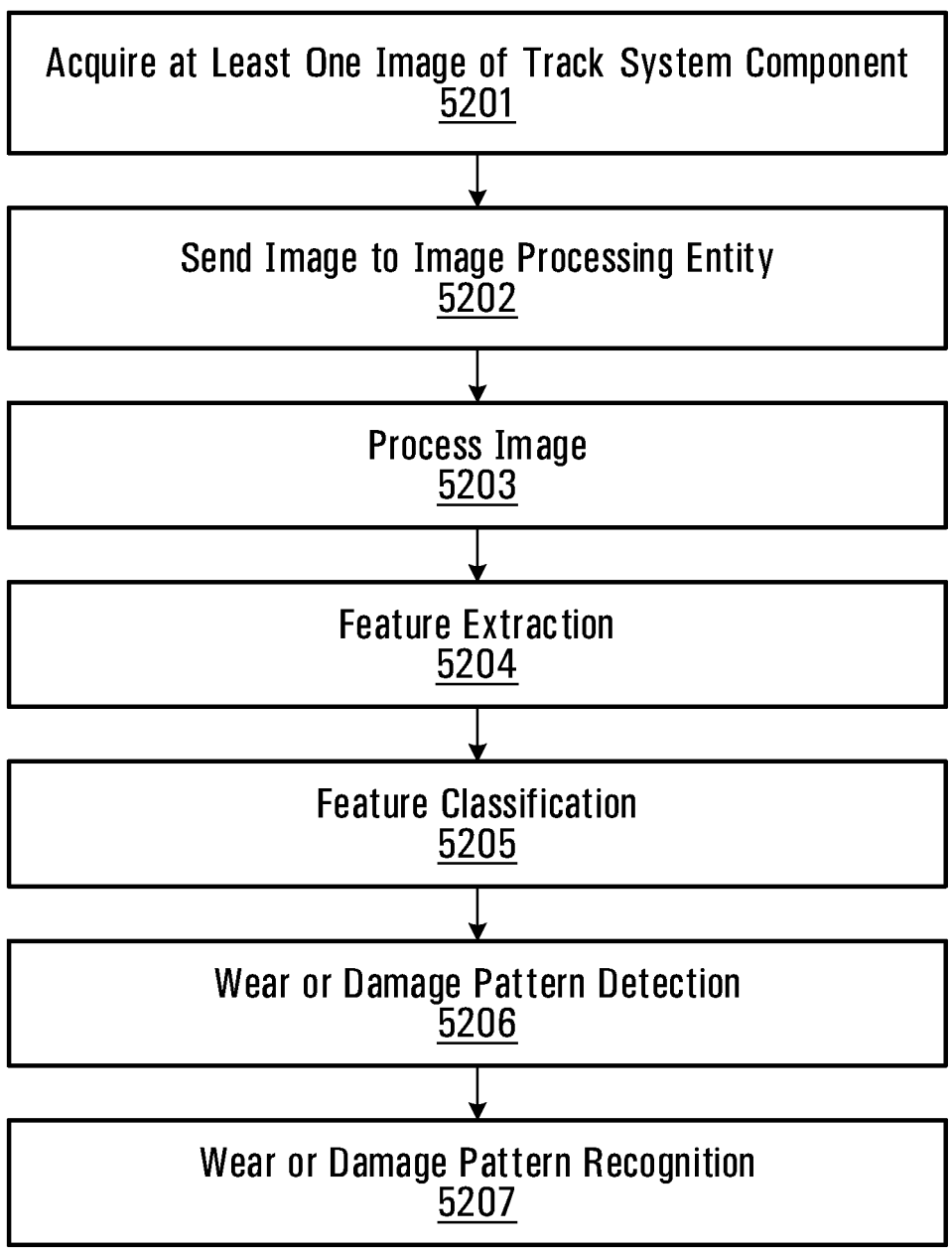

In some embodiments, the system 100 can be configured to implement the method of FIG. 52. In particular, at step 5201, the electronic device 501 can acquire one or more images of a track system component, before sending the images to the image processing entity 505 at step 5202. In some embodiments, the image processing entity 505 can perform image processing steps prior to feature extraction. For example, in some embodiments, the image processing entity 505 can be configured to perform image processing including the use of fiducial markers. Then, at step 5204, the image processing entity 505 can perform feature extraction in order to detect and isolate various portions or shapes (features) of the image or images. Feature extraction can include, but is not limited to, edge detection, corner detection, blob detection, ridge detection, scale-invariant feature transform, thresholding, blob extraction, Haar-like feature extraction, template matching, Hough transforms and generalized Hough transforms.

Then at step 5205, the system 100 can perform feature classification. In some embodiments, feature classification can include, but is not limited to, the use of nearest neighbor classification, cascading classifiers, neural networks, statistical classification techniques and/or Bayesian classification techniques. Once the features have been classified, it is possible to separate, at step 5206, features which represent undamaged/unused parts of the track system component, and features (e.g. cracks, exposed cables, etc.) which represent patterns of wear or damage. Once features relating to patterns of wear or damage have been detected, it is possible for the system 100 to perform further feature classification on the wear or damage pattern.

Figure 49:
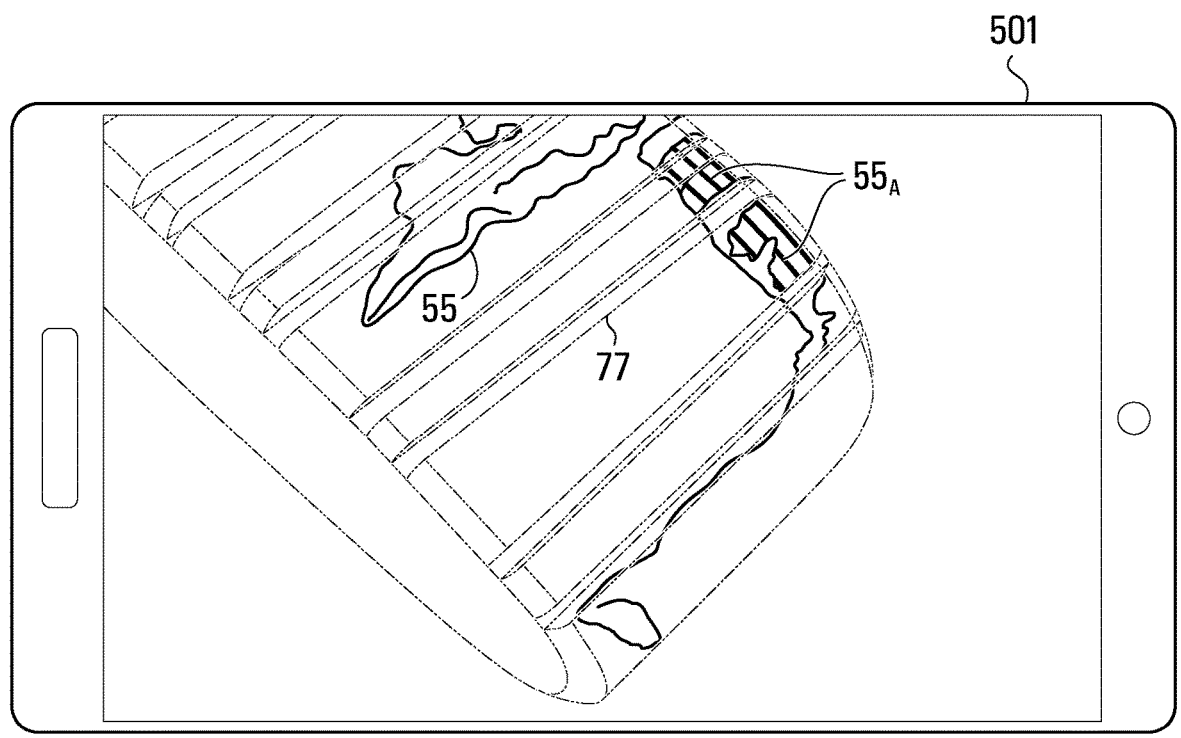
FIGS. 49 and 50 show examples of wear/damage being detected and characterized using 2D recognition techniques.
Figure 50:
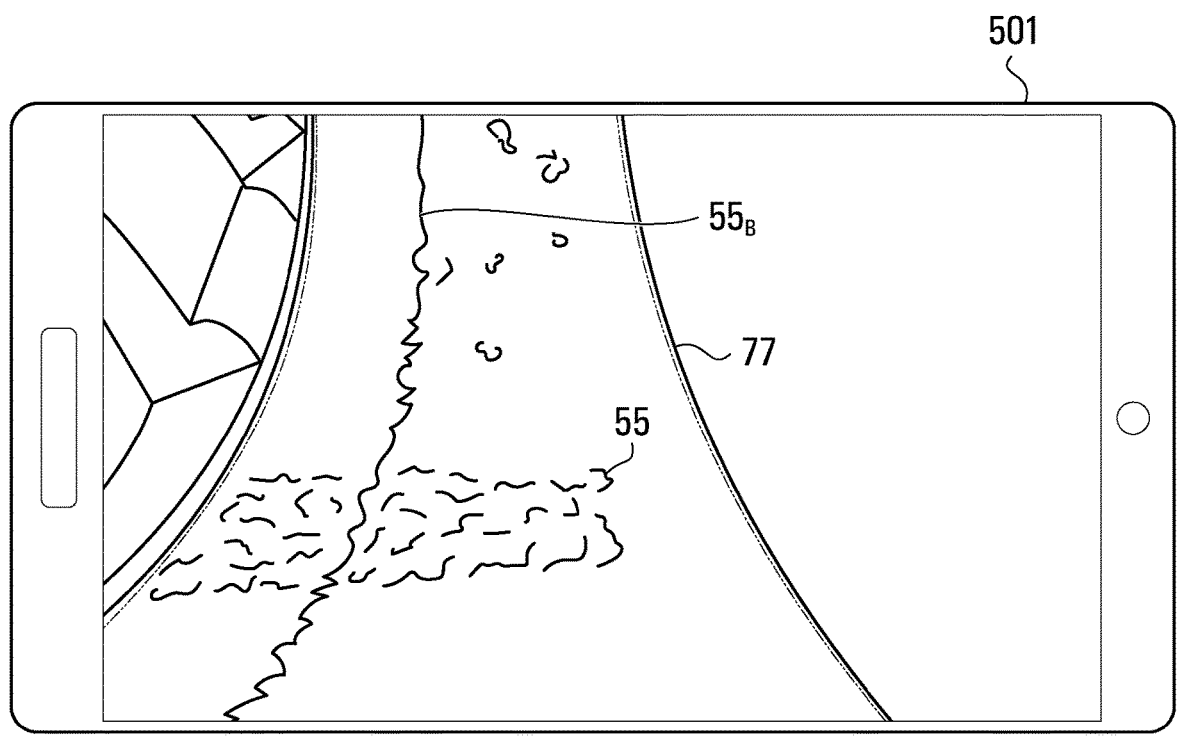

As shown in FIGS. 49 and 50, in some embodiments, system 100 is configured to use the system of FIG. 52 in order to detect damage or wear patterns in track system components. For example, as shown in FIG. 49, system 100 can be configured to detect partially embedded (though exposed) cables $55_A$ using the 2D analysis method described with reference to FIG. 52. Similarly, as shown in FIG. 50, system 100 can be configured to recognize a narrow (though potentially deep) crack $55_B$ in carcass 77. As will be appreciated by the skilled reader, such patterns are difficult to detect using volumetric analysis alone. As such, the 3D recognition techniques of the present disclosure can be combined with any of the 2D recognition techniques in order to facilitate track system component matching, as well as wear and/or damage recognition and characterization. Moreover, the 2D recognition techniques of the present disclosure can be used on images generated by the system 100 of various views of the 3D model generated using the 3D recognition techniques of the present disclosure.

Figure 53:
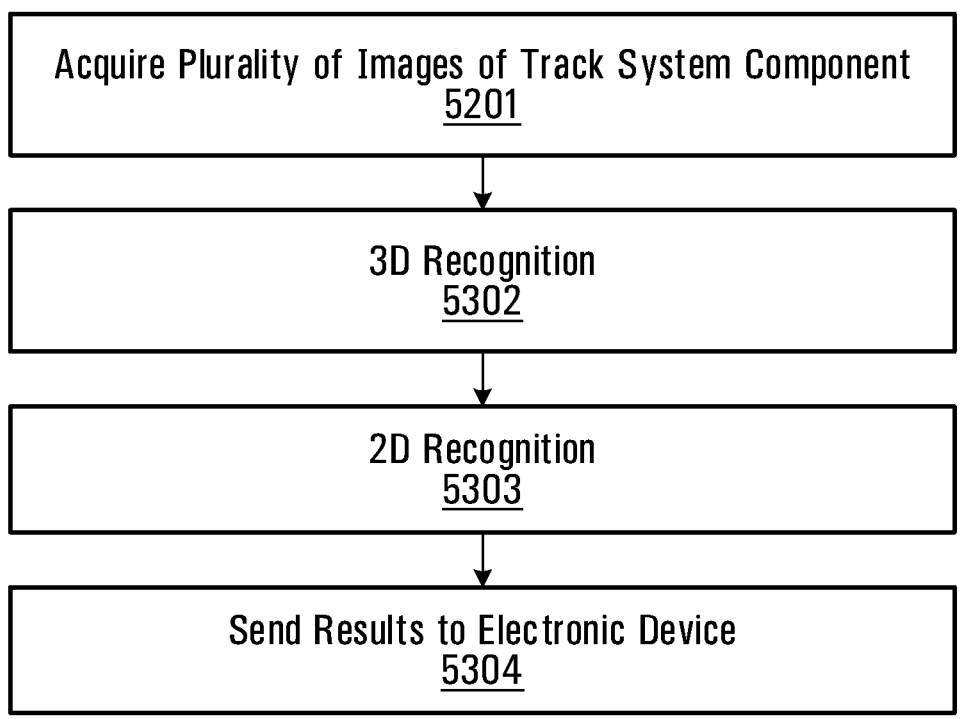

As shown in the method of FIG. 53, once a plurality of images are acquired at step 5201, the system 100 can sequentially use 3D recognition at step 5302 and then 2D recognition at step 5303 in order to detect patterns of wear and/or damage on a track system component. In some embodiments, 2D recognition may be performed before 3D recognition. Advantageously however, 3D recognition is performed first, as in such an arrangement, the system 100 may be configured to superimpose 2D features onto 3D models, thereby allowing a more precise classification of the type of wear and/or damage.

As shown in FIGS. 39 to 44, in some embodiments the system 100 is configured to generate a 3D model 55 of a used and/or damaged track and compare it to a 3D model 77 of an unused and undamaged track. The 3D model 77 of an unused and undamaged track may be generated by the system 100 based on a previously-scanned track, may be acquired by the system 100 from a database of 3D models of tracks, or may be acquired by the system in any other suitable way. Once the 3D model 77 of an unused and undamaged track is acquired or generated by the system 100, it can be compared to the 3D model 55 of a used and/or damaged track generated by the system 100 using various volumetric comparison techniques. For example, the system 100 may compare the models by calculating the amount of missing material of a given track feature (e.g. traction projections $61_1$-$61_M$). For example, volumetric comparison of the 3D model 55 of a used and/or damaged track and a 3D model 77 of an unused and undamaged track can establish that a given traction projection $61_x$ has been worn to 78% of its original volume.

In some embodiment, the cause and/or nature of the wear and/or damage of the track 41, or other track system component, can be established by the system 100 performing a volumetric comparison of the 3D model 55 of a used and/or damaged track and a 3D model 77 of an unused and undamaged track.

Figure 39:
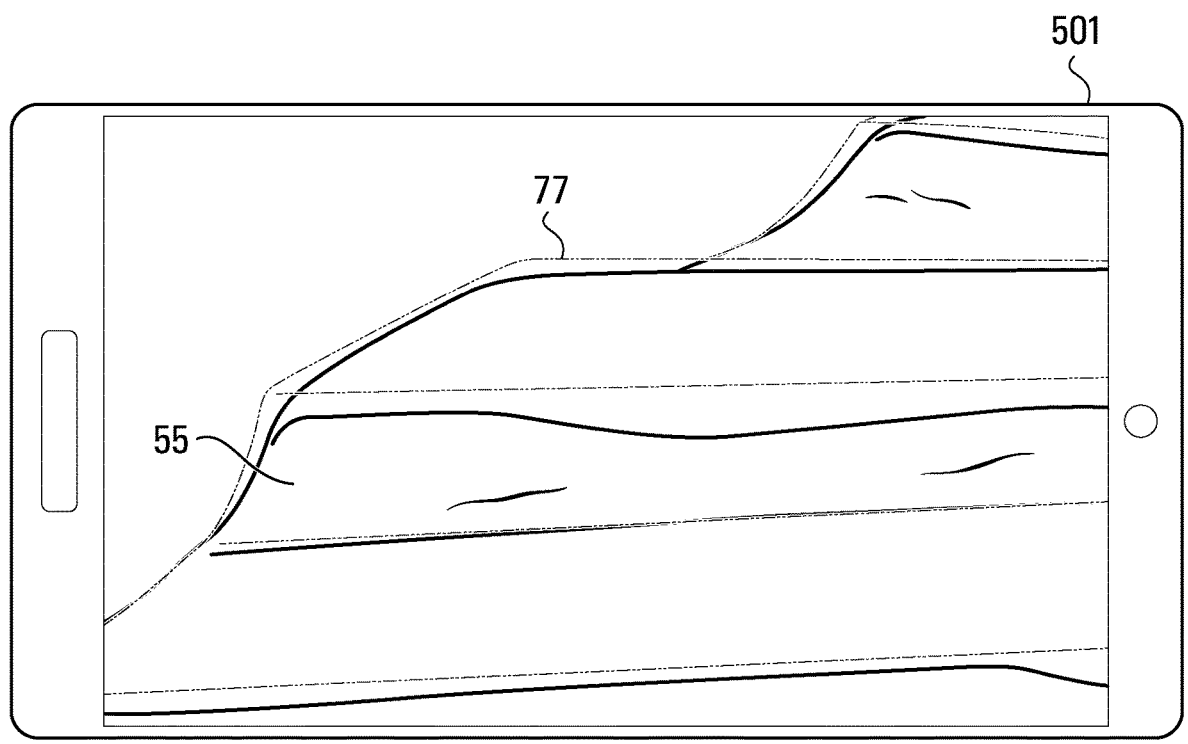
FIGS. 39 to 48 show example 3D track models of used and/or damaged tracks generated using the system described herein, overlaid by 3D track models of unused and/or undamaged track.
Figure 40:
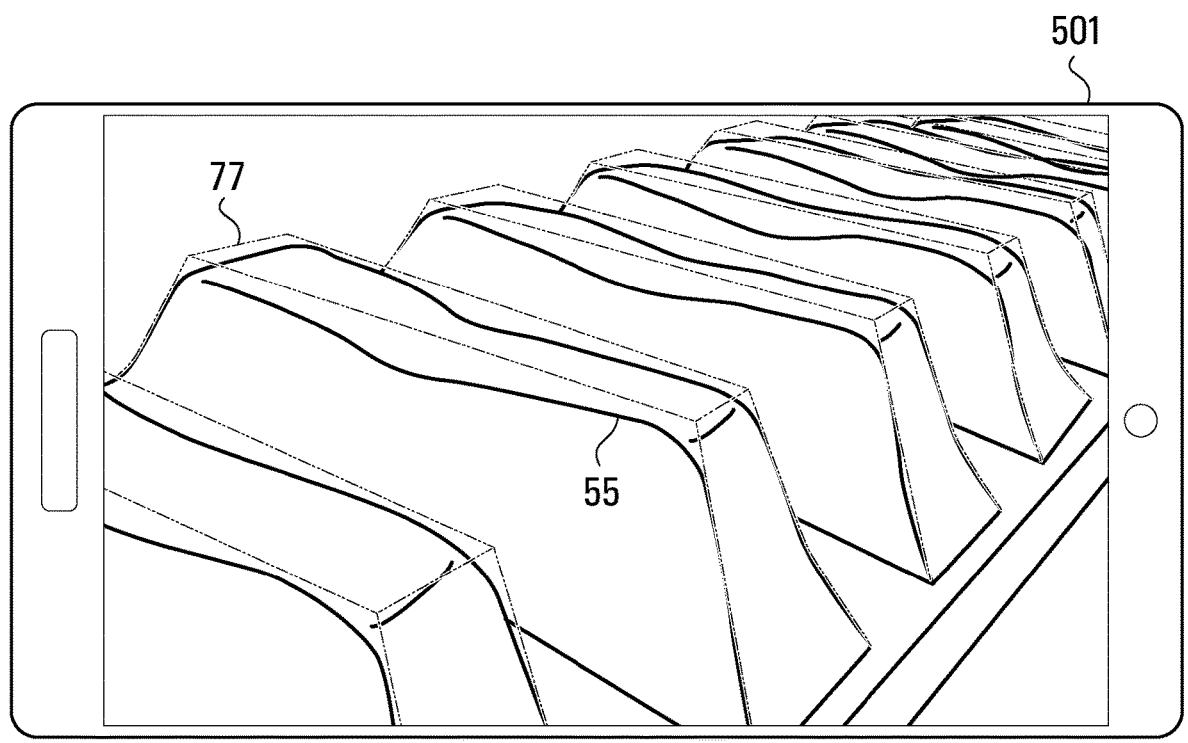

For example, as shown in FIGS. 39 and 40, based on a comparison of the 3D model 55 of a used track and a 3D model 77 of an unused track, in some embodiments the system 100 can determine a pattern of tread wear that is indicative of the cause and/or nature of the tread wear. In particular, the trailing edge wear pattern detected by the system 100 in the traction projections $61_1$-$61_M$ of FIG. 39 is typically caused by a weight balance bias towards the rear of a vehicle 41. The "wheel path" wear pattern detected by the system 100 in the traction projections $61_1$-$61_M$ of FIG. 40 is caused by an increase in wear in the area under the highest load (known as the wheel path).

Figure 41:
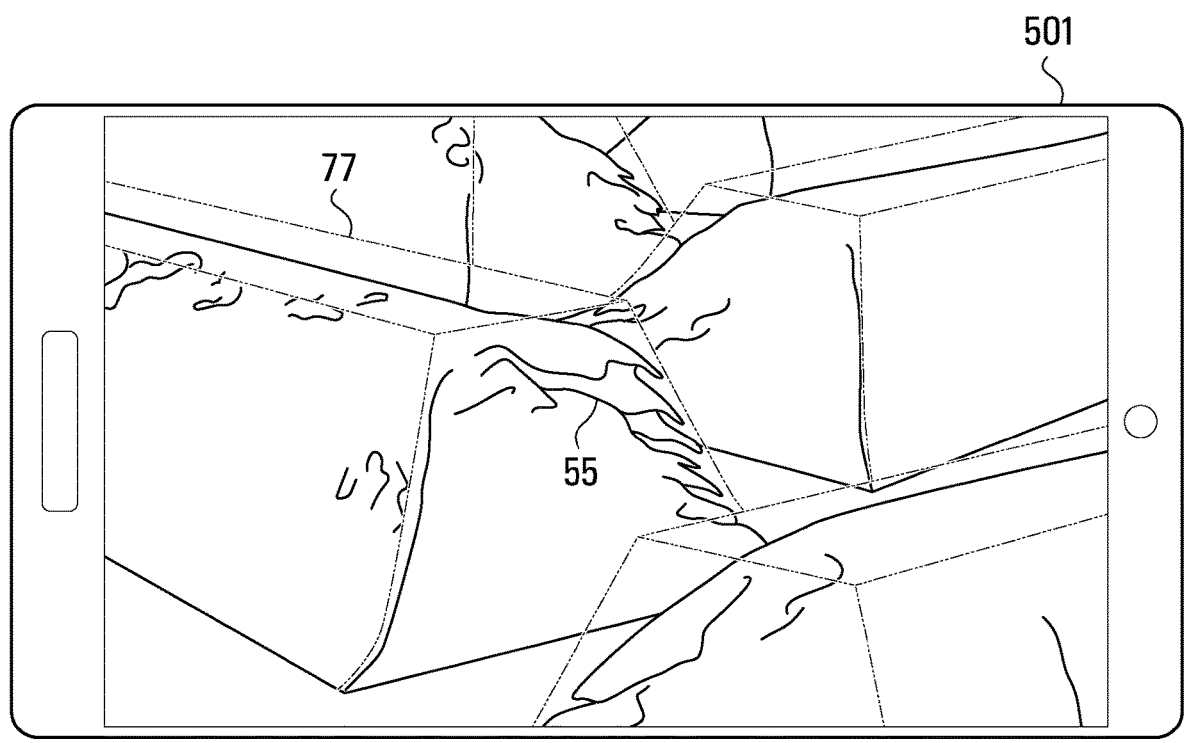
Figure 42:
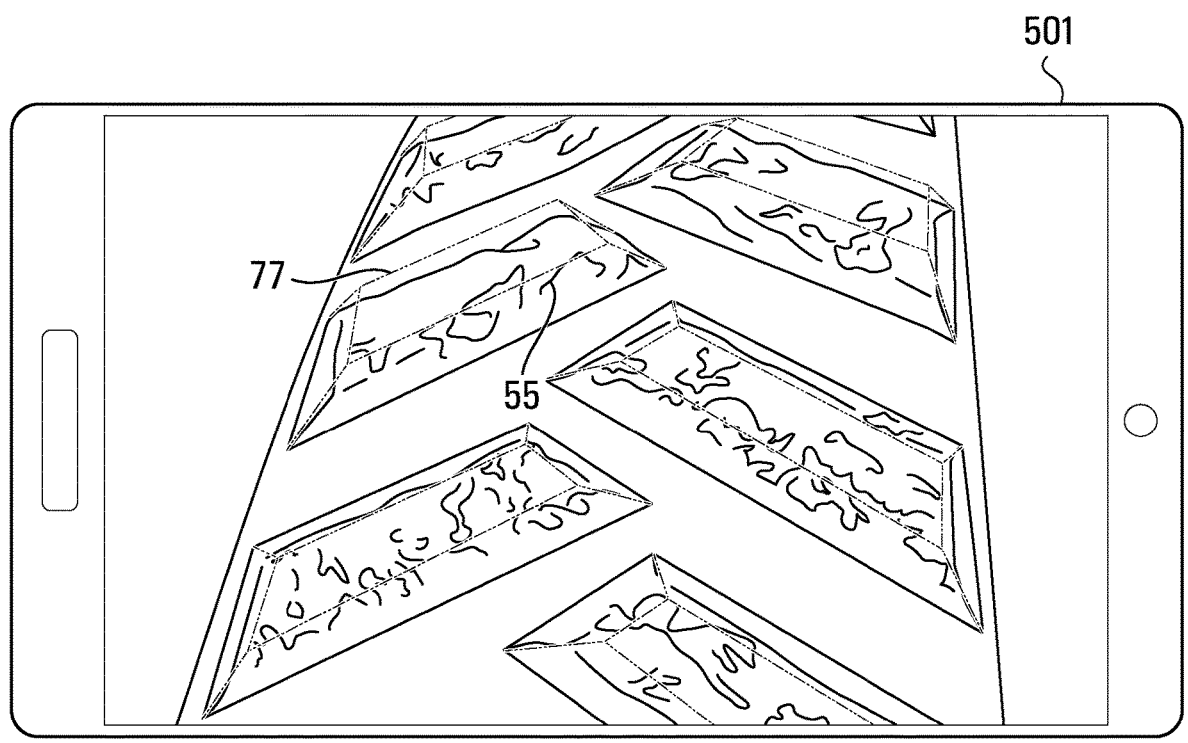

As shown in FIGS. 41 and 42, based on a comparison of the 3D model 55 of a damaged track and a 3D model 77 of an undamaged track, in some embodiments the system 100 can determine a pattern of damage that is indicative of the cause and/or nature of the damage. In particular, the minor delamination damage detected by the system 100 in the traction projections $61_1$-$61_M$ of FIG. 41 is typically caused by incomplete or improper curing, contamination of source material and/or poor quality source material. The "chunking" damage detected by the system 100 in the traction projections $61_1$-$61_M$ of FIG. 42 is typically caused by highly abrasive or hard/irregular ground conditions.

Figure 43:
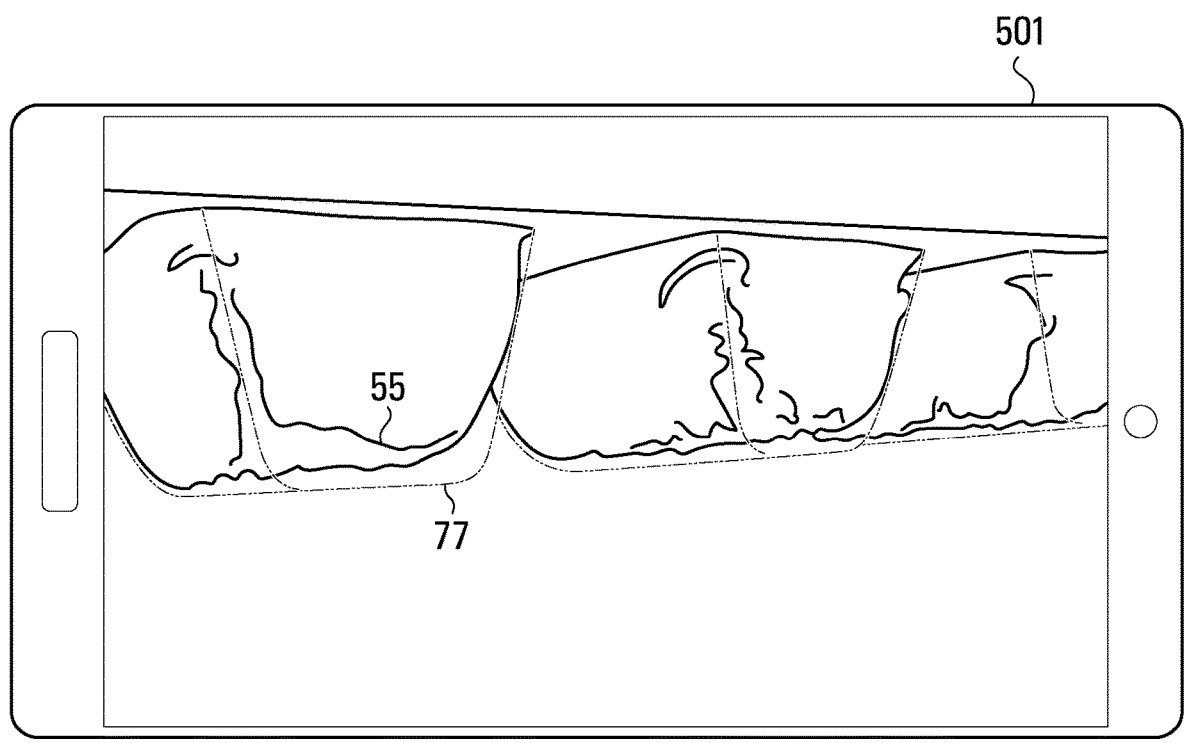
Figure 44:
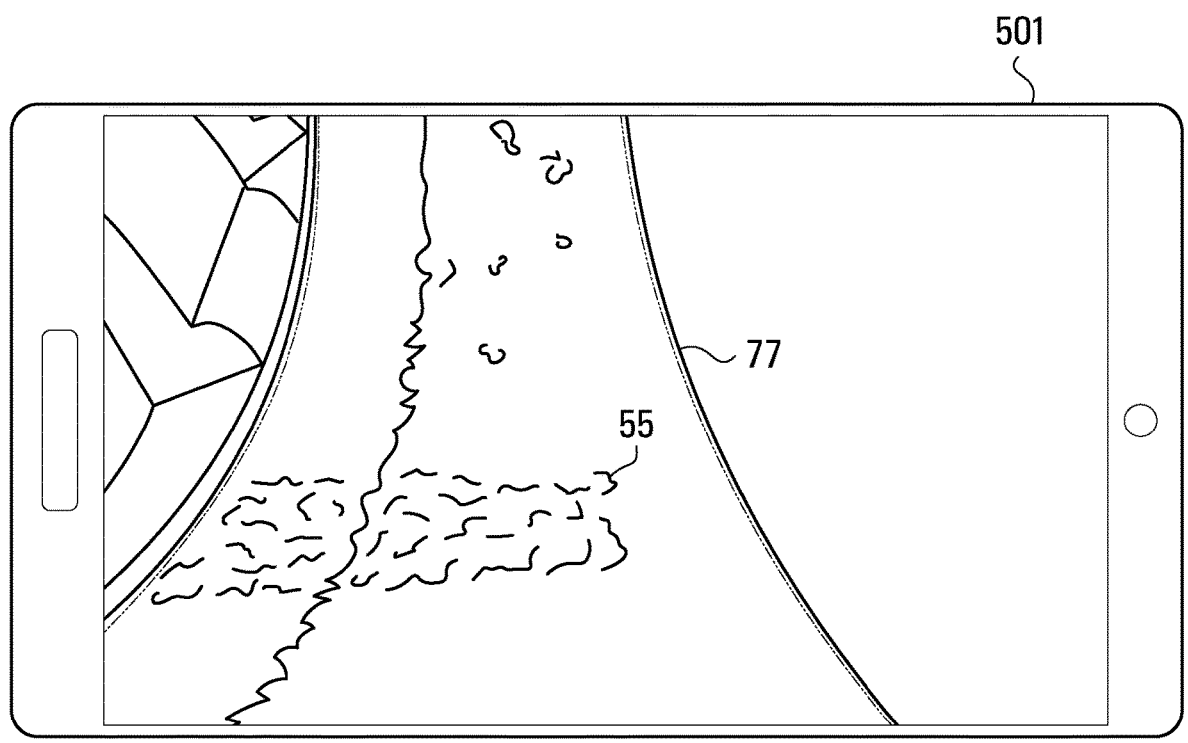

As shown in FIG. 43, based on a comparison of the 3D model 55 of a used track and a 3D model 77 of an unused track, in some embodiments the system 100 can determine a pattern of non-tread wear that is indicative of the cause and/or nature of the non-tread wear. In particular, in the case of some agricultural and construction vehicle track systems, the wear pattern detected by the system 100 in the drive/guide lugs $48_1$-$48_N$ of FIG. 43 relates to typical drive/guide lug break-in wear. The wear pattern detected by the system 100 on the inside of the carcass 36 of FIG. 44 relates to typical carcass wear due to use of the vehicle 10 for abrasive/construction applications.

Figure 45:
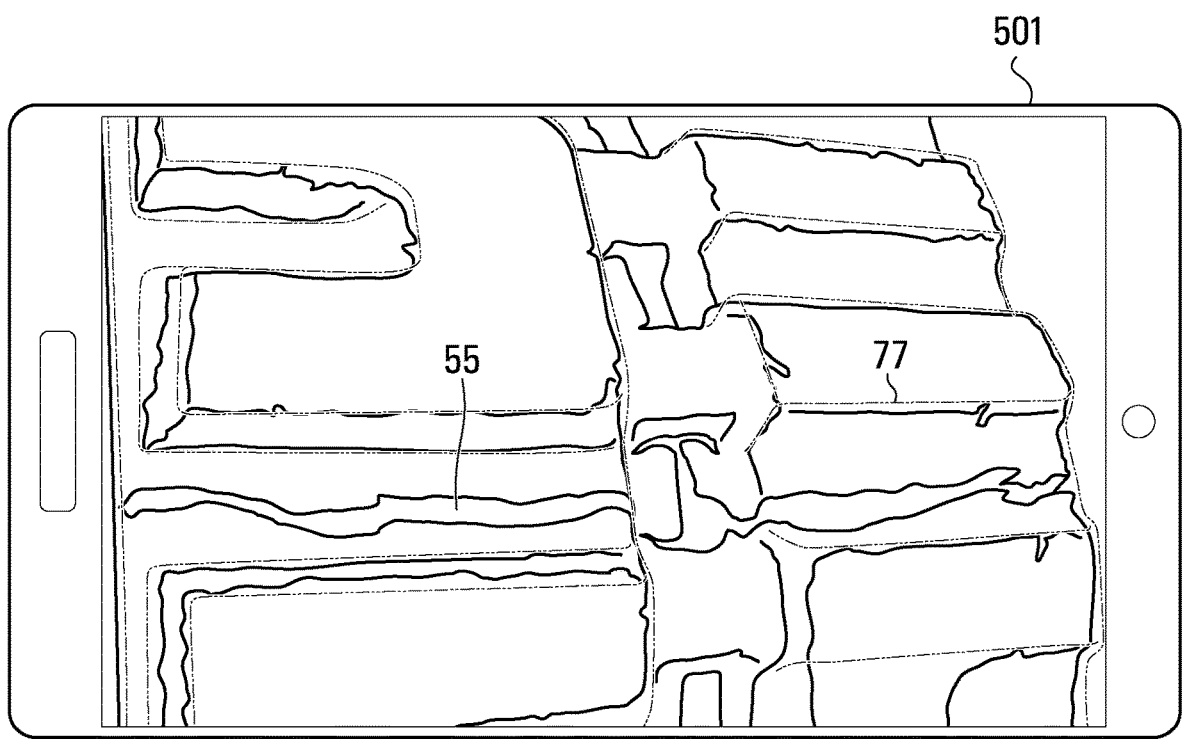

As shown in FIG. 45, based on a comparison of the 3D model 55 of a damaged track and a 3D model 77 of an undamaged track, in some embodiments the system 100 can determine a pattern of damage that is indicative of the cause and/or nature of the damage. In particular, the straight crack located near a joint area at the outer diameter of the track 47 detected by the system 100 in the carcass 36 of FIG. 41 is typically caused by incomplete or improper curing, contamination of source material and/or poor quality source material.

Figure 46:
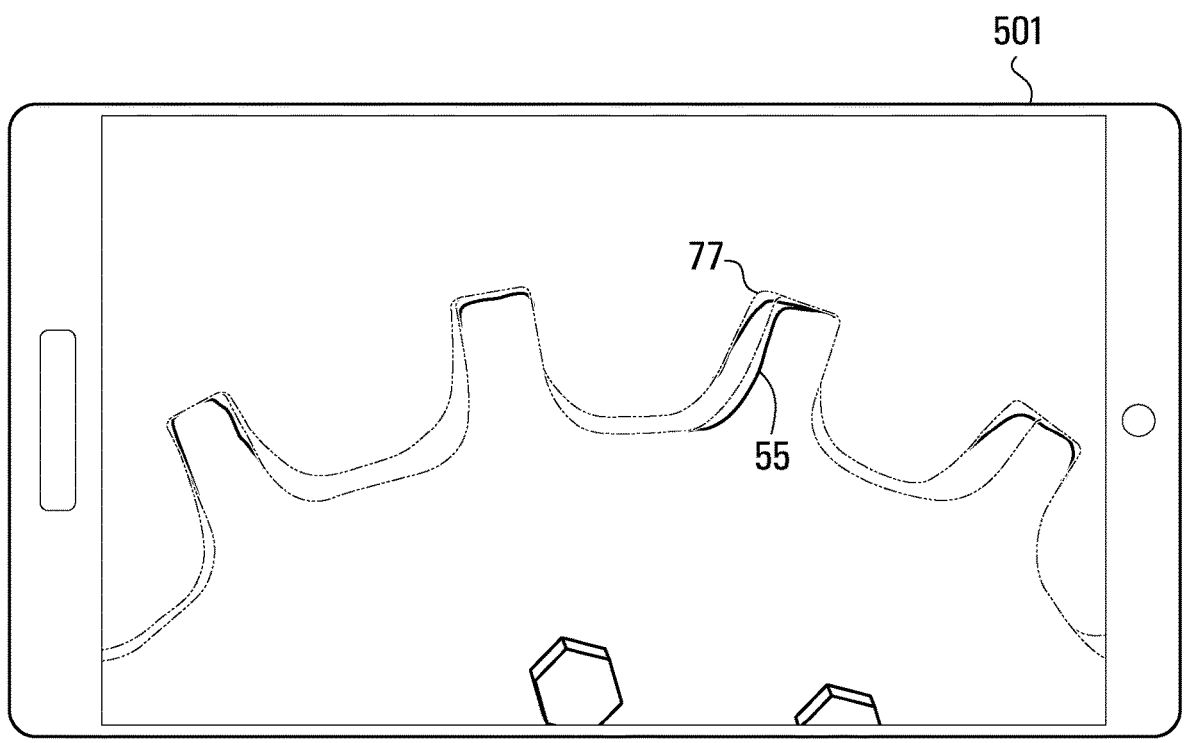

For example, as shown in FIG. 46, based on a comparison of the 3D model 55 of a used track system component and a 3D model 77 of an unused track system component, in some embodiments the system 100 can determine a pattern of track system component wear that is indicative of the cause and/or nature of the wear. In particular, the sprocket (drive wheel 42) wear pattern detected by the system 100 in the sprocket teeth of FIG. 46 is typically caused by normal operation. By determine the extent of the wear using the techniques described above, the system 100 can determine if and when a sprocket requires replacing.

Figure 47:
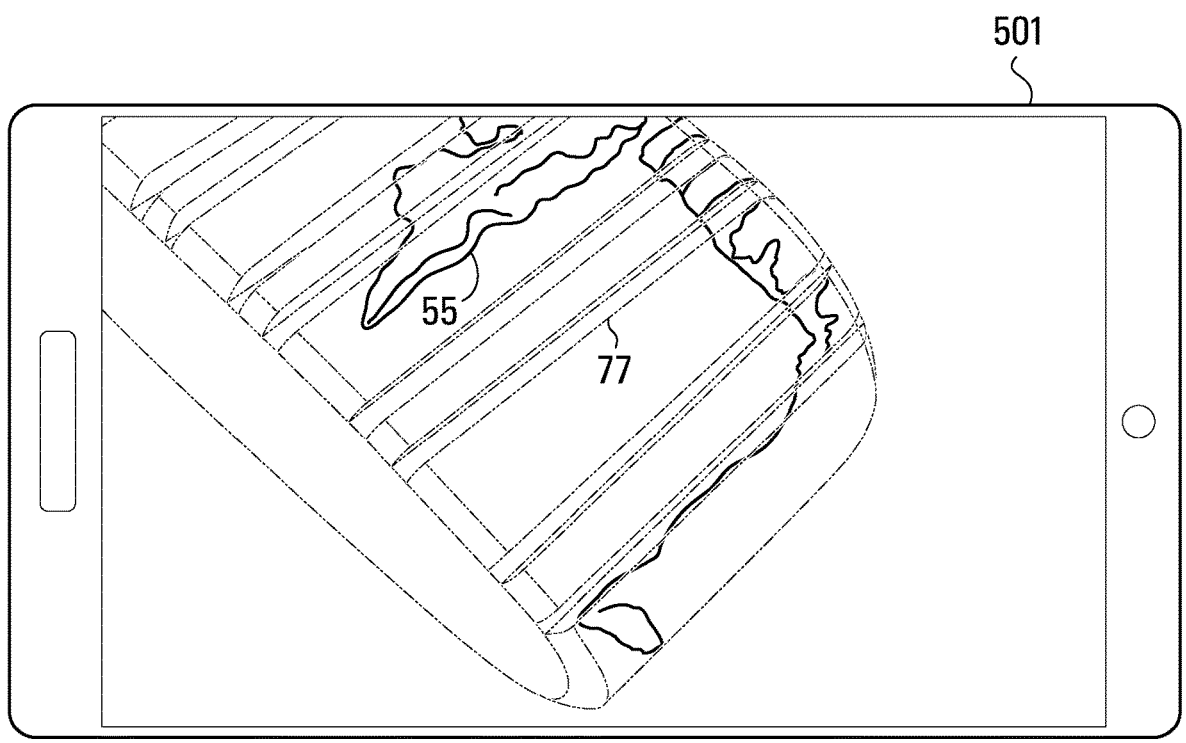

As shown in FIG. 47, based on a comparison of the 3D model 55 of a damaged track and a 3D model 77 of an undamaged track, in some embodiments the system 100 can determine a pattern of damage that is indicative of the cause and/or nature of the damage. In particular, the tread delamination or carcass 36 layer separation detected by the system 100 in the carcass 36 of FIG. 47 is typically caused by poor adhesion of the layer delaminating layer due to contamination or improper curing of the track.

Figure 48:
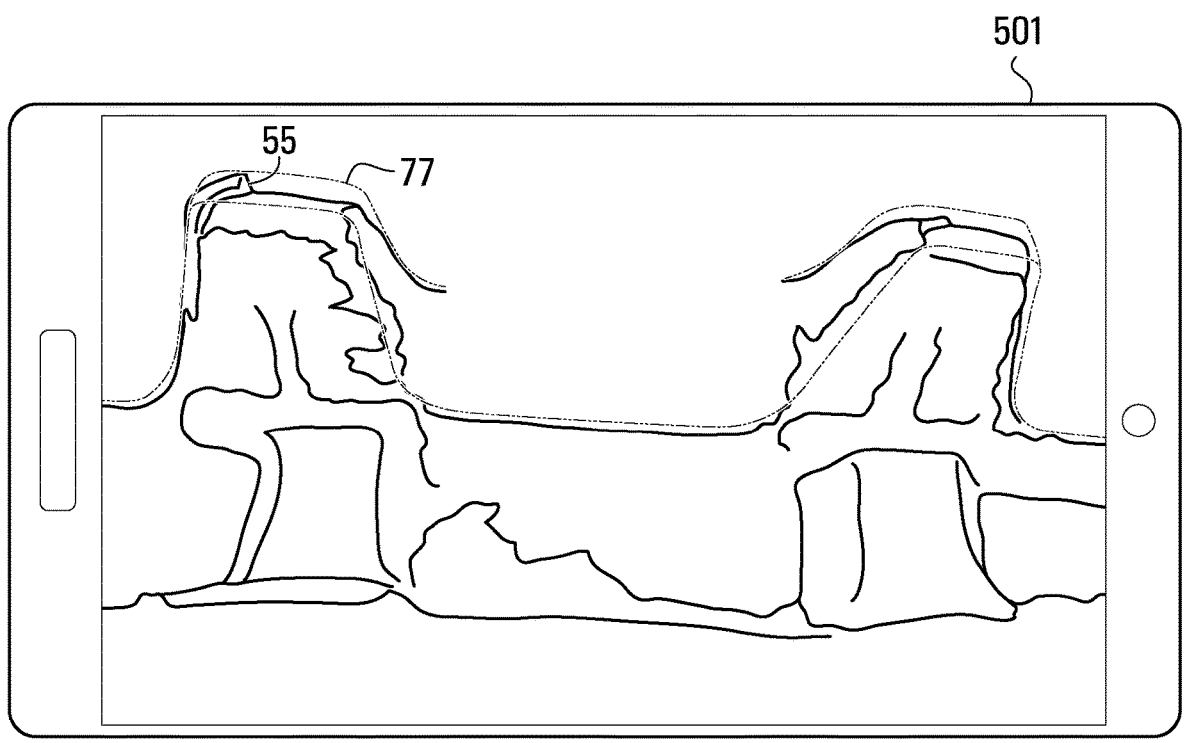

As shown in FIG. 48, based on a comparison of the 3D model 55 of a used track and a 3D model 77 of an unused track, in some embodiments the system 100 can determine a pattern of non-tread wear that is indicative of the cause and/or nature of the non-tread wear. In particular, in the case of construction vehicle track systems, the central wear pattern detected by the system 100 in the drive bars of FIG. 43 relates to a drive wheel 42 that is not adapted to the track 41, possibly because the teeth of the drive wheel 42 itself are worn beyond a threshold.

As described above, and as shown in FIG. 49, system 100 can use the 2D recognition technique described above to recognize and characterize the presence of exposed track cables $55_A$. Also, as shown in FIG. 50, the system 100 can use the 2D recognition technique described above to recognize and characterize the presence of a crack $55_B$ in the carcass of track 77.

Once the computing modules $508_x$ has determined the cause, level and/or nature of the wear and/or damage of the track 41 or other track system component, the image processing entity 505 may send data relating to the cause, level and/or nature of the wear and/or damage of the track 41 or other track system component back to electronic device 501 for further processing and/or notification to a user. By using this information, electronic device 501 may determine that an event arising from usage of a track system $16_x$, such as a usage threshold event (e.g. an amount of tread wear, an amount of time such as a number of hours the track 41 has been used), wear threshold event (e.g. the number of exposed reinforcing cables caused by chunking) and/or damage event (e.g. one or more severed reinforcing cables), has occurred.

According to some embodiments, the computing modules $508_x$ may have access to information stored elsewhere on the internet. For example, the computing modules $508_x$ may be configured to query databases stored on external servers by sending requests over the network in order to analyze the image based on pertinent cross-referential data. This may include weather, humidity, or information about the vehicle or track that can be periodically updated.

Figure 9:
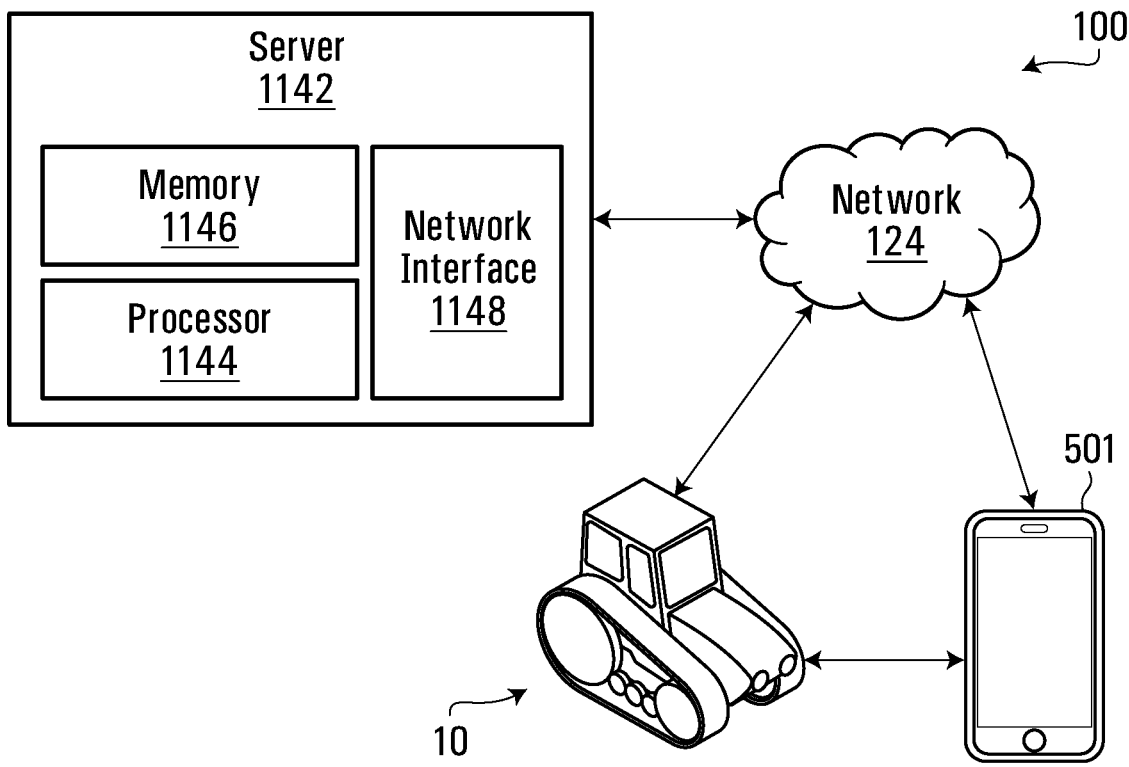
FIG. 9 shows a schematic network diagram of a system for monitoring off road vehicles, according to one embodiment.

FIG. 9 illustrates a schematic network diagram of a system 100 for monitoring vehicles such as one or more track vehicles like the agricultural vehicle 10, according to one embodiment. In the embodiment of FIG. 9, the system 100 includes an electronic device 501, a network 124, and a system server 1142 that can implement the image processing entity 500 of FIG. 8. The server includes a memory 1146, processor 1144, and network interface 1148.

The electronic device 501 may include elements such as a processor, a memory, a display, a data input module, and a network interface. The electronic device 501 may include other components, but these have been omitted for the sake of brevity. In operation, the electronic device 501 is configured to perform the operations described herein. The electronic device 501 processor may be configured to execute instructions stored in memory. The instructions, when executed, cause the electronic device 501 to perform the operations described herein. In some embodiments, the instructions may be part of a software application downloaded into memory by the electronic device 501. Alternatively, some or all of the functionality described herein may be implemented using dedicated circuitry, such as an ASIC, a GPU, or a programmed FPGA for performing the operations of the processor.

In some embodiments, an application ("app", i.e., software) may be installed on the electronic device 501 to interact with the system server 1142 and or the vehicle 10. For example, in some embodiments, such as where the electronic device 501 is a smartphone, a tablet, a computer, etc., the user (e.g., the operator) may download the app from a repository (e.g., Apple's App Store, iTunes, Google Play, Android Market, etc.) or any other website onto the electronic device 501. Upon activation of the app on the electronic device 501, the user may access certain features relating to the system server 1142 and/or the vehicle 10 locally on the electronic device 501.

In operation, a user can use the electronic device 501 to generate data about the vehicle 10. For example, for embodiments where the electronic device is a smart phone equipped with a camera, the user can take one or more images of a track 41 of the vehicle 10. The system 100 may then take the image data captured by the electronic device 501 and transmit the image data over a network 124 to a system server 1142.

According to some embodiments, the electronic device 501 may be a portable electronic device with multiple uses such as a mobile phone, tablet or laptop. According to other embodiments, the electronic device may be a single-use electronic device, such that the device is designed to only be used in operation with the system 100. Further, the electronic device 501 may also be capable of establishing a communicable link with an accessory device. This communicable link be may be wireless, wired, or partly wireless and partly wired (e.g., Bluetooth or other short-range or near-field wireless connection, WiFi or other wireless LAN, WiMAX or other wireless WAN, cellular, Universal Serial Bus (USB), etc.).

Figure 10:
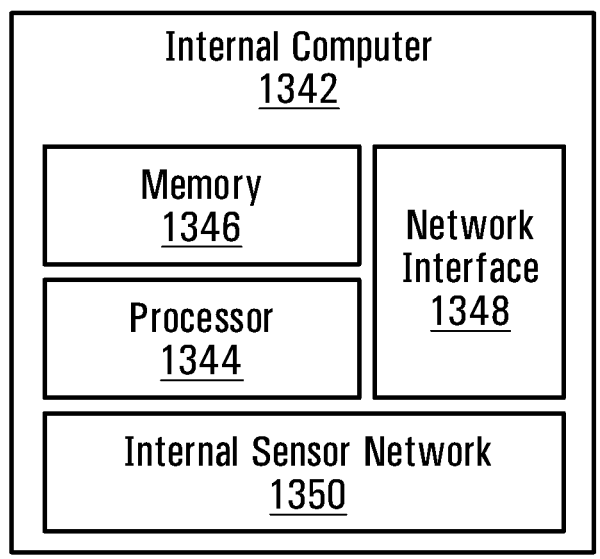
FIG. 10 shows a diagram of a computer of a vehicle according to one embodiment.

According to other embodiments, the electronic device 501 may integrated into an internal computer 1342 in the off-road vehicle (as shown in FIG. 10). The internal computer 1342 may have a vehicle memory 1346, processor 1344, network interface 1348, and internal sensor network 1350. In some embodiments, vehicle internal computer 1342 can communicate and upload images to system server 1142 independently.

The internal sensor network 1350 can include sensors to provide information about the vehicle or the track of the vehicle. For example, this may include a camera positioned to take images of the track. In some embodiments where the electronic device is integrated into an internal computer in the off-road vehicle, the system 100 may be configured to continuously monitor the track. This can be achieved by continuously capturing data, for example, images of the vehicle track, at various intervals. The electronic device 501 can then automatically upload the data over the network 124 to the system server 1142 for image processing. After processing, the image processing entity 505 can automatically communicate over the network 124 if a fault state has been determined.

The electronic device 501 can also send additional data to the image processing entity 505 over the network 124. For example, this can include (but is not limited to) GPS location, date and time, or any information from an onboard computer within the vehicle. This data can be cross-referenced and analyzed within the computing modules $508_x$. For example, given GPS and date and time data, the AI module can access the specific weather and weather history for the vehicle location. In some embodiments, such information may be used in, for example, determining the end-of-life of a track (i.e. the amount of time until a track is expected to fail or until the likelihood of track failure rises above a predetermined threshold).

This may be achieved by a separate electronic device 501 being communicably linked to an internal computer 1342 of a vehicle 10. The internal computer 1342 may periodically receive and record information relating to the vehicle 10 and/or track systems $16_1$-$16_4$ determined by the internal sensor network 1350. For example, the internal sensor network 1350 may include an image taken of the track or information about the vehicle 10, such as the speed of the vehicle 10.

According to some embodiments, the electronic device 501 may communicate a unique identifier for a specific track under inspection. In some embodiments, the unique identifier can be a serial number of the track. This allows the server 1146 and/or internal computer 1342 to catalog the inspection and produce a history of a given track. According to some embodiments, the internal computer 1342 and/or the server 1146 may store data about the serial numbers of the tracks installed on the vehicle 10.

According to some embodiments, the electronic device 501 may be capable of determining a serial number from a track based on an image of the track. This can be done by the electronic device 501 capturing an image of an embossed serial number on a surface of the track, and using the image processing entity 505 to determine the specific characters of the serial number. This can be cross-referenced with a database stored in server memory 1146 (or otherwise accessible by system server 1142) to determine elements such as the model and date of manufacture of the track.

Serial number analysis may be performed using AI techniques employed by the computing modules $508_x$, may be performed using techniques such as optical character recognition (OCR), or a combination thereof. These techniques may include preprocessing of an image in order to improve the ability to analyze the target components, such as de-skewing, layout analysis, and binarization. In some embodiments, a track system and/or track system component (such as a track) can be identified by way of another marking or tag suitable for communicating information relating to the track system and/or track system component. Such markings or tags can include, but are not limited to, barcodes, Quick Response (QR) codes or other matrix barcodes and Radio Frequency Identification (RFID) tags.

Another method of track identification that can be performed by the electronic device 501 is track pattern recognition. The electronic device 501 may be configured to analyze the tread pattern and measure track width to determine a number of characteristics about the track. The electronic device 501 may then send this data and information to the system server 1142 for further data analysis to identify the type of track. The type of track may be a track brand, model number, or any other suitable information capable of identifying a track.

According to some embodiments, the vehicle may be capable of communicating all the necessary data over the network without the use of an external electronic device 501 such as a mobile phone. For example, the vehicle 10 may be equipped with a network interface capable of independently communicating with the system server 1142 over the network 124.

According to some embodiments, a system server 1142 hosts the image processing entity 505. Server processor 1144 is able to access instructions stored in the memory 1146 that can initialize the image processing entity 505. This initialization can include operational parameters that include which AI module $508_x$ to use.

Image processing entity 505 can store instructions relating to a specific AI module $508_x$ within the memory 1146. The processor 1144 may instruct the server to save the data received from the network via the network interface 1148 in memory 1146. The processor 1144 may analyze the data in memory 1146 and determine information about the track 41. Based on the data analysis, the processor 1144 may send a communication to the electronic device 501 over the network 124 via the network interface 1148.

Figure 11:
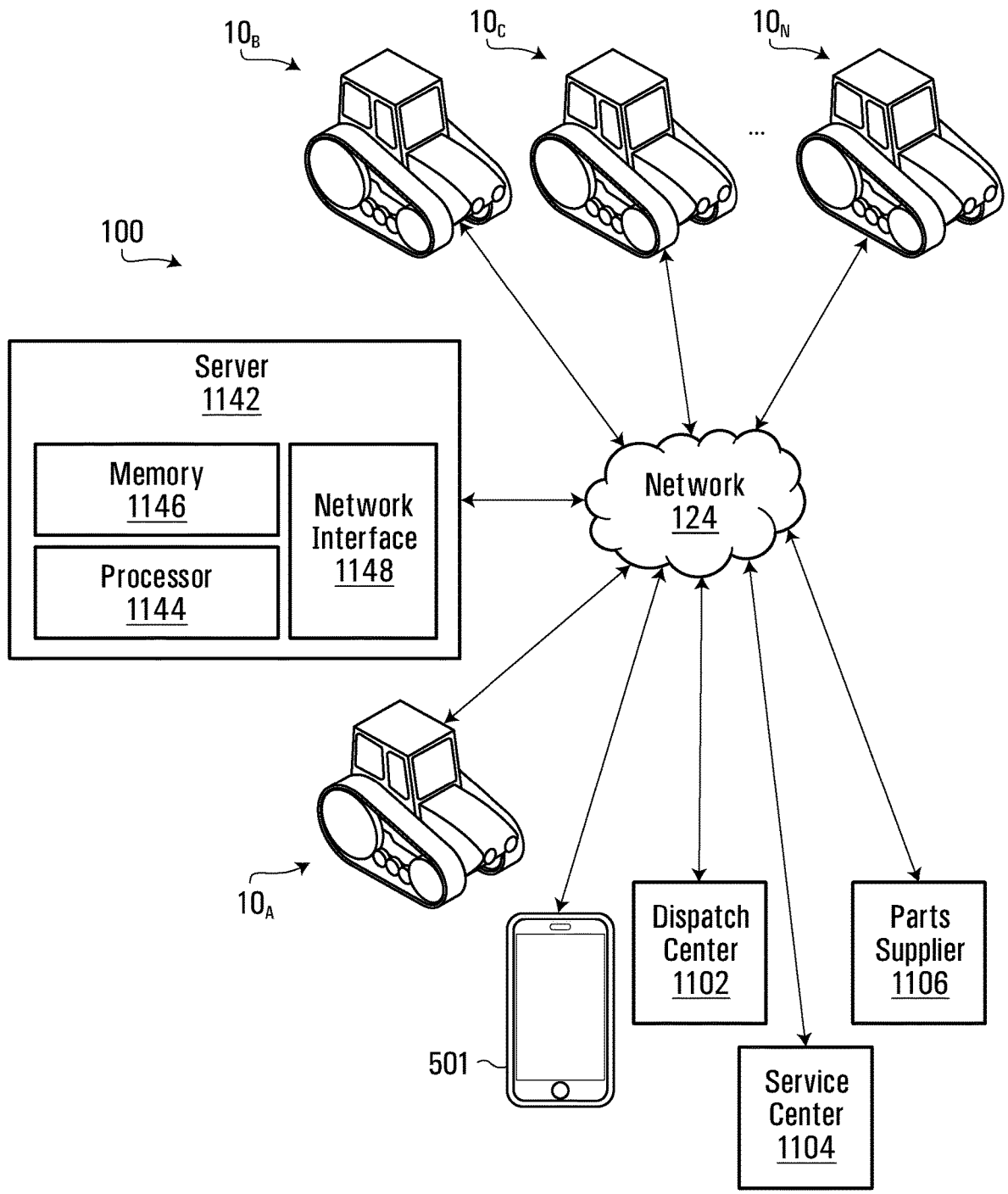
FIG. 11 shows a schematic network diagram of a system for monitoring off road vehicles, according to another embodiment.

FIG. 11 illustrates a schematic network diagram of a system 100 for monitoring off road vehicles, according to another embodiment. According to this embodiment, the system 100 can communicate with multiple vehicles $10_A$-$10_N$. While this figure shows the vehicles $10_A$-$10_N$ communicating independently with the system server 1142 over the network 124, the vehicles may alternatively each be communicably linked with an electronic device 501 as described with reference to FIG. 9. According to this embodiment, the system server 1142 may communicate with an electronic device 501 located at a dispatch center 1102, a service center 1104, or a parts supplier 1107.

In operation, based on the analysis determined by the image processing entity 505, the system server 1142 may communicate with the user via an electronic device 501 or the vehicle 10, a dispatch center 1102, a service center 1104, or a parts supplier 1106. The system 100 may also communicate with any combination of these, or any other suitable device registered within the system 100. This communication can contain information such as that indicating the determination of track wear and/or damage concluded by the image processing entity 505. Based on this information, the dispatch center 1502 or user may schedule maintenance with the service center 1104. Based on the conclusion on track wear and/or damage (for example, that the track needs to be replaced) and vehicle information (track type, vehicle type) available, the system 100 can determine the amount of time required or parts available at the service center 1104 and facilitate scheduling a maintenance appointment or a shipment from the parts supplier 1106. This can be done by maintaining a database of inventory at the service center, along with a calendar.

FIG. 12 A to C illustrate representations of different databases that may be generated by the server processor 1144 based on information stored in memory 1146. The server memory 1146 can store a history of all information necessary for performance of the system 100, including a record of all inspections and conclusions made. These databases, or the information stored within them, may be accessible to users and administrators of the system 100, or to software able to interact with the system 100 through the use of an application programming interface (API).

FIG. 12A shows an example of a visual representation of a database that can be generated by the system 100 according to an embodiment directed towards a specific track manufacturer. This includes an indication of track model, a serial number for the track, the date of an inspection, the type of inspection, along with the registered owner. This database representation gives the manufacturer access to all registered tracks sold and registered within the system 100, and allows access to information on track wear and damage.

FIG. 12B shows an example of a visual representation of a database that can be generated by the system 100 according to an embodiment directed towards a vehicle fleet manager. The database includes an indication of track model, a unique identifier for the vehicle itself, the date of an inspection, track status, and an additional field for manager notes. This database representation gives the fleet manager access to all vehicles registered within the system 100, and allows them to access a history of information on track wear and/or damage.

FIG. 12C shows an example of a visual representation of a database that can be generated by the system 100 according to an embodiment directed towards a specific vehicle manufacturer. This includes an indication of vehicle model, track model, a date of an inspection, track status, and an additional field for manager notes. This database representation gives the vehicle manufacturer access to all of their vehicles registered within the system 100, and allows them to access a history of information on track wear and/or damage.

The disclosed embodiments of database representations are structured merely by way of example for illustrative purposes, and a skilled reader would know that these visual representations can be changed to include more or less information available to the system 100.

Figure 13:
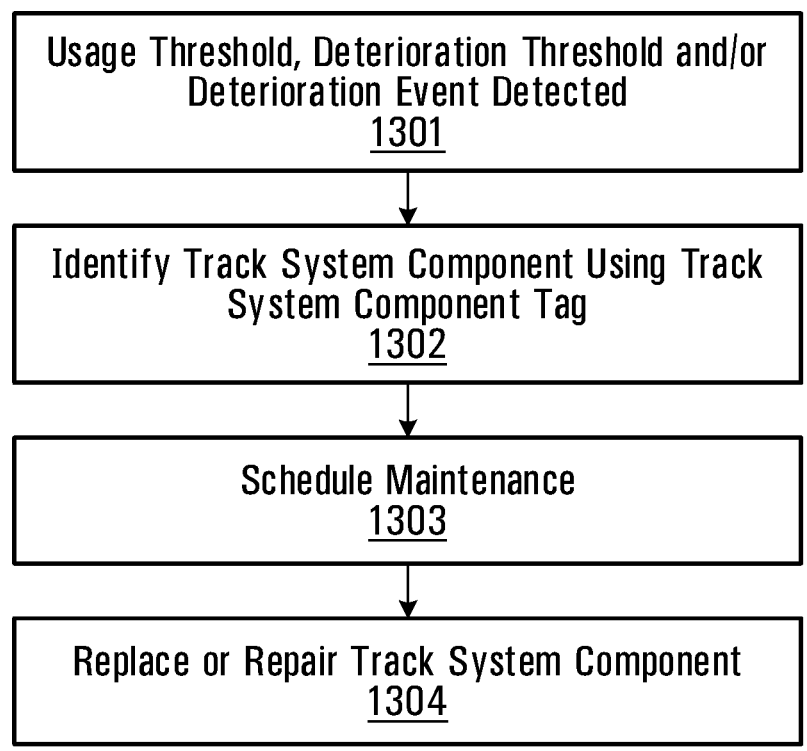
FIGS. 13 to 19 shows flowcharts of the use of a monitoring system, according to various embodiments.

FIG. 13 shows an example flowchart of the use of the system 100 which could be used (e.g., by the operator of the vehicle 10, in a rental market, etc.) to monitor usage of track system components.

In operation, a user can use the electronic device 501 to generate image data relating to the track 41 and/or track system $16_x$ of the vehicle 10. According to some embodiments, the electronic device 501 may also access internal information stored on the vehicle onboard computer 1342. The electronic device 501 may then communicate both the data captured and the information retrieved by the electronic device 501 over the network 124 to the system server 1142 to be stored in memory 1146. Using both the data captured and the information retrieved the processor 1144 may determine information about the track 41. Based on the data analysis, the processor 1144 may send a communication to the electronic device 501 over the network 124 via the network interface 1148.

At step 1301, the system 100 determines that an event arising from use of a track system $16_x$, such as a usage threshold event (e.g. an amount of time such as a number of hours the track 41 has been used) or a deterioration threshold event (e.g. chunking or other loss of elastomeric material of the track, the number of exposed reinforcing cables, one or more severed reinforcing cables, etc.), has occurred. As described above, the system 100 can make these determinations by analysis of the images taken by the image capture devices described above.

At step 1302, the system 100 identifies the track system component for which the usage threshold event or deterioration threshold event has occurred. In some embodiments, the track system component information and information relating to the usage threshold event and deterioration threshold event is conveyed to the operator of the vehicle by the system 100 in order to facilitate scheduling of track system component servicing and/or other maintenance.

For purposes of this example, it is assumed that the usage threshold event or deterioration threshold event is for the track 41.

For example, the system 100 may issue a notification conveying this information to the operator via the user interface of the operator cabin 20 of the vehicle 10 and/or the electronic device 501. According to embodiments wherein the electronic device 501 is a mobile phone, this could be in the form of a push notification sent to the app over the network 124. In other embodiments, the system 100 conveys the track system component information and information relating to the usage threshold event and deterioration threshold event to an organization providing maintenance services. For example, the system 100 may issue a notification conveying this information to a system server 1142 associated with the organization via a network 124 (e.g. which may be implemented by the Internet, a cellular connection, and/or any other network infrastructure). Once the information is received, the organization can schedule maintenance of the vehicle at step 1303, and subsequently replace or repair the track system component. Accordingly, track system component maintenance operations can be initiated and scheduled without the need for input from the vehicle operator.

Figure 14:
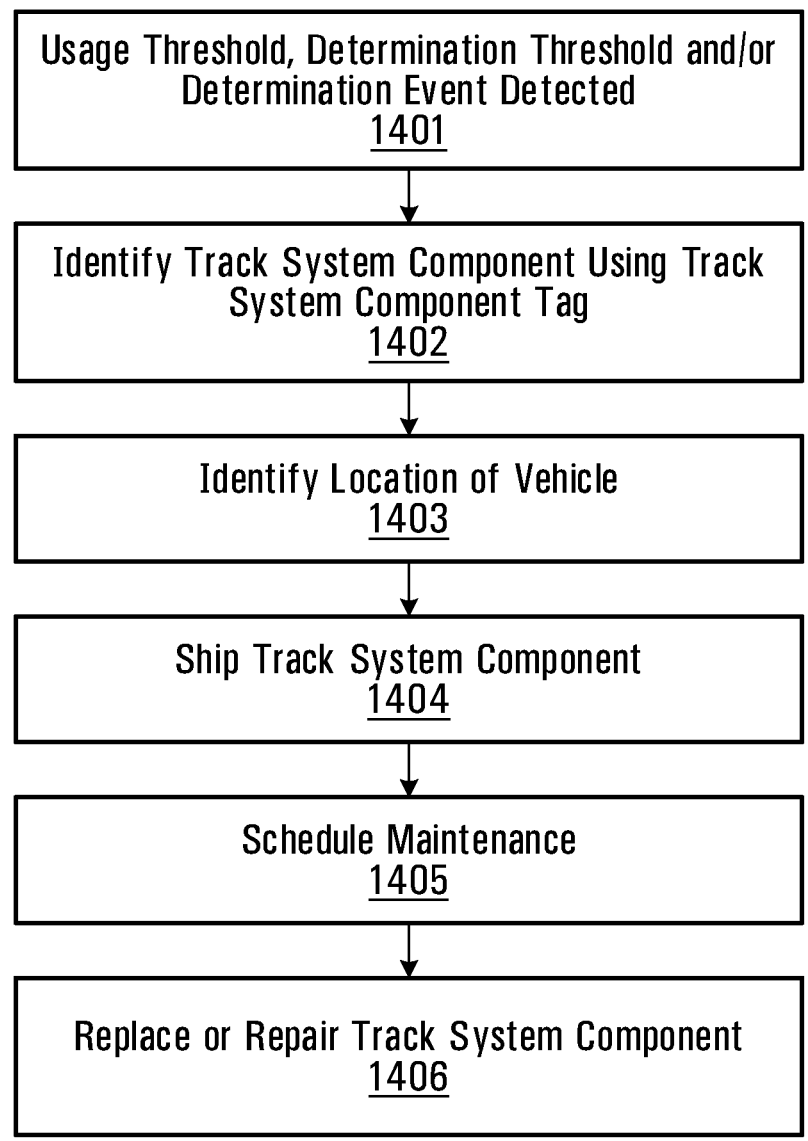

As shown in FIG. 14, the system 100 may allow organizations to provide track-as-a-service type payment/usage models, in which tracks are not purchased, but are rather provided as a service to vehicle operators in exchange for a subscription fee. For example, for a monthly fee, an organization may provide vehicle operators with tracks, as well as usage rights to the system 100 described herein which will allow the organization to ensure that the vehicle operator is never without an operable/functional track, regardless of how much and how (i.e. under what circumstances) the vehicle operator uses the track.

This can lead to significant savings in term of vehicle downtime and logistics. For example, at step 1401, the system 100 determines that an event arising from usage of a track system 16$_x$, such as a usage threshold event (e.g. an amount of tread wear, an amount of time such as a number of hours the track 41 has been used), deterioration threshold event (e.g. the number of exposed reinforcing cables) and/or deterioration event (e.g. one or more severed reinforcing cables), has occurred. At step 1402, the system 100 identifies the track system component for which the usage threshold event, deterioration threshold event and/or deterioration event has occurred. At step 1403, vehicle location information relating to the geographic location of the vehicle is determined. This can be achieved by any suitable means including, but not limited to, Global Positioning System (GPS) receivers. In some embodiment, the system 100 conveys the track system component information, vehicle location information and information relating to the usage threshold event, deterioration threshold event and/or deterioration event to the track-as-a-service organization.

As shown in above, the system 100 may communicate with the system server 1142 of the track-as-a-service organization over a network 124 (e.g. which may be implemented by the Internet, a cellular connection, and/or any other network infrastructure). Then, at step 1404, the track-as-a-service organization ships a replacement track system component to a location related to the geographic location of the vehicle. For example, the track-as-a-service location could ship the replacement track system component to the nearest maintenance service dispatch location or third party maintenance organization. At step 1405, the track-as-a-service organization can schedule a maintenance of the track system. In some embodiments, the track-as-a-service organization schedules a third party mobile maintenance team to perform onsite maintenance based on the geographic location of the vehicle. Finally, at step 1406, the track-as-a-service organization, or an agent thereof, replaces the track system component. In some embodiments, this can be performed onsite, based at least in part on the vehicle location information received from the track-as-a-service organization.

Figure 15:
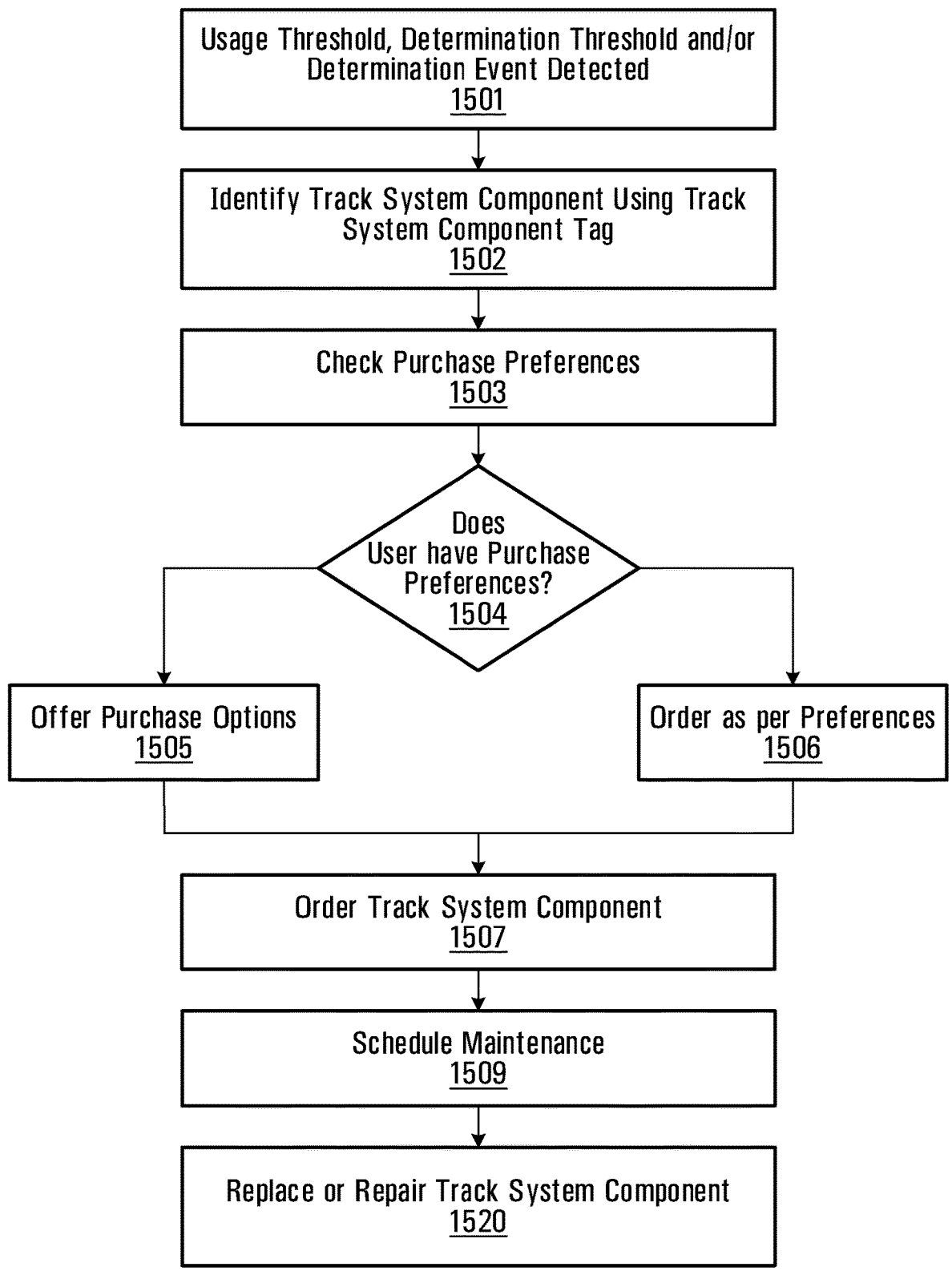

FIG. 15 shows an example flowchart of the use of the system 100 which could be used, for example, by a fleet manager to monitor usage of track system components. In this system 100, the preferences of a given fleet manager can be included in any part purchase or system maintenance request. For example, a fleet manager may consider a specific track to be superior to all other on the market. The fleet manager may want to only purchase that specific brand of track. Another example of purchase preferences may include only to purchase a specific track if the supplier inventory and price database indicates that the part is available with a discount. Further, if there is no supply of a first preferred track in the inventory, the user may store a preference for an alternate track to be purchased. In this embodiment, steps 1501 and 1502 are the same as those described in steps 1301, 1401, and 1302, 1402 respectively.

At step 1503, the system 100 will query the memory to determine if the specific user has a purchase preference stored in the system 100. If the system 100 has a purchase preference stored for the given user, the system 100 will order the track system component for replacement based on the saved preference at step 1506. If the system 100 does not find a purchase preference for the given user, the system 100 may send a communication to the user's electronic device 501 with information indicating the part purchase options and information about the parts (for example the various options of price and part characteristics). The system 100 may also send a communication instructing the electronic device 501 to prompt the user to store a purchase preference. Based on this information, the system 100 will order the track system component at step 1507.

At step 1509, the system 100 may schedule maintenance with a given service center or technician. At this step user preferences may also be considered. For example, a user may be able to store in their profile a preference for scheduling. This may include a preference for the first available time to service the vehicle. Alternatively, a fleet manager may try and coordinate scheduling of maintenance with other vehicles within a fleet. This could include wanting all vehicles to be serviced at the same time, or to stagger vehicle services. Scheduling preferences may also include a time of day preference for the user to have maintenance scheduled. Based on these preferences, the user may be automatically scheduled for maintenance.

According to other embodiments, the system 100 may prompt the user via a date and time entry interface, such as a calendar interface, on the electronic device 501 to input a date and time for maintenance. Based on this input data, the system 100 can schedule maintenance with a technician or service center.

Finally, at step 1520, the track-as-a-service organization, or an agent thereof, replaces the track system component. In some embodiments, this can be performed onsite, based at least in part on the vehicle location information received from the track-as-a-service organization.

Figure 16:
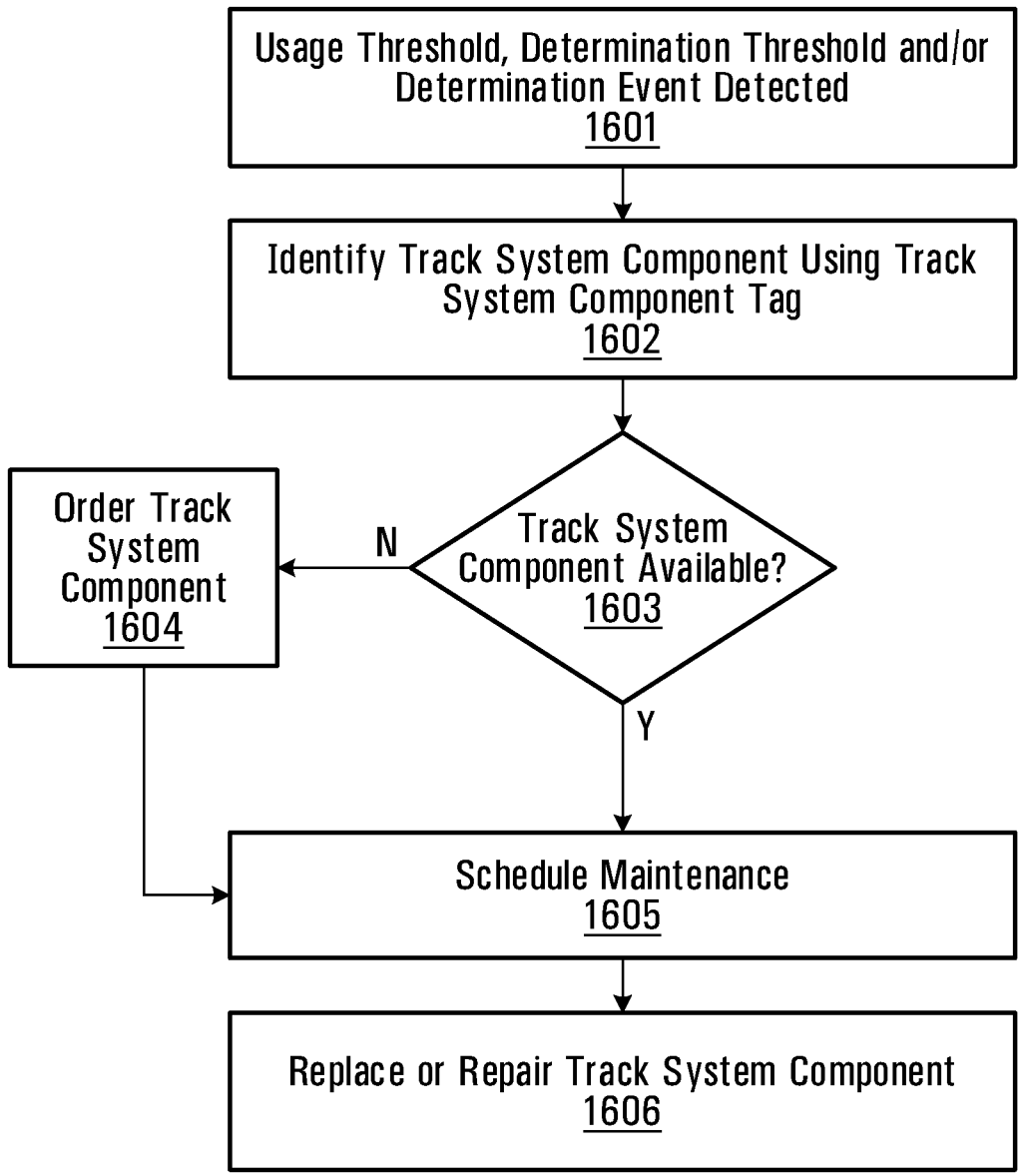

FIG. 16 shows an example flowchart of the use of the system 100 which could be used, for example, by a fleet manager to monitor usage of track system components. According to this embodiment, inventory of the track system components at a given service center can be monitored. The system 100 allows organizations managing large fleets (e.g. vehicle rental companies, construction companies, forestry companies, etc.) to ensure that maintenance operations can be scheduled and carried out effectively and efficiently. For example, by monitoring the wear of track system components, it is possible to more precisely predict when a track system component will fail and/or when a replacement track system component should be ordered and/or shipped.

Moreover, for an organization managing a fleet of vehicles, knowing which vehicles will shortly require maintenance and/or replacement parts contributes to efficient and effective deployment of vehicles and maintenance resources. For example, at step 1601, the system 100 determines that an event arising from usage of a track system $16_x$, such as a usage threshold event (e.g. an amount of tread wear, an amount of time such as a number of hours the track 41 has been used), deterioration threshold event (e.g. the number of exposed reinforcing cables) and/or deterioration event (e.g. one or more snapped or broken reinforcing cables), has occurred. At step 1602, the system 100 identifies the track system component for which the usage threshold event, deterioration threshold event and/or deterioration event has occurred. In some embodiments, as shown in FIG. 15, the system 100 conveys the track system component information and information relating to the usage threshold event, deterioration threshold event and/or deterioration event to an automated fleet management system. The system 100 may communicate with the automated fleet management system over a network 124 (e.g. which may be implemented by the Internet, a cellular connection, and/or any other network infrastructure). At step 1603, the automated feet management system queries a track system component supply database to determine whether the identified track system component is available or needs to be ordered.

The track system component supply database can be managed by the fleet management system, or can be managed by a third-party track system component supplier. If the identified track system component is available, the vehicle can be scheduled for maintenance. If, on the other hand, the track system component is not available, the fleet management system can cause the track system component to be ordered at step 1604, before scheduling maintenance of the vehicle at step 1605. This system may also include ordering based on stored user preference as previously described.

In some embodiments, the scheduling of the vehicle maintenance is at least in part based on the estimated delivery time for an ordered track system component. In other embodiments, the dispatching of the vehicle relating to the identified track system component can, at least partially, be based on a pre-scheduled maintenance. This system 100 may also include scheduling based on stored user preference as previously described. Finally, at step 1606, the maintenance operation is carried out and the track system component is replaced or repaired.

Figure 17:
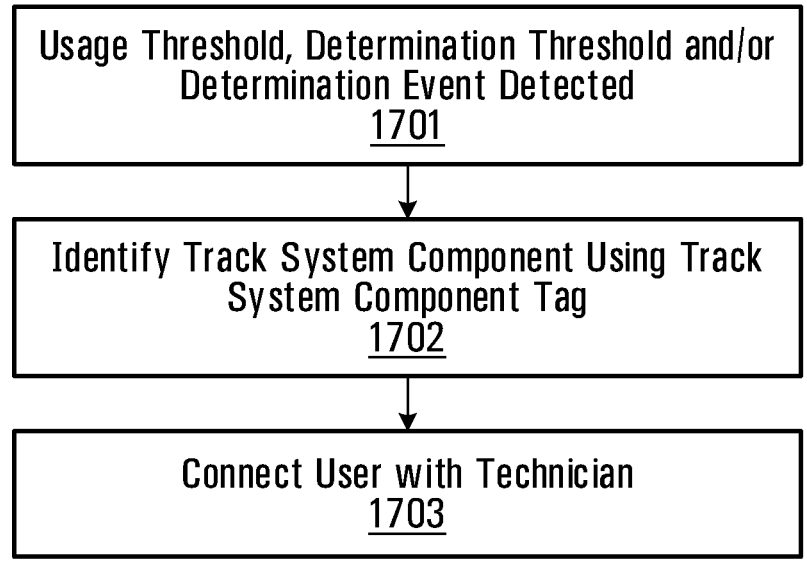

FIG. 17 shows an example flowchart of the use of the system 100 which could be used, for example, by a vehicle operator to monitor usage of track system components. According to this embodiment, the system 100 has determined a critical error to have taken place or imminent. In this embodiment, steps 1701 and 1702 are similar to those described in steps 1301, 1401, and 1302, 1402 respectively.

If the system 100 has determined that a critical error has taken place or is imminent, it can prompt the user to establish an audiovisual and/or textual connection with a technician at 1703. This could be achieved by using a Voice Over IP (VoIP) system, a phone call over a cellular network, or any other means of text, audio or video communication. This will allow the vehicle operator to communicate with the technician and get or receive pertinent information to vehicle maintenance. For example, the technician may instruct the user to drive the vehicle to a safe location and wait for the technician to arrive. In the case of a video call, the technician may be able to instruct the user to point the camera of the electronic device at a specific component of the vehicle 10 in order to provide the technician with more information about the vehicle status.

Figure 18:
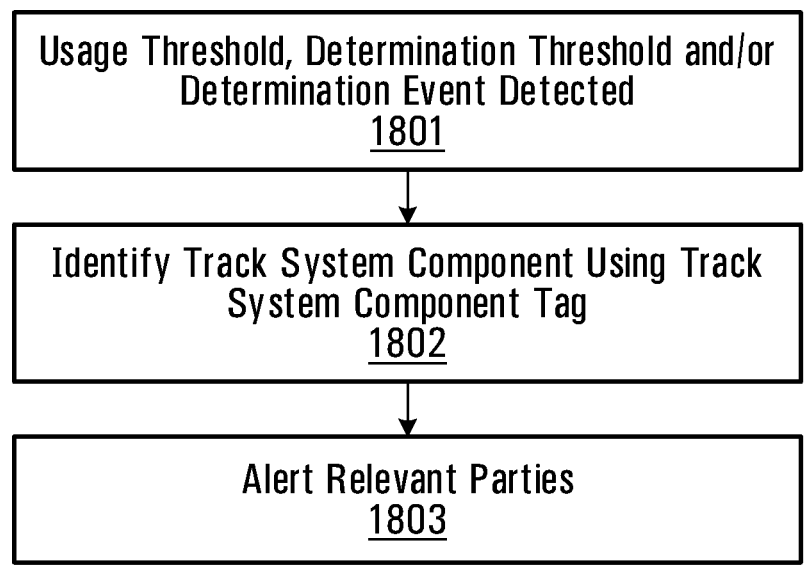

FIG. 18 shows an example flowchart of the use of the system 100 which could be used, for example, by a vehicle operator to monitor usage of track system components. According to this embodiment, the system 100 has determined a critical status of the track and/or track system. In this embodiment, steps 1801 and 1802 are similar to those described in steps 1301, 1401, and 1302, 1402 respectively.

At step 1803, the system 100 alerts relevant parties of the critical status. This can include fleet managers, technicians or other operators. For example, the system 100 may send a text message, email or app push notification to any interested party that the status and operability of a given vehicle with a unique identifier has reached a certain threshold of wear or damage. Based on the information determined by the system 100, the vehicle operator or fleet manager may override the decision determined by the system 100 and continue to operate the vehicle. Alternatively, the system 100 may have the capability to safely disable the vehicle given specific parameters. For example, the system 100 may only allow the vehicle to operate for another specific distance or time, or may not allow the vehicle to restart after it has switched off without an appointment with a technician.

Figure 19:
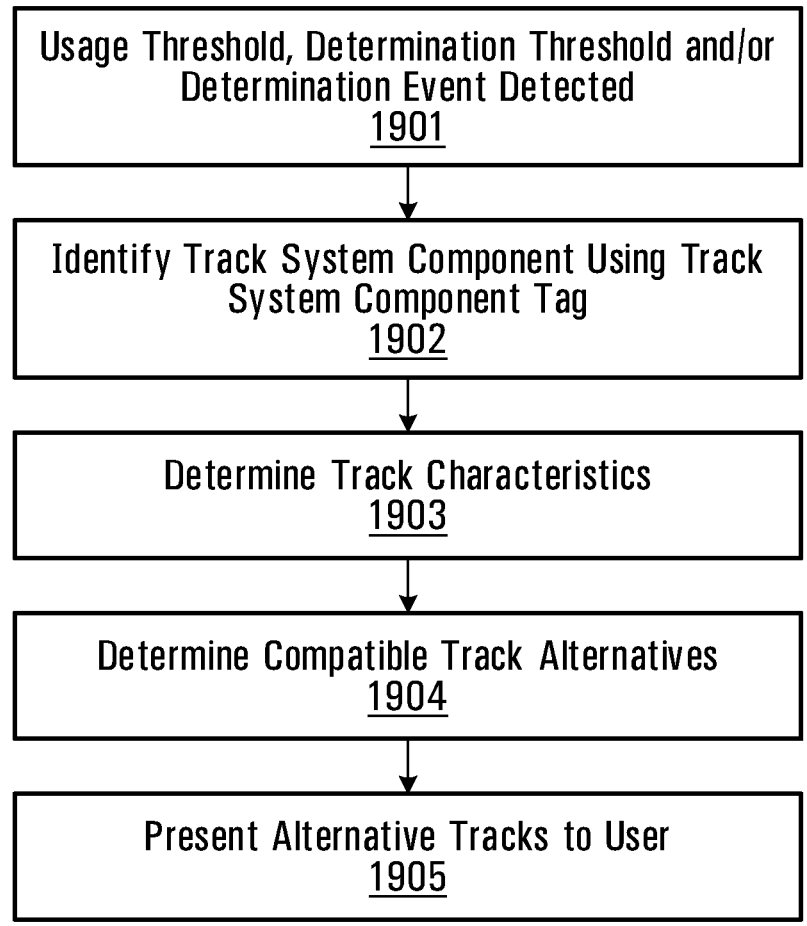

FIG. 19 shows an example flowchart of the use of the system 100 by, for example, a vehicle operator to monitor usage of track system components. According to this embodiment, the system 100 is able to determine a specific track brand or type, and cross-reference this brand or type with a database of compatible brands stored in a memory. In this embodiment, steps 1901 and 1902 are similar to those described in steps 1301, 1401, and 1302, 1402 respectively.

According to this embodiment, the system 100 is able to identify the track characteristics 1903. These characteristics may include thickness, length, weight, width, tread pattern, internal cable strength, etc. Based on an analysis of the vehicle's track, the system 100 can determine track alternatives at step 1904. This can be done using a pre-populated database stored on a server of all major available track brands and products, along with compatible alternatives. Once the system 100 has determined the track and track characteristics, it can query the database to find all other products that could be used for the vehicle.

The system 100 can then communicate the tracks to the user at step 1905. This can be done by sending the information over the network to the electronic device. The user may determine that an alternative track could be used for the vehicle. If the user selects the alternative track, the system 100 will send that message back to the server over the network and proceed to organize any part replacement using the user's selection.

As shown in FIGS. 20 to 23, image data capture is shown according to different embodiments. According to some embodiments, the electronic device 501 can display an instruction to the user to position and/or move the electronic device 501 in order to optimally capture the image.

Figure 20:
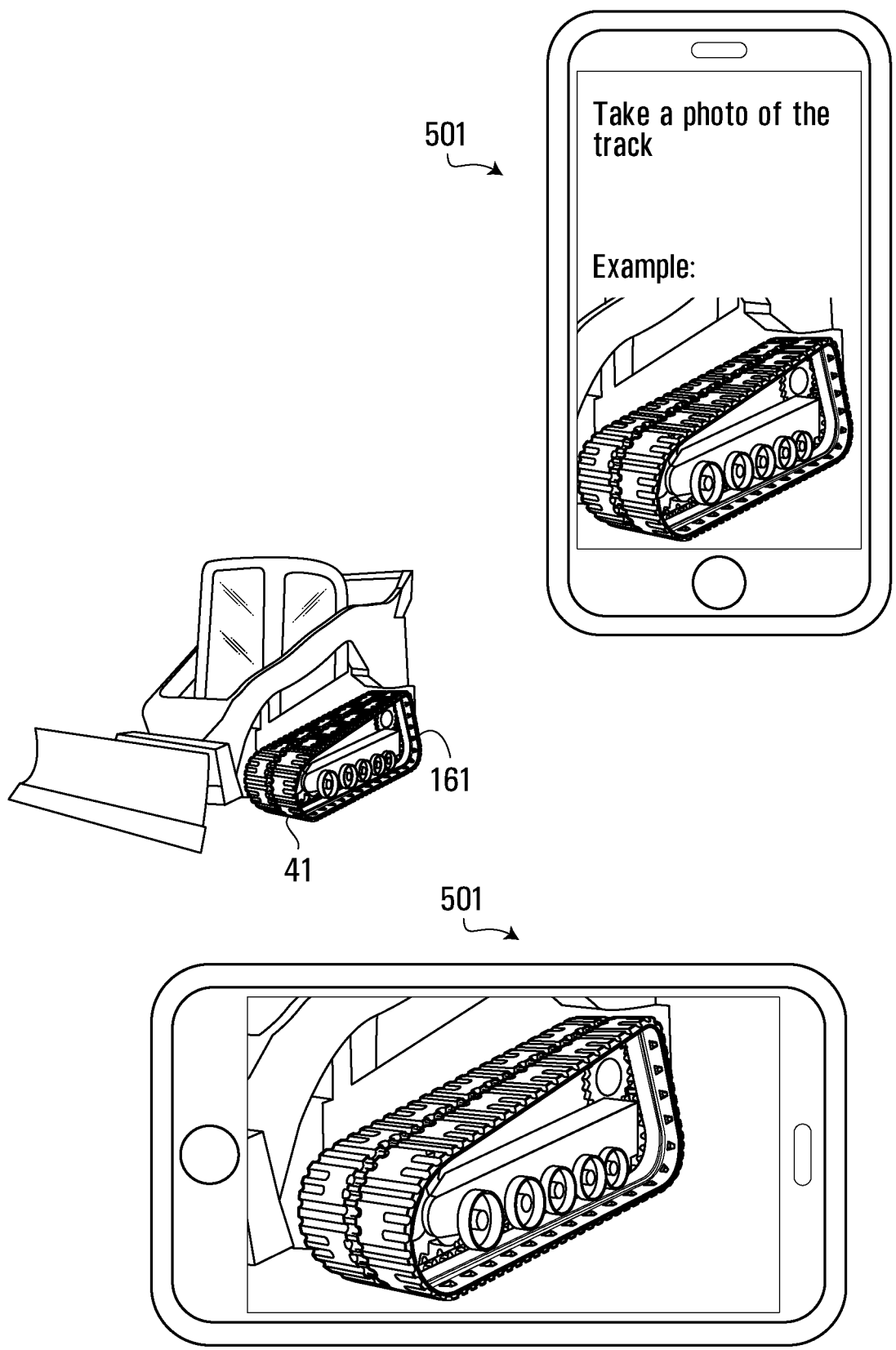
FIGS. 20 to 23 show data capture for a system according to various embodiments.

FIG. 20 shows an embodiment in which the system 100 may instruct the user to take an image of the vehicle 10. The electronic device 501 will communicate this image along with any other information to be communicated to the system server 1142 for analysis, as described above.

Figure 21:
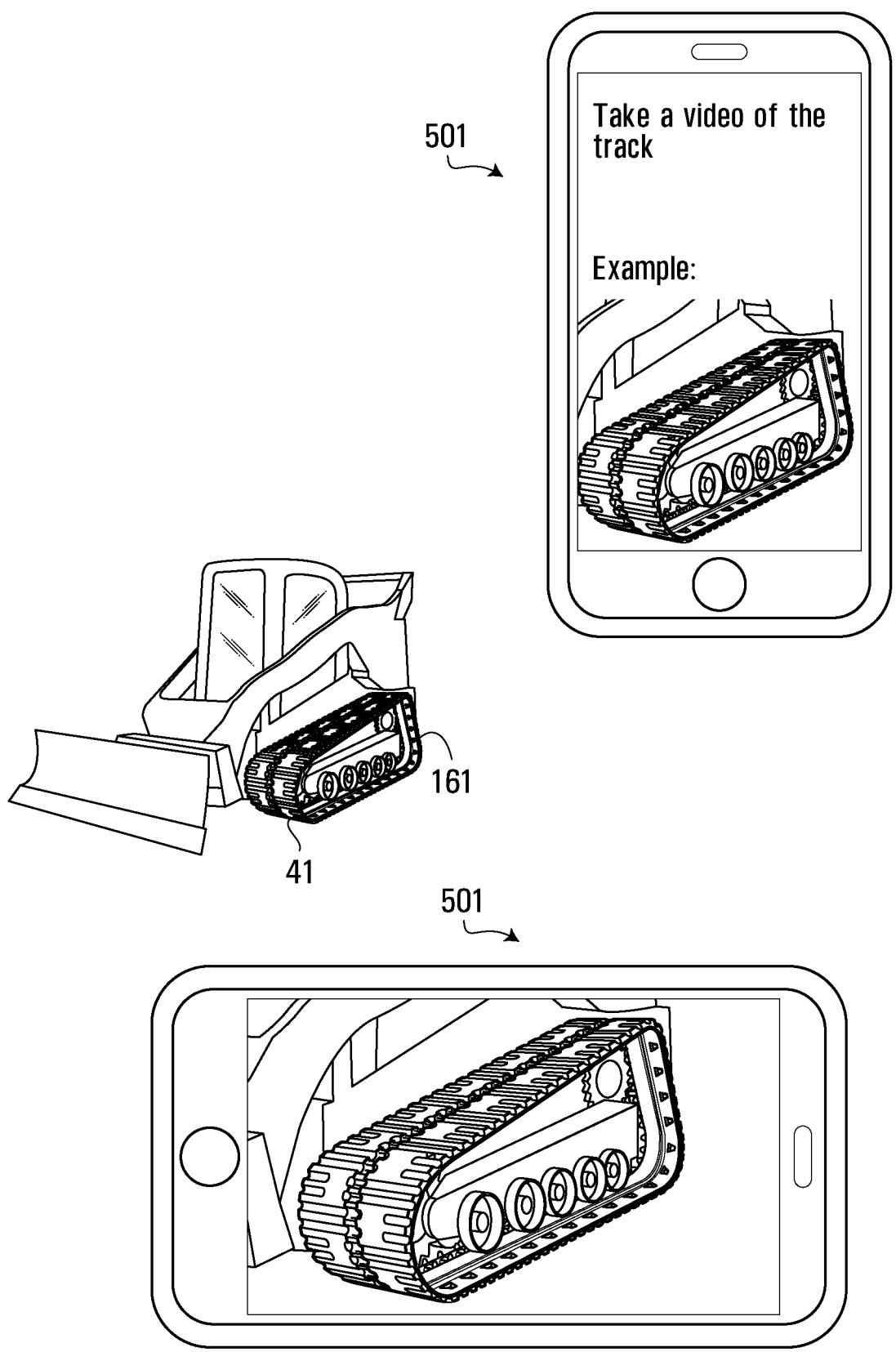

As shown in FIG. 21, the system 100 may also or instead instruct the user to take a video of the track 41. The electronic device 501 may then communicate this video along with any other information to be communicated to the system server 1142 for data analysis, as described above.

Figure 22:
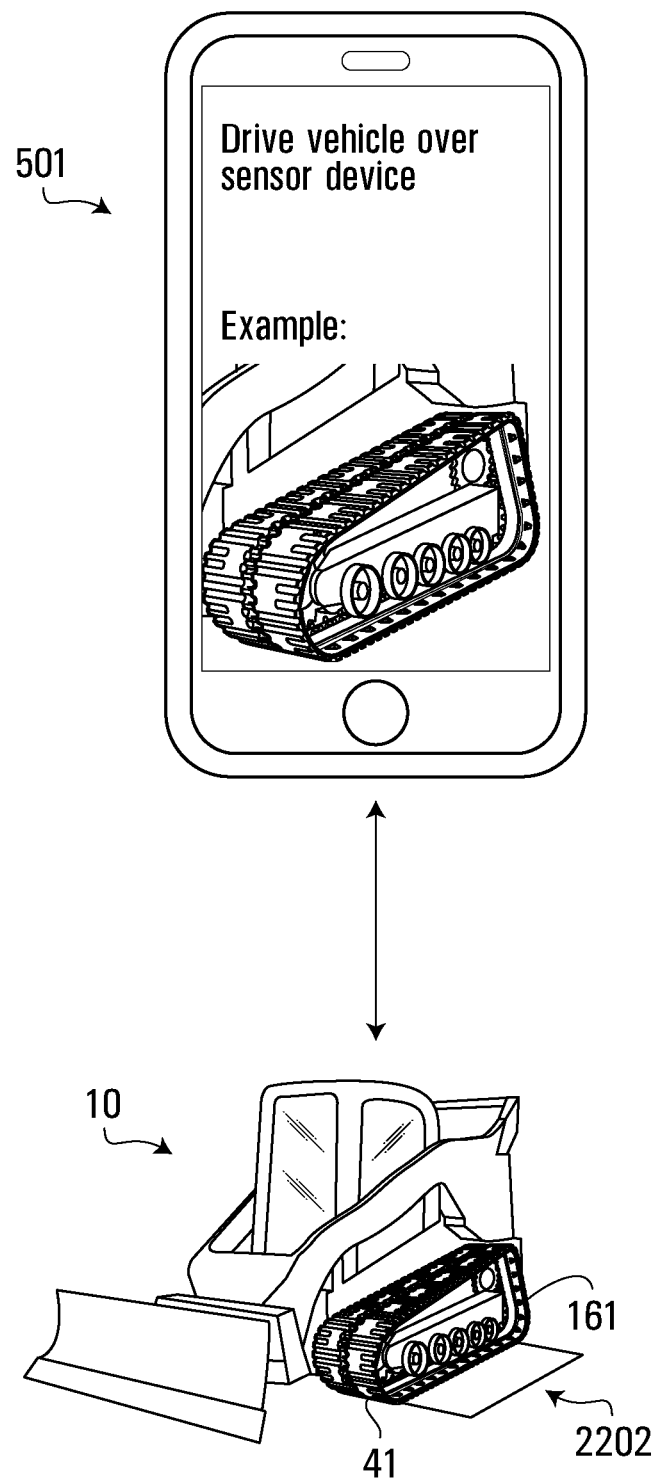

As shown in FIG. 22, the system 100 can instruct the user to use an accessory device 2202 in conjunction with the vehicle 10 in order to generate data about the track 41 and or track system. According to this embodiment, the accessory device 2202 can be an optical sensor communicatively linked to the electronic device 501. The accessory device 2202 can communicate the image data captured to the electronic device 501.

The electronic device 501 may communicate this data along with any other information to be communicated to the system server 1142 for analysis, as described above.

Figure 23:
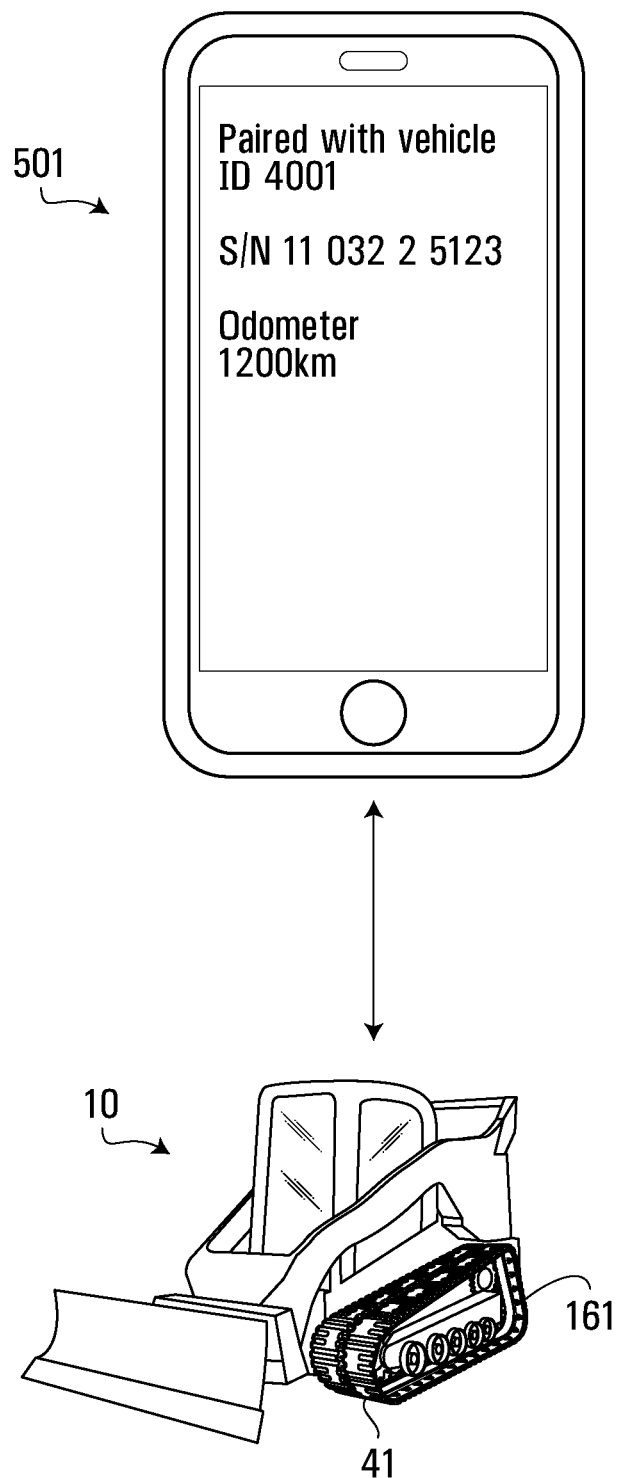

As shown in FIG. 23, the electronic device 501 can be communicably linked to the vehicle, according to some embodiments. According to this embodiment, the electronic device 501 communicates with an onboard computer 1342 in the vehicle 10 in order to generate data about the vehicle. The electronic device 501 may communicate this data along with any other information to be communicated to the system server 1142 for analysis, as described above.

As shown in FIG. 24, the information determined about the vehicle based on the analysis conducted by the system 100 is communicated to the electronic device 501 over the network 124. According to this embodiment, the information was a length of time before the track needed to be replaced.

As shown in FIG. 25, the system 100 has already communicated to the electronic device that based on the data analysis, vehicle maintenance is required. The electronic device 501 can then prompt the user to schedule the maintenance. If the user decides to schedule the maintenance, the electronic device 501 can communicate directly with a service center 2604 in order to schedule the maintenance over the network 124. For example, the user may have access to a booking calendar for the service center and select a time. Based on this selection, the parties will be notified that maintenance has been booked. According to some embodiments, the system 100 may have access to information about the service center 2604, such as parts inventory. Based on this inventory, the system 100 can calculate any lead time if required that can be factored into the booking span.

Figure 26:
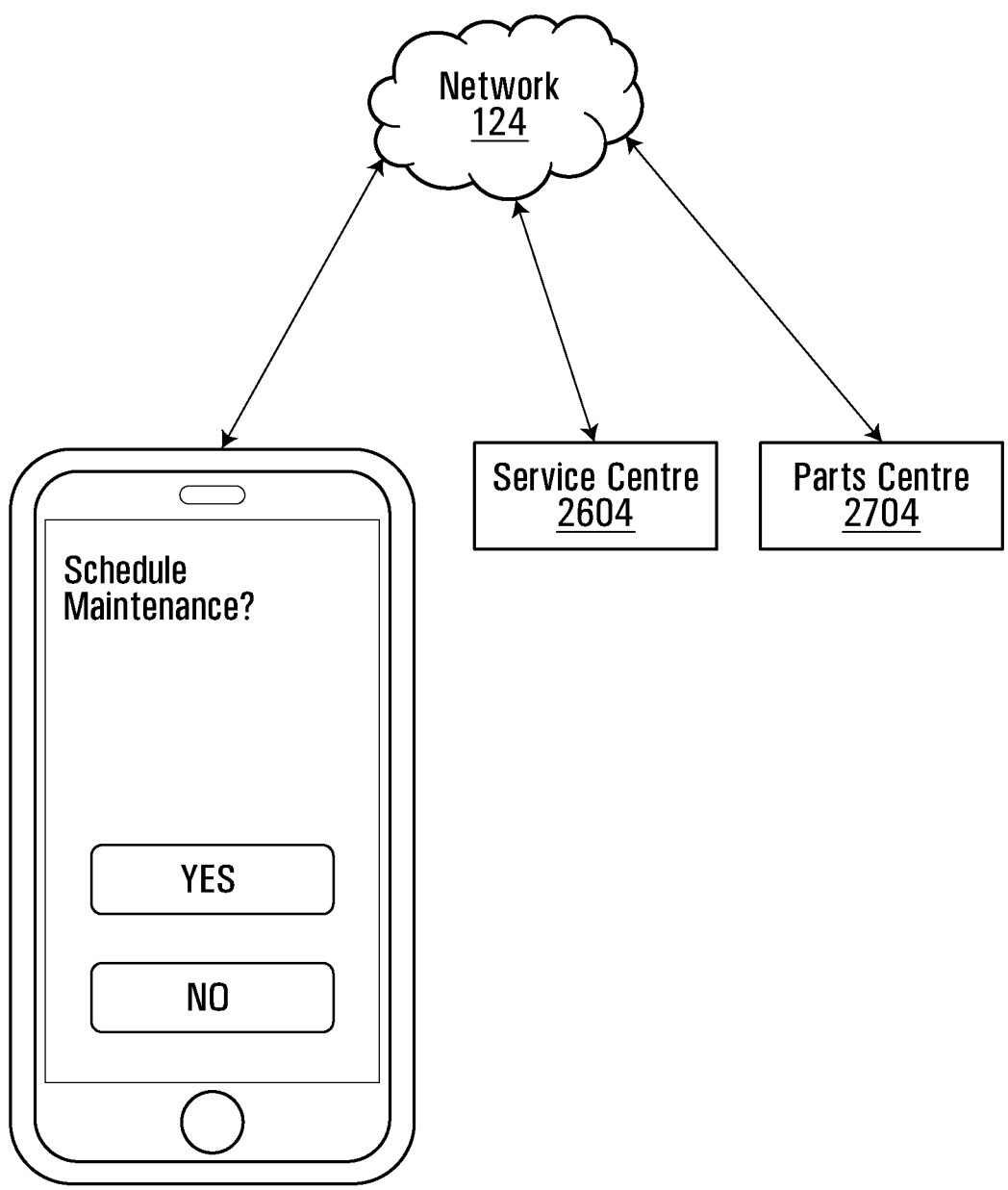
FIG. 26 shows a system capable of facilitating the purchase of parts according to one embodiment.

According to other embodiments such as those shown in FIG. 26, the system 100 can order new parts through the network 124 by creating a request to a retailer or parts center 2704. In this embodiment, if the service center requires a unique part that they do not have, the system 100 may create a request to the parts center to ship the part to the service center in advance of the booked maintenance time.

According to another embodiment, the system 100 may have access to pricing information or alternative replacement parts available at the parts center 2704. The system 100 may present the user with pricing options, sale information for different components they may require ordering for replacement. The user may then inform the system 100 of their preference and the system 100 will submit the order to the parts center accordingly.

Figure 27:
FIG. 27 shows a system able schedule a maintenance request according to one embodiment.

As shown in FIG. 27, according to some embodiments, the system 100 is configured to schedule a maintenance request over the network 124 without requiring a user to select a time. This time may be based on a user preference saved in the server memory for a given vehicle owner. For example, an owner may have a preference that all vehicles are scheduled for maintenance one month before the system 100 determined date. Accordingly, the system 100 can notify the user of scheduled maintenance as it is automatically scheduled.

Similarly, according to some embodiments, the system 100 is able to make purchase requests over the network 124 without requiring the user to select a part component. This choice may be based on a user preference saved in the server memory for a given vehicle owner. For example, an owner may have a preference for a specific brand of vehicle parts. Accordingly the system 100 can notify the user of the part purchase as it is automatically scheduled.

Figure 28:
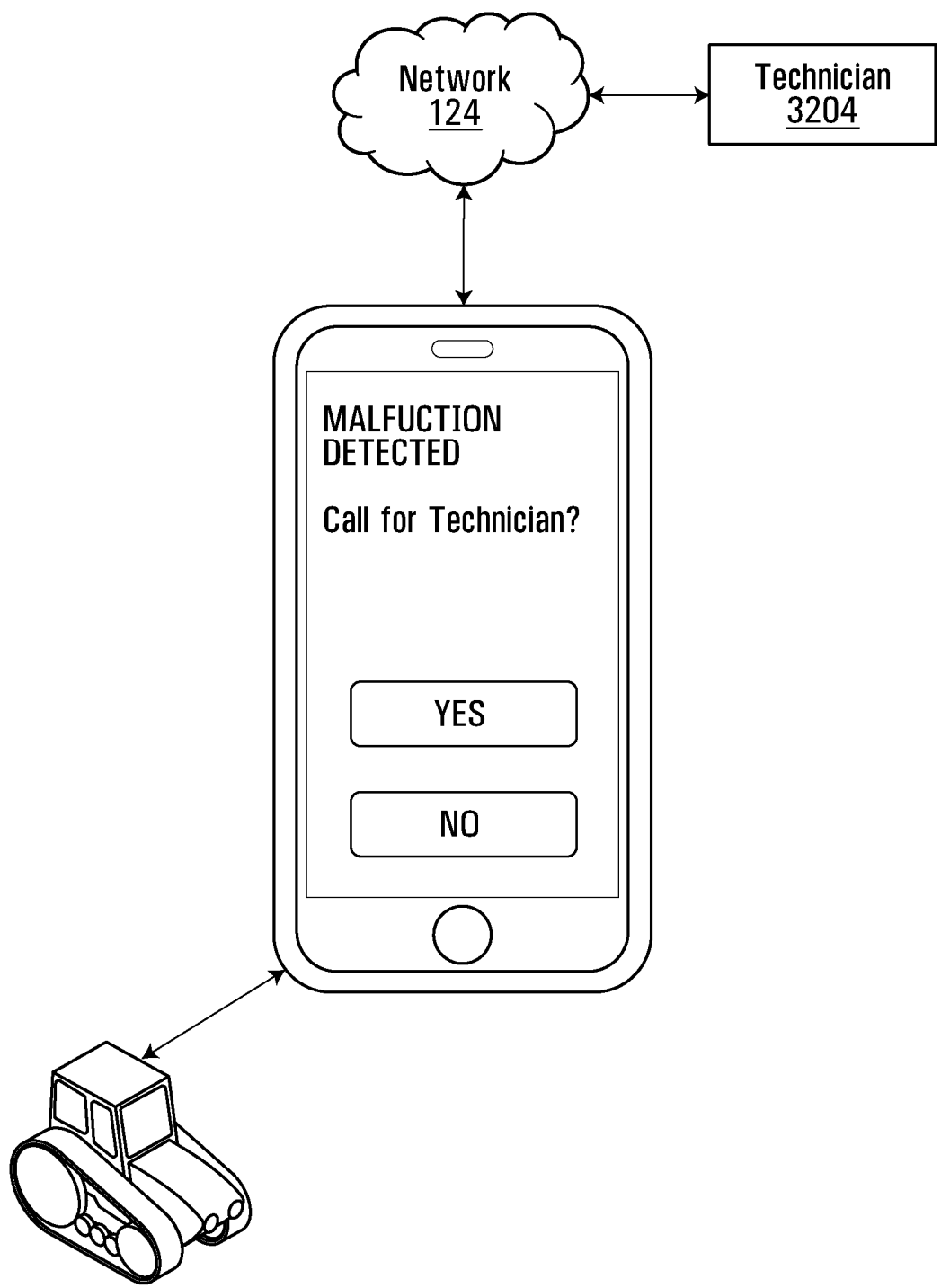
FIG. 28 shows a system able to connect two electronic devices, according to one embodiment.

As shown in FIG. 28, the electronic device may be communicably linked to a technician 3204. Alongside the user of the electronic device, the technician can also be notified over the network 124 of any determined vehicle information, scheduled maintenance, parts purchased, location of maintenance etc. Based on the user selection the user can be connected to a technician 3204 via the network 124. This connection could be by way of a telephone call, wherein the system 100 communicates a phone number over the network for the electronic device. Alternatively, the system 100 may use a Voice Over IP (VoIP) connection between the user and the technician. According to other embodiments, the communication between user and technician established could be a video call, wherein the technician is able to view a feed coming from a camera module within the user's electronic device.

Figure 29:
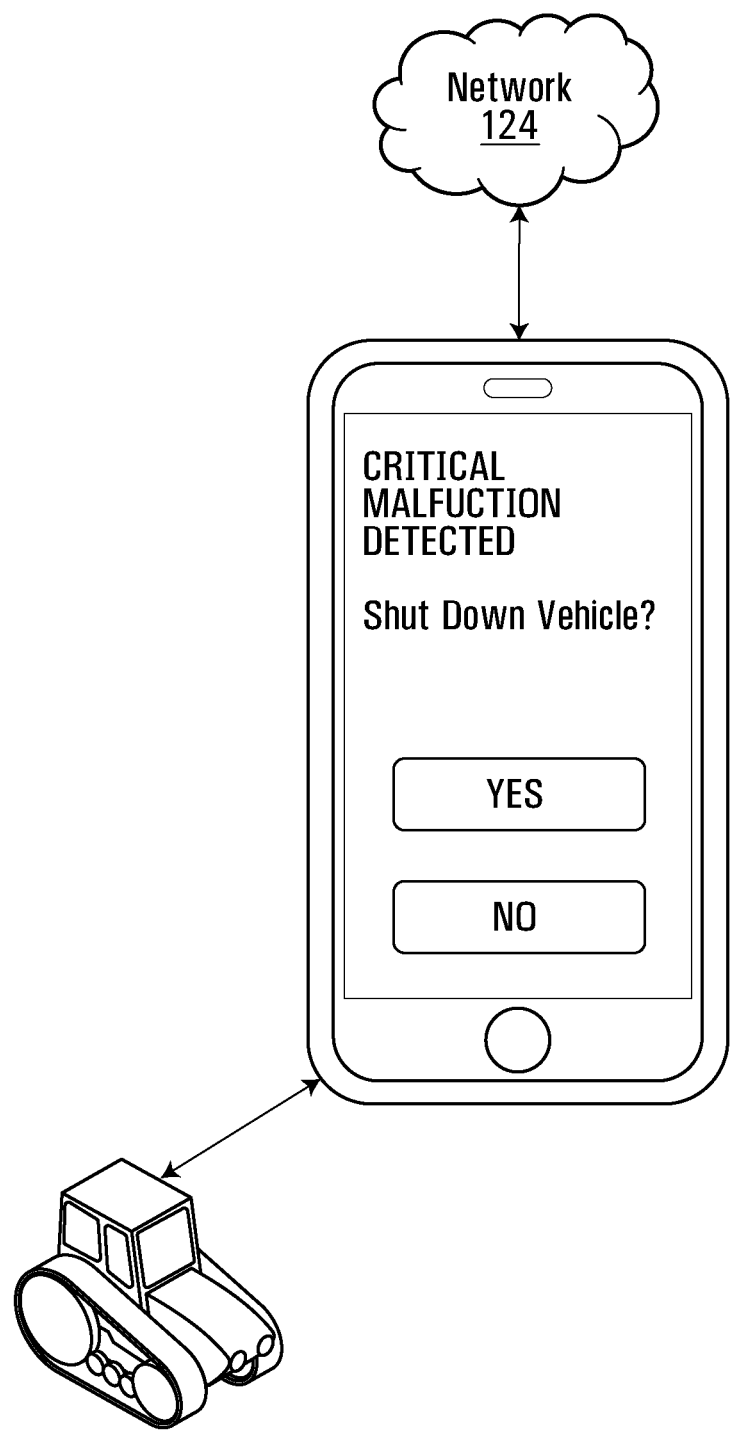
FIGS. 29 to 31 show a system that can determine that the vehicle has a critical malfunction according to various embodiments.
Figure 30:
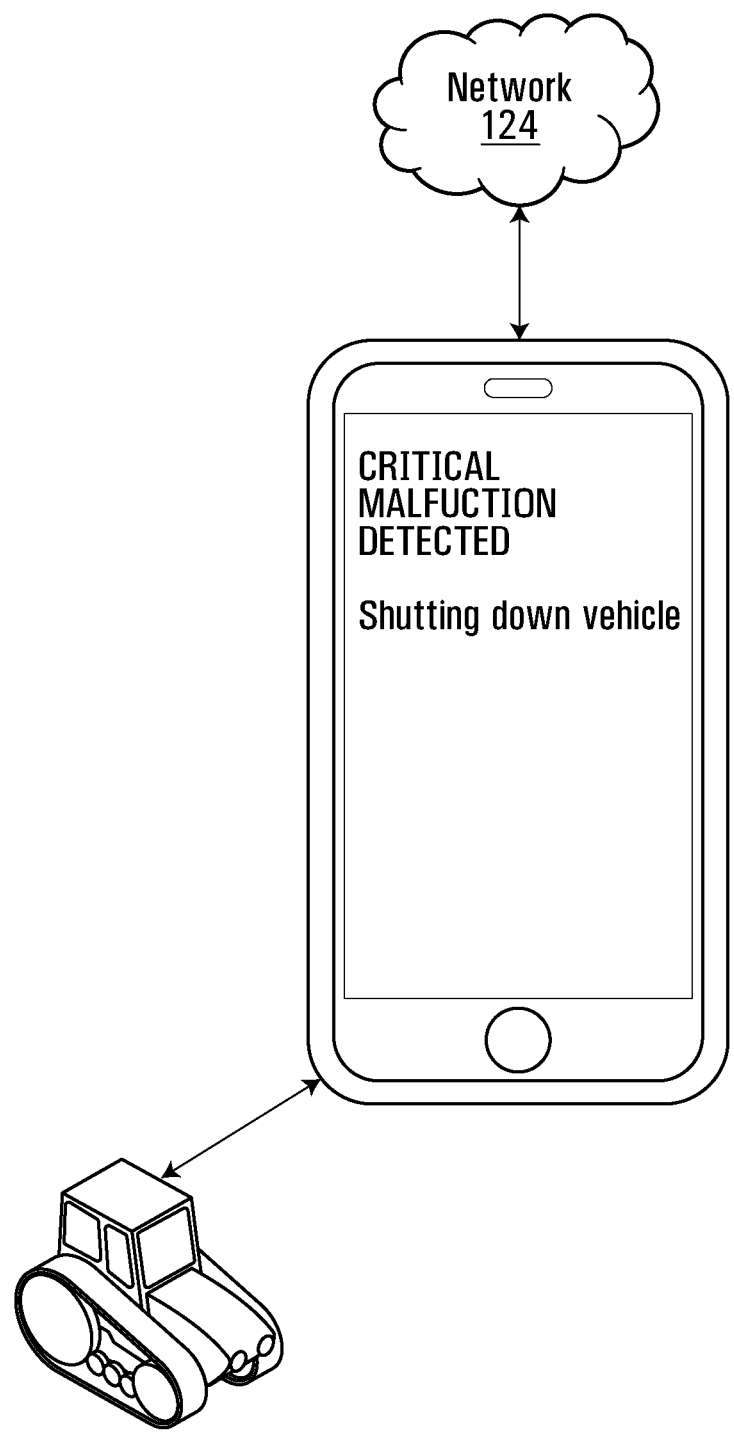
Figure 31:

According to the embodiments disclosed in FIGS. 29-31, the system 100 may determine that the vehicle has a critical malfunction. This could be determined through information captured form the onboard computer's internal sensor network or through data captured via the electronic device. For example, the vehicle track may have been damaged to the point where further driving would cause greater permanent damage to the vehicle and may endanger the safety of the driver. Using the communication link between the electronic device and the vehicle, the system 100 can instruct the electronic device to prompt a user with a notification of the critical malfunction and request instruction for whether or not the vehicle should be allowed to continue to operate. Based on this decision, the electronic device can instruct an onboard computer in the vehicle that the vehicle should not be operated again until the system 100 has determined the vehicle is no longer in a critical malfunction state.

According to another embodiment and shown in FIG. 29, the electronic device may offer the user a choice to immediately disable the vehicle. Based on this decision, the electronic device can instruct an onboard computer in the vehicle that the vehicle should not be operated again until the system 100 has determined that the vehicle, track system and/or track is no longer in a critical state.

According to another embodiment and shown in FIG. 30, the electronic device may not offer the user a choice and immediately disable the vehicle. Based on this decision, the electronic device can instruct an onboard computer in the vehicle that the vehicle should not be operated again until the system 100 has determined the vehicle, track system and/or track is no longer in a critical state.

According to yet another embodiment and shown in FIG. 31, the electronic device may not offer the user a choice and may disable the vehicle once the vehicle has been returned to a specific location. This can be done by using a location coordinate determined by either the electronic device 501 or in the vehicle itself. While the vehicle may be continued to be used to complete the current job, when the location coordinate of the vehicle is determined to be the same as a specific location such as a storage facility, the electronic device can instruct an onboard computer in the vehicle that the vehicle should not be operated again until the system 100 has determined that the vehicle, track system and/or track is no longer in a critical state.

Figure 32:
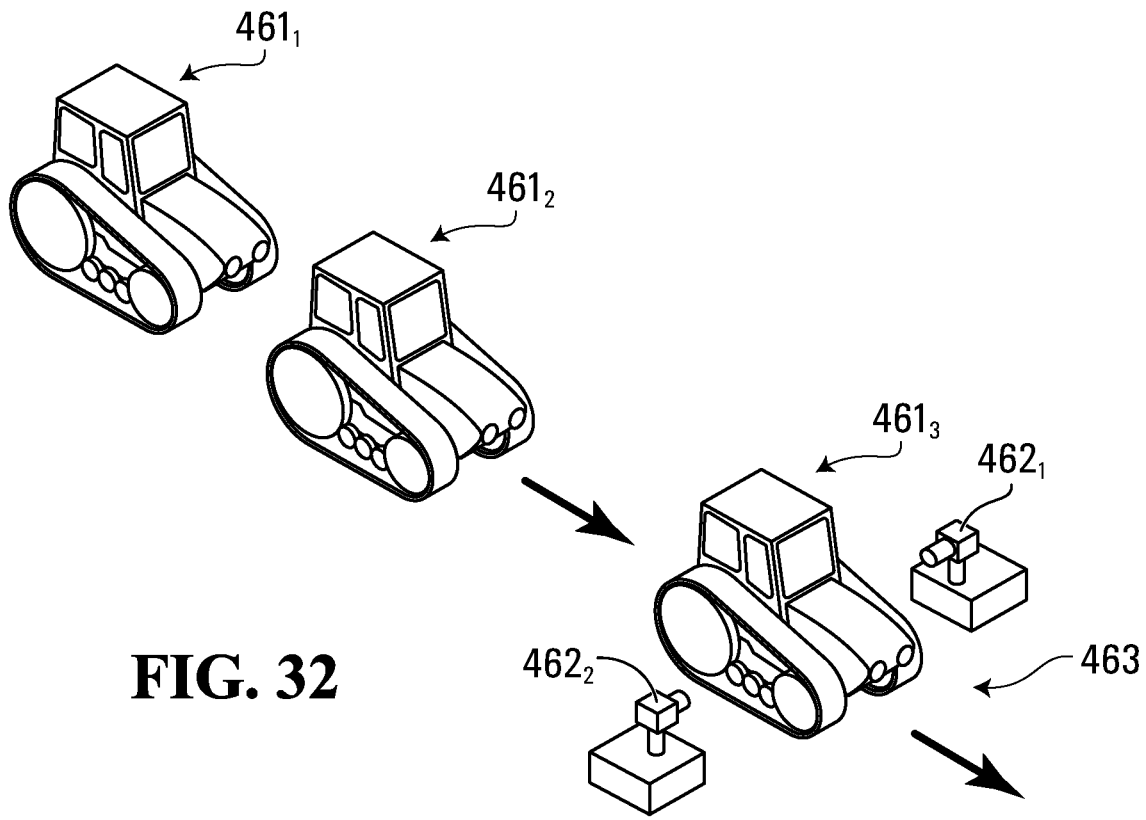
FIG. 32 shows an example of a camera station for inspecting track systems.
Figure 33:
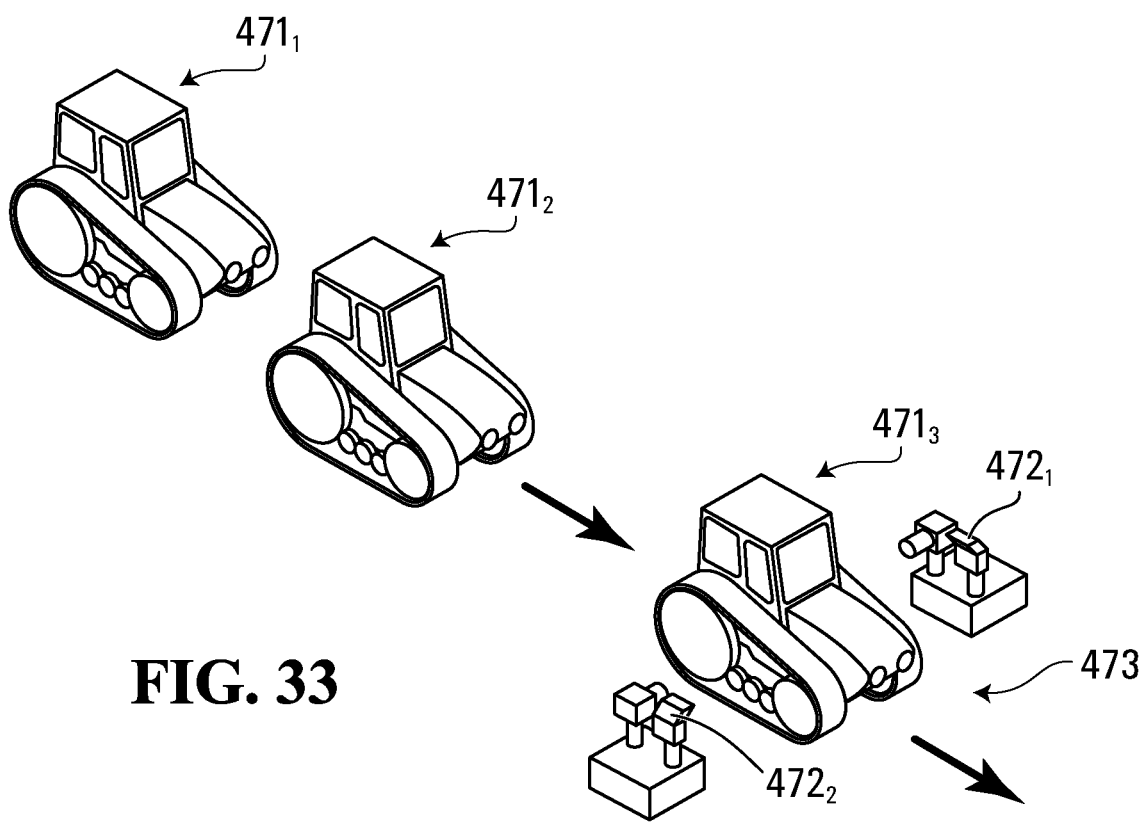
FIG. 33 shows an example of a laser line scanner station for inspecting track systems.

In some embodiments, with additional reference to FIGS. 32 and 33, in addition to or instead of the electronic device 501, the system server 1142 may receive image data from an inspection station for inspecting vehicles such as the vehicle 10 when they are in proximity.

For example, in some embodiments, as shown in FIG. 32, the system 100 may include an imaging inspection station 463 for inspecting track systems of vehicles $461_x$. In some embodiments, the imaging inspection station 463 comprises camera systems $462_x$ arranged to capture images of each of the track system $16_1$, $16_2$ and their environment. The captured images can then be optionally processed and analyzed locally or remotely in system 100. The camera systems $462_x$ can include directional cameras having any configuration of lenses suitable for inspecting the system $16_1$, $16_2$ and their environment.

In other embodiments, with additional reference to FIG. 33, the system server 1142 may receive image data from a scanning inspection station 473 for inspecting track systems of vehicles $471_x$. In some embodiments, the inspection station 473 comprises laser line scanner and/or laser area scanner systems $472_x$ arranged to scan each of the track system $16_1$, $16_2$ and their environment as each vehicle 471 moves past the inspection station 473. The information generated by the laser line scanner and/or laser area scanner systems 472 can then be optionally processed and analyzed locally or remotely by system server 1142. This embodiment is particularly advantageous for producing 3D scanning data suitable for subsequent volumetric analysis, as described in more detail above.

Figure 34:
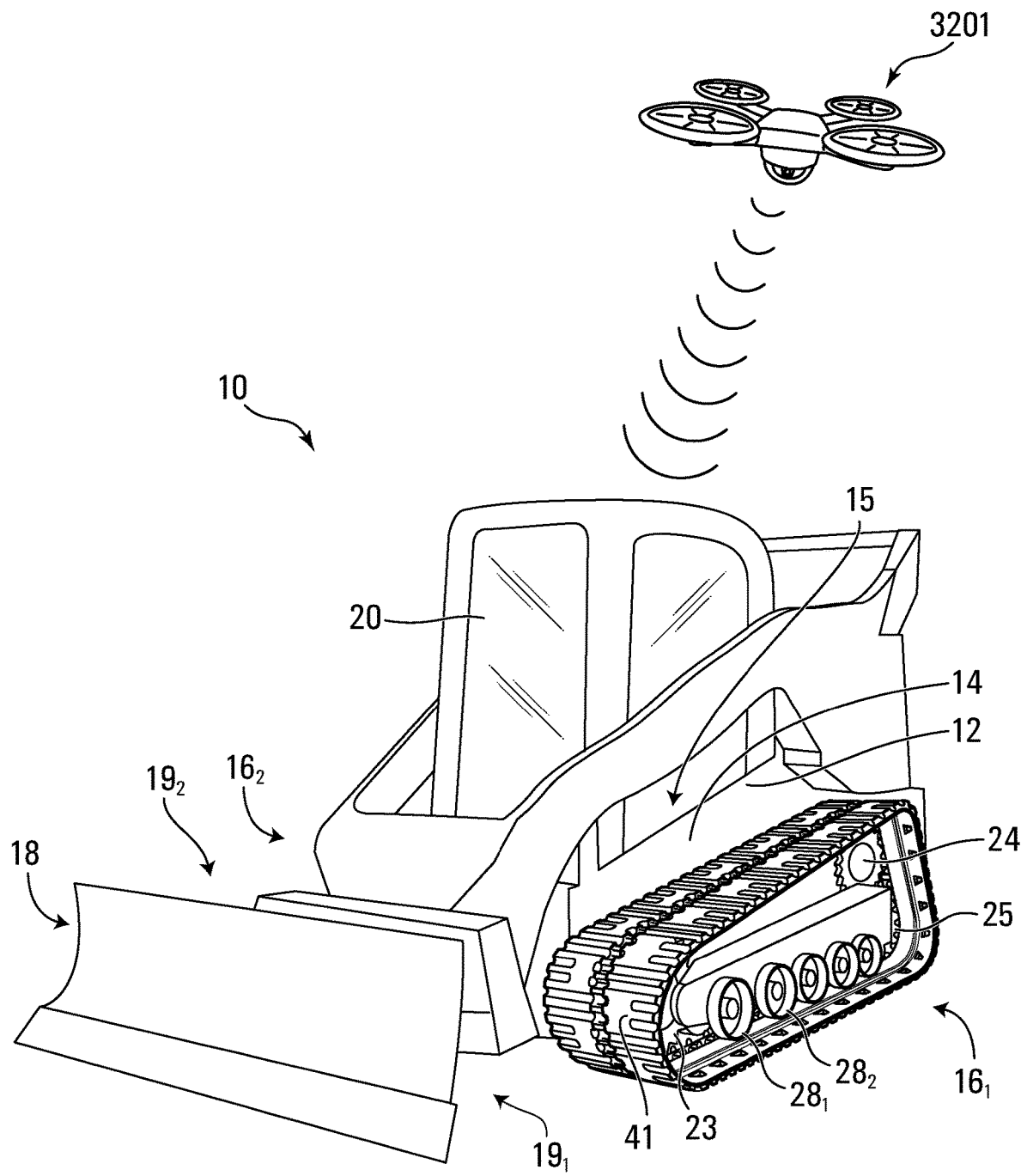
FIG. 34 shows an embodiment of a drone device for inspecting the track system.
Figure 35:
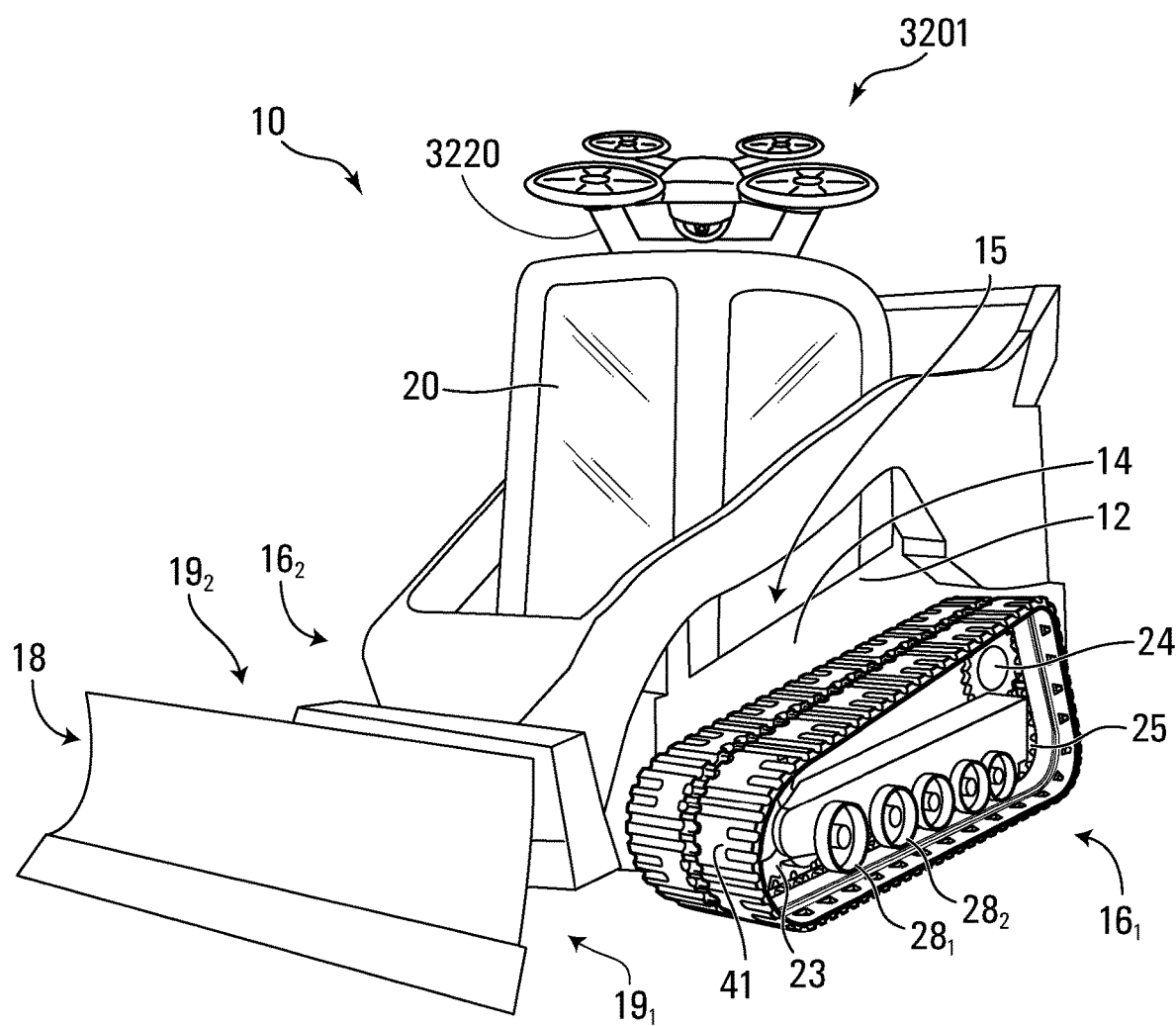
FIG. 35 shows the drone device for inspecting the track system.

In some embodiments, with additional reference to FIGS. 34 and 35, the system server 1142 may receive image data from a drone 3201 for inspecting the track 22 and/or other components of each of the track systems $16_1$, $16_2$ and/or their environment (e.g., detecting the presence of debris, etc.), so that information derived from the drone 3210 may be relayed to the operator of the vehicle 10 and/or another remote device or person. The vehicle 10 may comprise a drone mount 3220 configured to mount the drone 3220 to the vehicle 10 and release the drone 3201 when the drone 3201 is to monitor the vehicle 10 by moving around it.

In some embodiments, the drone 3201 is arranged to follow the vehicle, capture and analyze images of each of the track system $16_1$, $16_2$ and their environment. In other embodiments, the drone 3201 is equipped with a laser line scanner for scanning the track system $16_1$, $16_2$ and their environment. Communication between the drone 3201 and the vehicle 10 (e.g., between the drone 3201 and the processing entity 88) can be provided for by any suitable means, including but not limited to any combination of Global Positioning System (GPS) signals, Radio Frequency (RF) signals, Bluetooth signals, LIDAR, and RADAR signals. This embodiment is particularly advantageous for producing 3D scanning data suitable for subsequent volumetric analysis, as described in more detail above.

In this embodiment, the drone 3210 is an aerial drone configured to fly about the vehicle 10. While the drone 3201 shown in FIG. 34 is a multi-rotor flying drone, other drones are possible, including but not limited to fixed-wing drones, or any other type of unmanned aerial vehicle. Also, in other embodiments, the drone 3210 may be a land drone configured to travel on the ground about the vehicle 10 (e.g., on wheels or on tracks).

Figure 36:
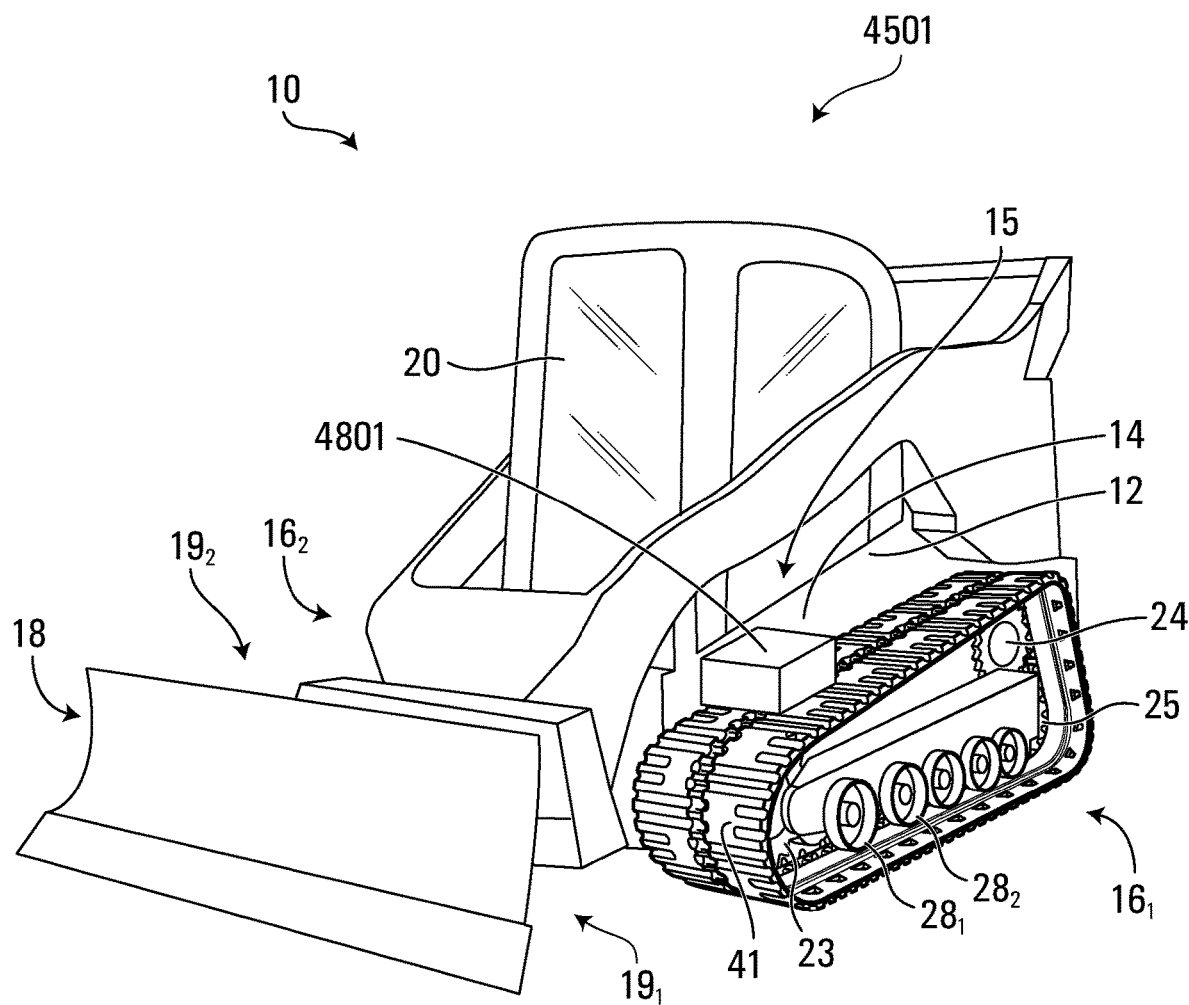
FIG. 36 shows an example of a vehicle-mounted inspection device for inspecting track systems.

In some embodiments, with additional reference to FIG. 36, in addition to or instead of the electronic device 501, the system server 1142 may receive image data from a vehicle-mounted inspection device 4801 for inspecting the track systems $16_1$, $16_2$ of the vehicle 10. In particular, the system 100 may include one or more vehicle-mounted inspection device 4801 for inspecting track systems $16_1$, $16_2$ of vehicles 10 by way of image data. In some embodiments, each track system $16_1$ and $16_2$ is provided with a vehicle-mounted inspection device 4801.

In some embodiments, the vehicle-mounted inspection device 4801 comprises a camera system arranged to capture images of the track system $16_1$, $16_2$ and its environment as the track 22 moves around the track-engaging assembly 21. The information generated by the camera system can then be optionally processed and analyzed locally or remotely by the system server 1142.

In some embodiments, the vehicle-mounted inspection device 4801 comprises a laser line scanner system and/or a laser area scanner system arranged to scan the track system $16_1$, $16_2$ and its environment as the track 22 move around the track-engaging assembly 21. The information generated by the laser line scanner and/or laser area scanner systems can then be optionally processed and analyzed locally or remotely by system server 1142. This embodiment is particularly advantageous for producing 3D scanning data suitable for subsequent volumetric analysis, as described in more detail above.

Figure 37:
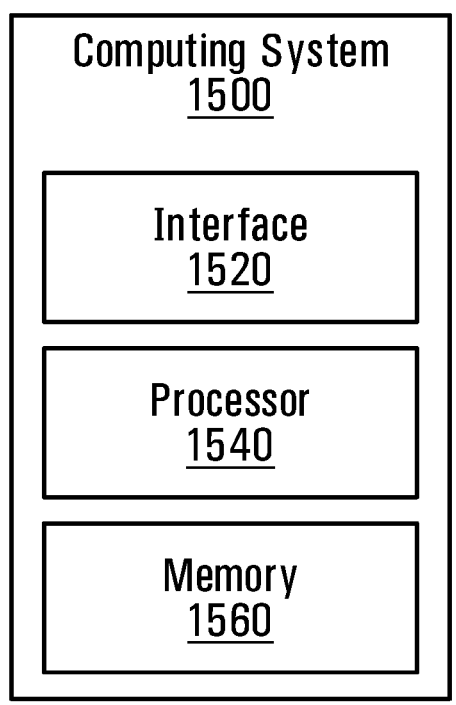
FIG. 37 shows an example of an embodiment of a computing apparatus.

In some embodiments, as shown in FIG. 37, a given component mentioned herein (e.g., the electronic device 501, the image processing entity 505, the server 1142, etc.) may comprise a computing system 1500 comprising suitable hardware and/or software (e.g., firmware) configured to implement functionality of that given component. The computing system 1500 comprises an interface 1520, a processor 1540, and a memory 1560.

The interface 1520 comprises one or more inputs and outputs allowing the computing system 1500 to receive signals from and send signals to other components to which the computing system 1500 is connected (i.e., directly or indirectly connected).

The processor 1540 comprises one or more processing devices for performing processing operations that implement functionality of the computing system 1500. A processing device of the processor 1540 may be a general-purpose processor executing program code stored in the memory 1560. Alternatively, a processing device of the processor 1540 may be a specific-purpose processor comprising one or more preprogrammed hardware or firmware elements (e.g., application-specific integrated circuits (ASICs), electrically erasable programmable read-only memories (EEPROMs), etc.) or other related elements).

The memory 1560 comprises one or more memory elements for storing program code executed by the processor 1540 and/or data used during operation of the processor 1540. A memory element of the memory portion 1560 may be a semiconductor medium (including, e.g., a solid state memory), a magnetic storage medium, an optical storage medium, and/or any other suitable type of memory element. A memory element of the memory portion 1560 may be read-only memory (ROM) and/or random-access memory (RAM), for example.

In some embodiments, two or more elements of the computing system 1500 may be implemented by devices that are physically distinct from one another (e.g., located in a common site or in remote sites) and may be connected to one another via a bus (e.g., one or more electrical conductors or any other suitable bus) or via a communication link which may be wired, wireless, or both and which may traverse one or more networks (e.g., the Internet or any other computer network such as a local-area network (LAN) or wide-area network (WAN), a cellular network, etc.). In other embodiments, two or more elements of the computing system 1500 may be implemented by a single device.

While in embodiments considered above the off-road vehicle 10 is a construction or agricultural vehicle, in other embodiments, the vehicle 10 may be another type of work vehicle such as a knuckleboom loader, etc.) for performing forestry work, or a military vehicle (e.g., a combat engineering vehicle (CEV), etc.) for performing military work, a carrier (e.g. carrying a boom, a rig, and/or other equipment t), or may be any other type of vehicle operable off paved road. Although operable off paved roads, the vehicle 10 may also be operable on paved roads in some cases. Also, while in embodiments considered above the off-road vehicle 10 is driven by a human operator in the vehicle 10, in other embodiments, the vehicle 10 may be an unmanned ground vehicle (e.g., a teleoperated or autonomous unmanned ground vehicle).

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those of ordinary skill in the art.

The invention claimed is:

1. A system for monitoring a track for traction of a vehicle on a ground, the track being mounted around a plurality of wheels, the track comprising a ground-engaging outer surface configured to engage the ground and an inner surface opposite to the ground-engaging outer surface, the track including elastomeric material to flex around the wheels and a reinforcement embedded in the elastomeric material, the system comprising:
    an interface configured to receive data regarding a plurality of images of the track; and
    a processor configured to:
        create a three-dimensional (3D) model of the track from a 3D point cloud generated by processing the data of the plurality of images of the track;
        perform a 3D model analysis comparing the created 3D model of the track to a design 3D model of the track by performing volumetric analysis to obtain a deterioration result of the 3D model analysis;
        perform a two-dimensional (2D) image analysis by performing image acquisition, image processing, feature extraction, and feature classification, on images generated from the created 3D model of the track to obtain a deterioration result of the 2D image analysis;
        generate information on a state of the track by combining the deterioration results of the 3D model analysis of the track and of the 2D image analysis of the track, and
        determine that a deterioration threshold event relating to at least one of an exposure of the reinforcement and a crack in the elastomeric material of the track, has occurred based on the information on the state of the track;
        wherein the processor is further configured to issue a signal based on the determination to inform a user of the system of an action to be performed in respect of the track.

2. The system of claim 1, wherein the information on the state of the track includes an indication of a volumetric loss of the elastomeric material of the track.

3. The system of claim 1, wherein the action to be performed in respect of the track is replacement of the track with a new track.

4. The system of claim 1, wherein the processor is configured to issue a signal based on the information on the state of the track that is directed to the vehicle.

5. The system of claim 4, wherein the signal is issued to control the vehicle.

6. The system of claim 1, wherein the at least one image of the track system component is captured by a wireless communication device.

7. The system of claim 1, wherein the deterioration result of the 2D image analysis comprises a breakage of the reinforcement.

8. The system of claim 1, wherein the reinforcement is a reinforcing cable extending in a longitudinal direction of the track.

9. The system of claim 1, wherein the processor comprises an artificial intelligence module configured to perform the 2D image analysis.

10. The system of claim 9, wherein the artificial intelligence module comprises a neural network.

11. The system of claim 1, wherein the information on the state of the track comprises an indication of a level of wear of the track.

12. The system of claim 1, wherein the information on the state of the track comprises an indication of a remaining useful life of the track.

13. The system of claim 1, wherein the generation of the information on the state of the track further combines deterioration results from the processor performing a 2D image analysis of the data regarding the plurality of images of the track.

14. The system of claim 1, wherein the deterioration threshold event is one or more of: a usage threshold event, a wear threshold event, and a damage threshold event.

15. The system of claim 1, wherein the feature classification of the 2D image analysis includes one or more of: use of nearest neighbor classification, cascading classifiers, neural networks, statistical classification techniques, and Bayesian classification techniques.

16. The system of claim 1, wherein after the feature classification of the 2D image analysis, an additional feature classification is performed on the features identified as including deterioration.

17. A system for monitoring a track system for traction of a vehicle on a ground, the track system comprising a plurality of wheels and a track mounted around the wheels, the track comprising a ground-engaging outer surface configured to engage the ground and an inner surface opposite to the ground-engaging outer surface, the track including elastomeric material to flex around the wheels and a reinforcement embedded in the elastomeric material, the system comprising:

- an interface configured to receive data regarding a plurality of images of a component of the track system; and
- a processor configured to:
  - create a three-dimensional (3D) model of the track from a 3D point cloud generated by processing the data of the plurality of images of the track;
  - perform a 3D model analysis comparing the created 3D model of the track to a design 3D model of the track by performing volumetric analysis to obtain a deterioration result of the 3D model analysis;
  - perform a two-dimensional (2D) image analysis by performing image acquisition, image processing, feature extraction, and feature classification, on images generated from the created 3D model of the track to obtain a deterioration result of the 2D image analysis;
  - generate information on a state of the track by combining the deterioration results of the 3D model analysis of the track and of the 2D image analysis of the track, and
  - determine that a deterioration threshold event relating to at least one of an exposure of the reinforcement and a crack in the elastomeric material of the track, has occurred based on the information on the state of the component of the track system;
  - wherein the processor is further configured to issue a signal based on the determination to inform a user of the system of an action to be performed in respect of the component of the track.

18. The system of claim 17, wherein the component of the track system is the track.

19. The system of claim 17, wherein the component of the track system is a given one of the wheels.

\* \* \* \* \*